(12) United States Patent
Montesanti et al.

(10) Patent No.: US 7,492,117 B2
(45) Date of Patent: Feb. 17, 2009

(54) ELECTROMAGNETIC VARIABLE DEGREES OF FREEDOM ACTUATOR SYSTEMS AND METHODS

(75) Inventors: Richard C. Montesanti, Pleasanton, CA (US); David L. Trumper, Plaistow, NH (US); James L. Kirtley, Jr., Brookline, MA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/490,988

(22) Filed: Jul. 20, 2006

(65) Prior Publication Data

US 2007/0018604 A1 Jan. 25, 2007

Related U.S. Application Data

(60) Provisional application No. 60/701,176, filed on Jul. 20, 2005.

(51) Int. Cl.
*G05B 11/01* (2006.01)
*H02P 25/08* (2006.01)

(52) U.S. Cl. .................. 318/687; 318/135; 318/701; 318/400.41

(58) Field of Classification Search .......... 318/135, 318/254, 687, 701, 700, 400.01, 400.16, 318/400.41, 400.42
See application file for complete search history.

(56) References Cited

U.S. PATENT DOCUMENTS

| 2,092,765 | A | | 9/1937 | Losier |
|---|---|---|---|---|
| 3,959,673 | A | * | 5/1976 | Montagu ............... 310/38 |
| 3,964,382 | A | | 6/1976 | Baar et al. |
| 4,357,633 | A | | 11/1982 | Buechler |
| 4,634,191 | A | | 1/1987 | Studer |
| 5,446,323 | A | * | 8/1995 | Neff et al. ............. 310/12 |
| 5,600,189 | A | * | 2/1997 | Van Geel et al. ...... 310/40 R |
| 5,663,801 | A | | 9/1997 | Hada et al. |

(Continued)

OTHER PUBLICATIONS

E.I. Rivin, "*Properties and Prospective Applications of Ultra Thin Layered Rubber-Metal Laminates for Limited Travel Bearings*", Tribology Int., 1983, vol. 18, No. 1, pp. 444-452. Department of Mechanical Engineering, Wayne State University, Detroit, MI.

*Primary Examiner*—Bentsu Ro
(74) *Attorney, Agent, or Firm*—John P. Wooldridge; John H. Lee

(57) ABSTRACT

The present invention provides a variable reluctance actuator system and method that can be adapted for simultaneous rotation and translation of a moving element by applying a normal-direction magnetic flux on the moving element. In a beneficial example arrangement, the moving element includes a swing arm that carries a cutting tool at a set radius from an axis of rotation so as to produce a rotary fast tool servo that provides a tool motion in a direction substantially parallel to the surface-normal of a workpiece at the point of contact between the cutting tool and workpiece. An actuator rotates a swing arm such that a cutting tool moves toward and away from a mounted rotating workpiece in a controlled manner in order to machine the workpiece. Position sensors provide rotation and displacement information for a swing arm to a control system. A control system commands and coordinates motion of the fast tool servo with the motion of a spindle, rotating table, cross-feed slide, and in feed slide of a precision lathe.

58 Claims, 46 Drawing Sheets

U.S. PATENT DOCUMENTS

| | | |
|---|---|---|
| 5,719,543 A | 2/1998 | Berling |
| 6,342,746 B1 | 1/2002 | Flynn |
| 6,936,987 B2 * | 8/2005 | Cheron .................. 318/468 |
| 2004/0035266 A1 | 2/2004 | Montesanti et al. |
| 2005/0056125 A1 | 3/2005 | Trumper |
| 2005/0166726 A1 | 8/2005 | Montesanti et al. |
| 2005/0223858 A1 | 10/2005 | Lu et al. |

* cited by examiner

| Item | Sandwiched Rotor | Pinched Rotor | Reversed Roles Sandwiched Rotor |
|---|---|---|---|
| Torque is a linear function of current | Yes | Yes | Yes |
| Relative torque for a given current | 1x | 1x | 1x |
| Torque is not affected by force command | Yes | Yes | Yes |
| Force is a linear function of current | Yes | Yes | Yes |
| Relative force for a given current | 1/2x (max) | 1x | 1x |
| Force is not affected by torque command | No | Yes | Yes |
| Force does not require an operating point torque | No | Yes | Yes |
| Force constant is independent of torque command | No | Yes | Yes |
| One steering coil is okay on each stator piece | Yes | Yes | Yes |
| Torque does not depend on leakage flux paths | Yes | Yes | Yes |
| Force does not depend on leakage flux paths | Yes | Yes | Yes |
| Rotor heat generation from AC flux | Higher | Lower | Lower |
| Stator heat generation from AC flux | 1x | 1x | 1x |
| Back-iron heat generation from AC flux | None | None | Significant |
| Able to adjust air gaps after grinding pole faces | Yes | No | Yes |
| Large face of rotor available for mounting a mirror | No | Partially | No |

FIG.12

ELECTROMAGNETIC VARIABLE DEGREES OF FREEDOM ACTUATOR SYSTEMS AND METHODS

RELATED APPLICATION

This application claims priority from U.S. Provisional Patent Application No. 60/701,176, entitled "HYBRID ROTARY AND LINEAR FLUX-BIASED VARIABLE RELUCTANCE ACTUATOR BASED ROTARY FAST TOOL SERVO SYSTEMS AND METHODS," filed on Jul. 20, 2005, and is incorporated by reference in its entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a servo system and method, more particularly, the present invention relates to hybrid linear/rotary fast servo systems and methods to enable, for example, fabrication of complex three-dimensional surface features on a variety of components, and steering a light beam in an optical system.

2. Description of Related Art

A fast tool servo is a well-known device that can be added to a new or existing machine tool to provide an additional axis of motion between the cutting tool and a workpiece. A fast tool servo most notably distinguishes itself by its ability to move the tool at a much higher bandwidth that is at a high speed of controlled, repetitive motion, on its axis relative to the other machine tool axes, with accuracy equal to or better than that of the other tool axes. Fast tool servos fall into two broad categories: rotary and linear. A rotary fast tool servo produces relative motion between the cutting tool and a workpiece by rotation of a swing arm that carries the tool at a fixed radius from the axis of rotation. A linear fast tool servo produces relative motion between the cutting tool and a workpiece by producing a linear translation of the tool. A steering mirror is a well-known device that can be added to an optical system to allow deflecting an electromagnetic beam.

Background information on a rotary fast tool servo system is described in U.S. Patent Application Publication No. 2005/0166726 A1, entitled "Rotary Fast Tool Servo System and Methods," to Montesanti et al., published Aug. 4, 2005, including the following: "The present invention is directed to a rotary fast tool servo system that improves the accuracy and speed to enable and meet manufacturing goals for, for example, fabricating three-dimensional surface features . . . . In a preferred embodiment, the rotary fast tool servo system includes a cutting element mounted to a rotating arm that is driven by an actuator. The arm is mounted to the fast tool servo base by flexures on at least one side of the cutting element. Each flexure preferably includes orthogonally positioned flexure elements that extend from the rotating arm to the base. The rotating arm can be oriented vertically, horizontally, or in any other desired orientation."

Background information on a fast tool servo system having linear or rotational movement about a single axis is described in U.S. Patent Application Publication No. US2005/0056125 A1, entitled "Flux-biased electromagnetic fast tool servo systems and methods," to David L. Trumper, published Mar. 17, 2005, including the following: "The movement of the tool servo can be constrained in translation (linear FTS) or in rotation (rotary FTS) by any of the bearing technologies used in precision motion control systems. These include flexures, rolling element bearings, air bearings, hydrostatic bearings, or magnetic bearings."

Further background information on a fast tool servo system having linear or rotational movement about a single axis is described in U.S. Patent Application Publication No. US2005/0223858 A1, entitled "Variable reluctance Fast Positioning System and Methods," to Lu et al., published Oct. 18, 2005, published Mar. 17, 2005, including the following: "A linear fast motor 682 as described herein is used to position article 686 along a longitudinal (X) axis. Alternatively, a rotary fast motor 684 is used to rotate article 686 around axis through angle 0."

Background information on a magnetic bearing system arranged for tilt and tip movement, in addition linear movement about a defined plane, is described in U.S. Pat. No. 4,634,191, entitled "Radial and Torsionally Controlled Magnetic Bearing," to Studer, patented Jan. 6, 1987, including the following: "A magnetic bearing including a circular stator member having a plurality of circumferential pole faces and a suspended annular ring member with corresponding number of inward facing circumferential pole faces separated by respective air gaps. A source of DC magnetic flux circulates flux between the circumferential pole faces of the stator and the ring to provide axial stability along a central longitudinal axis. Flux coil means are included on the stator member for providing variable flux density along predetermined radial paths to provide active radial stabilization. Additionally, flux coil means are included on the stator to actively modulate the magnitude of the magnetic forces as well as their direction of differential flux control involving the DC magnetic flux to produce torquing moments about a pair of mutually orthogonal axes which are perpendicular to the central axis.

A need exists for new and/or improved flux-biased variable reluctance actuators that can provide simultaneous rotary motion or rotary and linear motion. Such a system and method of the present invention is directed to such a need.

SUMMARY OF THE INVENTION

Accordingly, the present invention provides systems with improved accuracy and speed to enable and meet manufacturing goals of, for example, fabrication of three-dimensional surface features. The embodiments of the present invention provide a high level of bandwidth and precision control to form short spatial wavelength features of, for example, 50 micron long features with 5 micron peak to valley dimensions at 10 kHz or more.

The rotary and/or hybrid rotary/linear fast tool servo system of the present invention includes a cutting element mounted to a reciprocating arm that is driven by an actuator so as to operate on workpiece mounted on, for example, a spindle of a precision lathe which can rotate the workpiece during such operation. As another arrangement the rotary and/or hybrid rotary/linear fast tool servo system of the present invention can be arranged with an operatively coupled or manufactured optical surface of the rotor so as to direct electromagnetic radiation (e.g., laser optical wavelengths) to a desired target for desired applications, such as, but not limited to, treating, cutting, milling, inspecting and or communication.

A beneficial arrangement of the present invention includes a hybrid linear/rotary positioning apparatus having a stator; a rotor moveably coupled with the stator and configured with at least one broad surface parallel to a desired XY plane; and a means to induce a steering flux and a bias flux in the stator so as to rotate the rotor relative to a rotational axis and translate linearly in an orthogonal direction with respect to the XY plane.

Another aspect of the present invention provides a one degree of freedom actuator that includes a stator configured with at least one central pole and at least two outer poles; a rotor moveably coupled with the stator and configured with at least one central rotor pole, at least two outer rotor poles, and configured with at least one broad surface parallel to an XY plane; and a means to induce a steering flux and a bias flux in the stator so as to rotate the rotor relative to a rotational axis.

A final aspect of the present invention provides a two degree of freedom actuator that includes a stator configured with at least one central pole, at least two left/right outer stator poles, and at least two top/bottom outer stator poles; a rotor moveably coupled with the stator and configured with at least one central pole, at least two left/right outer rotor poles, at least two top/bottom outer rotor poles, and configured with at least one broad surface parallel to an XY plane; and a means to induce a steering flux and a bias flux in said stator so as to rotate said rotor relative to a first and a second rotational axis.

Accordingly, such methods and apparatus of the present invention provide accurate high speed beneficial rotary and hybrid linear/rotary servo arrangements so as to enable fabrication of three-dimensional surface features on manufactured components and to enable directing electromagnetic radiation in an optical system. Such arrangements as disclosed herein, improves the bearing system for a moving element by reducing the number of mechanical components supporting the moving element and/or by providing dynamic stiffness and electronic damping to the moving element by a control system.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 12 provides a comparison of the pros and cons of the magnetic circuits shown in FIGS. 6, 8, and 10.

DETAILED DESCRIPTION OF THE INVENTION

Figure 1:
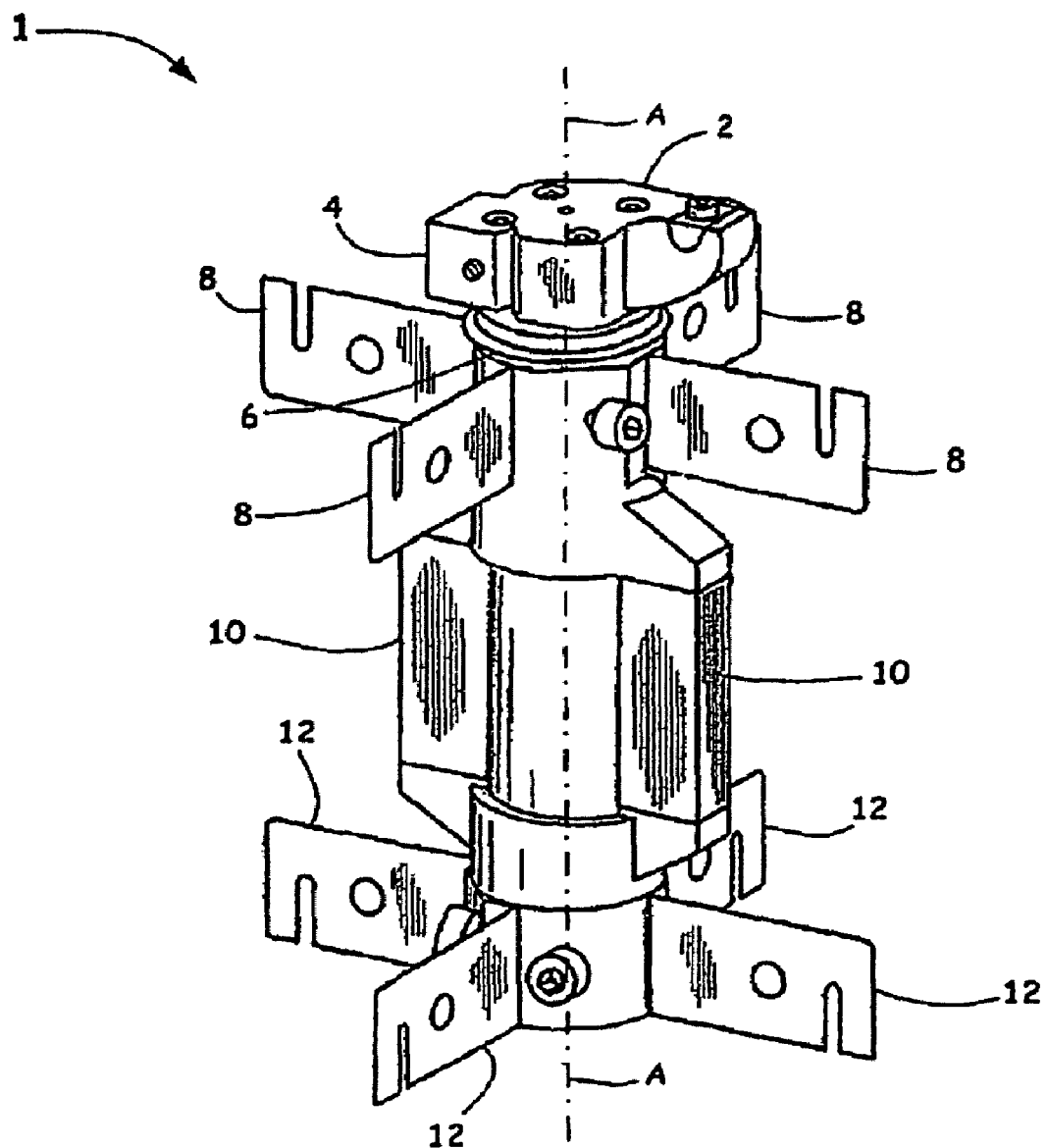
FIG. 1 shows a rotor as described in U.S. Patent Application Publication No. 2005/0166726 A1, entitled "Rotary Fast Tool Servo System and Methods," to Montesanti et al.

Referring now to the drawings, specific embodiments of the invention are shown. The detailed description of the specific embodiments, together with the general description of the invention, serves to explain the principles of the invention.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

Specific Description

FIG. 1 shows a rotor, generally designated by the reference numeral 1, as described in U.S. Patent Application Publication No. 2005/0166726 A1, entitled "Rotary Fast Tool Servo System and Methods," to Montesanti et al., and which is herein incorporated by reference in its entirety. Such a rotor 1 includes, but is not limited to, a swing arm 2, a counter weight 4, a seal 6, such as an o-ring, one or more rotor cores 10, and of note for purposes of the discussion of FIG. 1, upper flexures 8 and lower flexures 12 having a high in-plane stiffness compared to a low out-of-plane bending stiffness. Such a design creates a radial and axial constraint at both ends of rotor 1, which is therefore over-constrained in the axial direction (as shown by the dashed line and denoted by the letter A).

Figure 2:
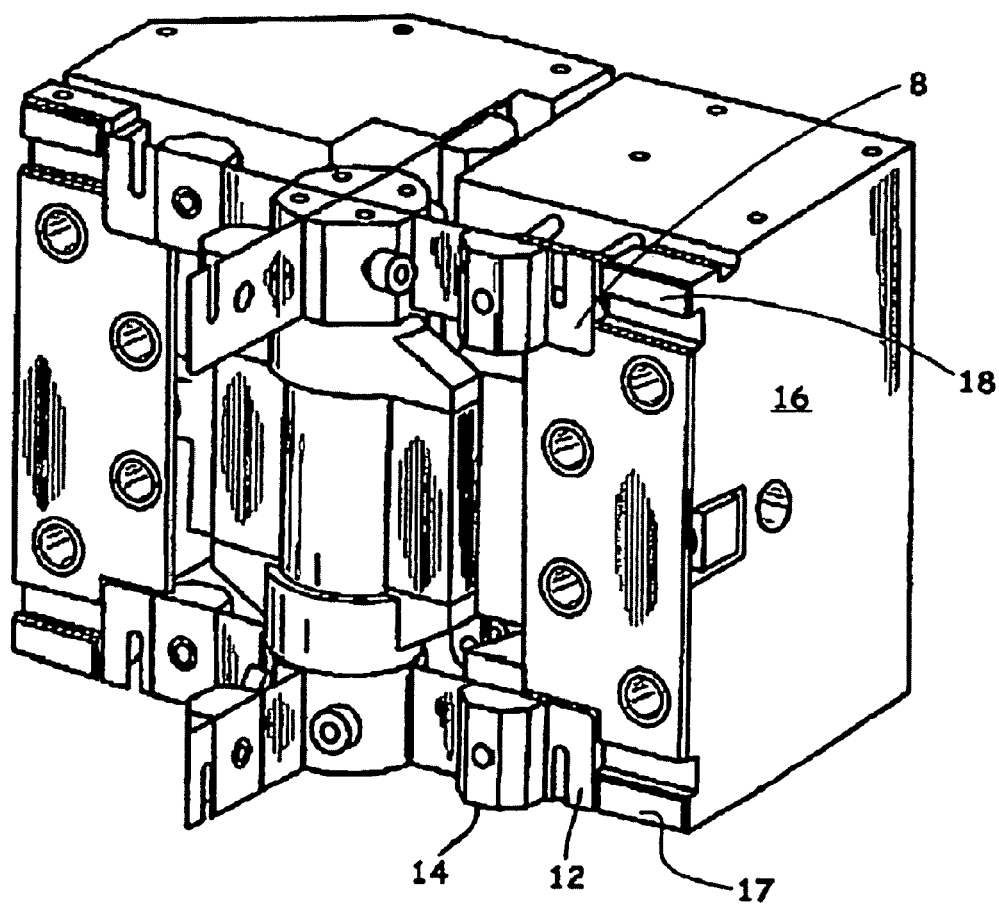
FIG. 2, also described in U.S. Patent Application Publication No. 2005/0166726 A1, entitled "Rotary Fast Tool Servo System and Methods," to Montesanti et al., shows a beneficial method for fixing the outer ends of the flexures shown in FIG. 1 with a clamping block.

FIG. 2, as also detailed in incorporated by reference U.S. Patent Application Publication No. 2005/0166726 A1, shows a beneficial method for fixing the outer ends of the flexures (e.g., lower flexures 12, as shown in FIG. 2, with a clamping block (e.g., reference numeral 14) and upper flexures 8 with a clamping block. If the axial length of rotor 1, as detailed in FIG. 1, changes relative to the axial spacing of the bottom portion 17 and top portion 18 of the stator housing 16 and 18, as shown in FIG. 2, that fix the outer ends of flexures, 8 and 12, via, for example, clamping block 14, then an unwanted stress can develop in the flexures (e.g., upper flexure 8 or lower flexure 12). Thermal growth of the rotor 1, as shown in FIG. 2 but more detailed in FIG. 1, that is not matched by thermal growth of the stator housing 16 and 18 is one mechanism that can cause such a difference in axial length. Magnetic losses in rotor core 10 (such as in a configured laminate stack core, as shown generally in FIG. 1) generates heat and therefore can cause a change in the axial length of rotor 1, as shown in FIG. 1, during operation.

Similar magnetic losses in the stator cores, not shown, generate heat in stator housing 16 and 18 that can cause a change in the axial spacing of the outer ends of the flexures during operation. Stresses in the flexures due to the differential axial growth can be kept within a tolerable level by: (1) prescribing strict operating conditions so that the differential thermal growth between the rotor and stator housings is kept within an acceptable level; (2) the use of a cooling fluid to maintain an acceptable differential temperature between the rotor and stator housings; (3) modify the in-plane stiffness of either the lower or upper flexures so that the rotor is less over-constrained in the axial direction.

Figure 3:
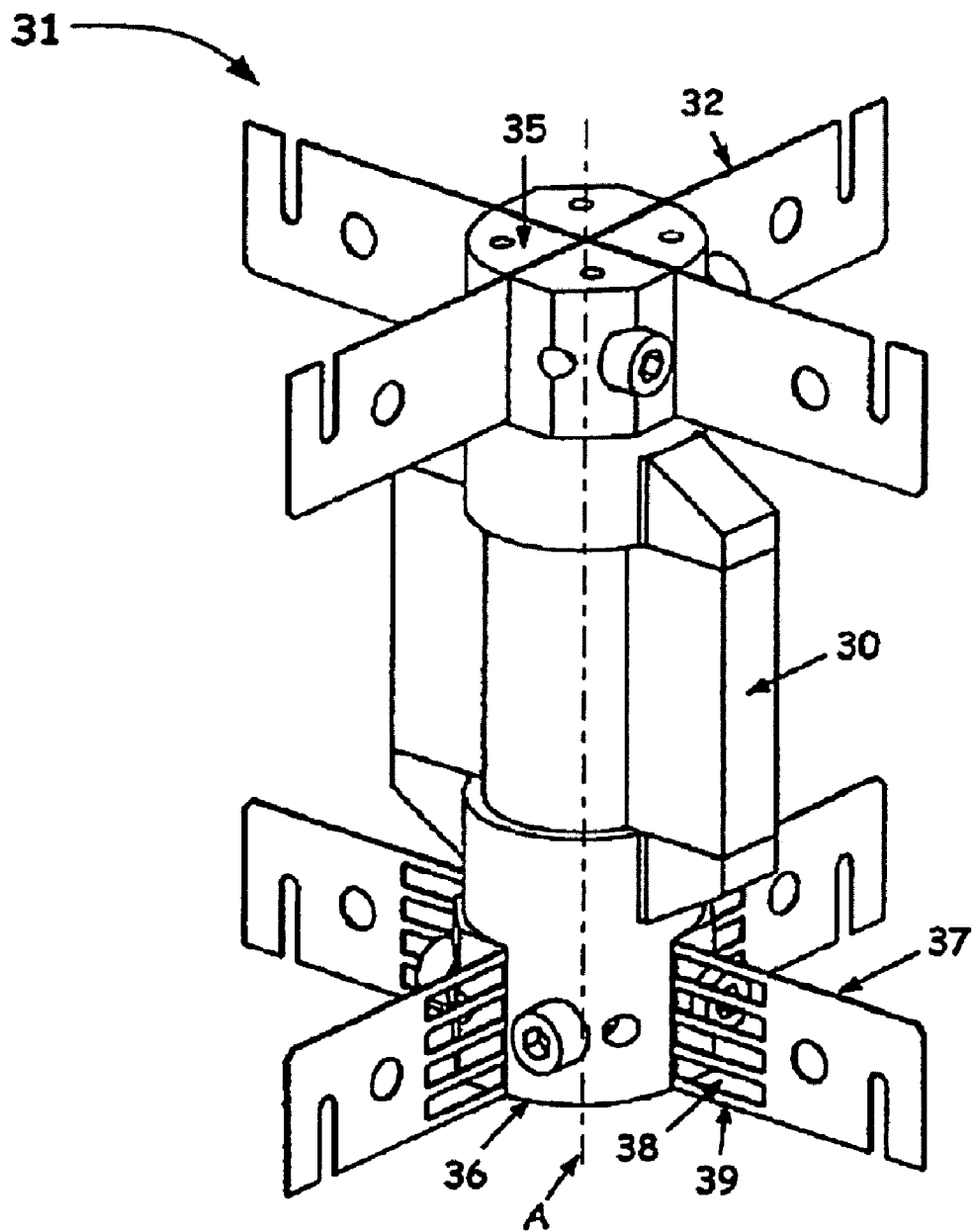
FIG. 3 shows an example of a rotor with lower flexures configured with radial slots cut into them to create a plurality of ligaments to reduce the axial stiffness that the lower flexures provide to the rotor.

Solutions (1) and (2) can be employed with the example embodiment shown in FIG. 2 and detailed in incorporated by reference U.S. Patent Application Publication No. 2005/0166726 A1. Solution (3) can be realized by the alternate example embodiments shown in FIG. 3 and FIG. 4 discussed below. The upper flexures 8 and lower flexures 12, as shown in FIG. 1 and FIG. 2 allows using the same mounting hardware for both (e.g. upper hub 35 and lower hub 36, as shown in FIG. 3, and outer clamping blocks 14, as shown in FIG. 2). Moreover, the stiffness of the radial and torsional constraints provided to the rotor 1, as shown in FIG. 1, by the lower flexures 12 is the same as the stiffness of the radial and torsional constraints provided by the upper flexures 8. In specifying a particular embodiment, a trade-off can be made between the advantages of having identical mounting hardware and the same radial and torsional constraint stiffness at both ends of the rotor against the disadvantages of having an over-constrained rotor.

Referring to FIG. 3, a lower flexure 37 can be configured with radial slots 38 cut into them to create a plurality of ligaments 39 to reduce the axial stiffness that the lower flexures provide to the rotor, now shown generally designated as reference numeral 31, compared to the higher axial stiffness that the upper flexures 32 provide to rotor 31. Rotor 31 is axially fixed by the upper flexures 32 and has a relaxed axial constraint from the lower flexures 37. The size of the slots 38 and number of ligaments 39 can be varied to adjust the stiffness characteristics of the lower flexures 37. The upper flexures 39 and lower flexures 37 both provide a radial constraint to the rotor, and together guide rotation of rotor 31 around an axis of rotation (denoted by the letter A). In this embodiment a differential axial length change of rotor 31 relative to the bottom portion 17 and top portion 18 of stator housing 16, as shown in FIG. 2, is accommodated by the reduced stiffness of the lower flexures 37, as shown in FIG. 3, and the stresses in all of the flexures are lower than in the case with identical upper and lower flexures, e.g., flexures 8 and 12 as shown in FIG. 1.

It is to be appreciated that the stiffness of the radial and torsional constraints provided to the rotor 31 of FIG. 3 by the lower flexures 37 is not the same as the stiffness of the radial and torsional constraints provided by the upper flexures 32, which can lead to additional vibration modes of the rotor compared to the case of identical upper and lower flexures 8 and 12 as shown in FIG. 1. Increasing the overall height of the lower flexure blades enables setting the total cross-sectional area of ligaments 39 to be equal to the cross-sectional area of upper flexures 32. In such an arrangement, the stiffness of the radial and torsional constraints provided to the rotor is substantially the same for the upper and lower sets of flexures. In specifying a particular embodiment, a trade-off can be made between the benefits of a less over-constrained rotor and identical mounting hardware against the deleterious effects of possible additional vibration modes.

Figure 4:
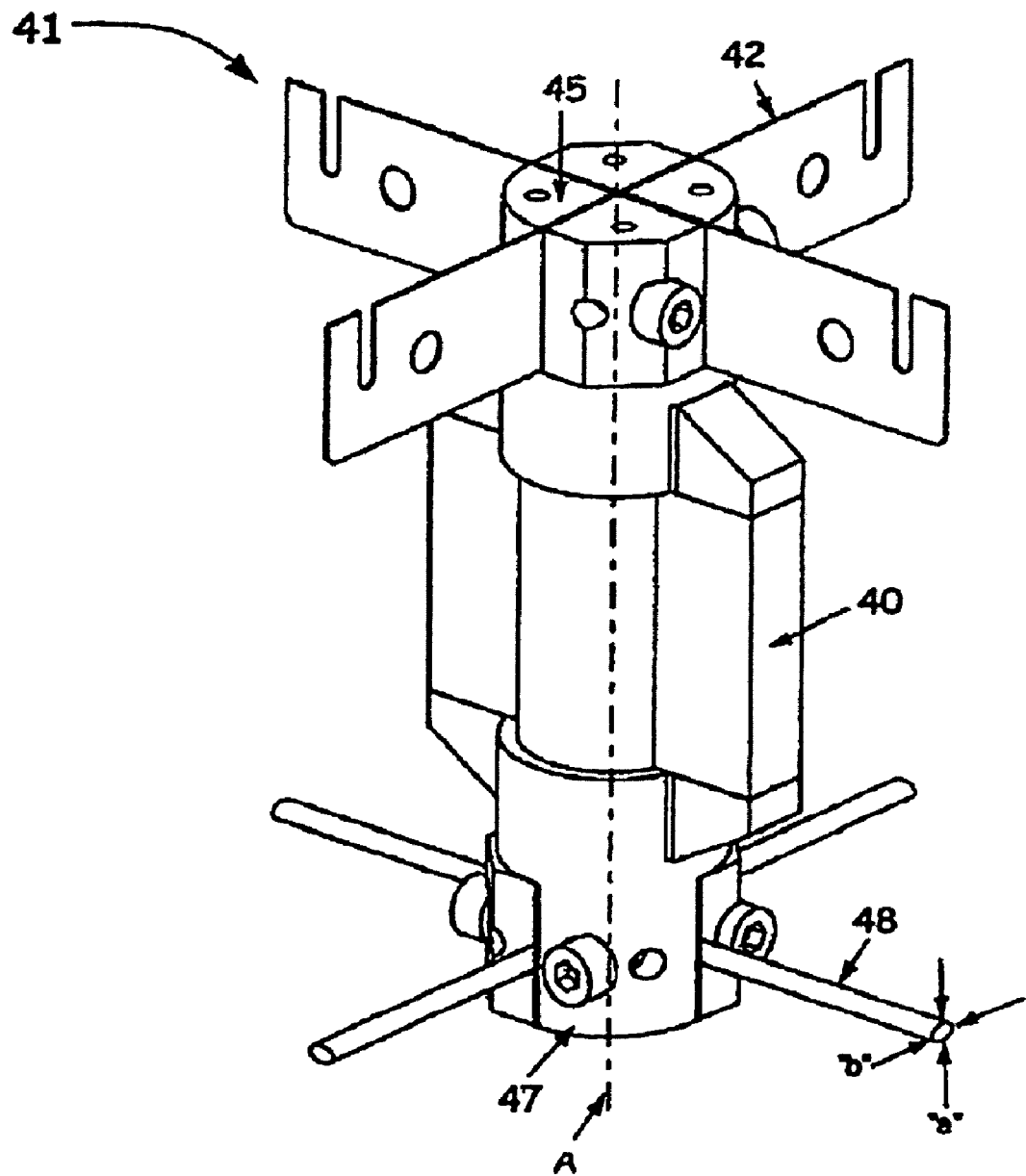
FIG. 4 shows an example of a rotor with lower flexures configured with an elliptical cross-section to reduce the axial stiffness that the lower flexures provide to the rotor.

FIG. 4 shows an example rotor arrangement, generally designated by reference numeral 41, wherein configured lower flexures 48 have an elliptical cross-section to reduce the axial stiffness that the lower flexures provide to the rotor 41 compared to the higher axial stiffness that the upper flexures 42 provide to the rotor. Rotor 41 can be axially fixed by upper flexures 42 and has a relaxed axial constraint from the lower flexures 48. Upper flexures 42 and lower flexures 48 both provide a radial constraint to rotor 41, and together guide rotation of rotor 41 around an axis of rotation (again shown denoted by the letter A).

In such an example embodiment, a differential axial length change of rotor 41 relative to bottom portion 17 and top portion 18 of the stator housings 16 and 18, as shown in FIG. 2, is accommodated by the reduced stiffness of lower flexures 48, and the stresses in all of the flexures are lower than in the case with identical upper and lower flexures, e.g., flexures 8 and 12 as shown in FIG. 1. The cross-section dimensions "a" and "b" of lower flexures 48 can be chosen so that the stiffness of the radial and/or torsional constraints provided to rotor 41 by lower flexures 48 is the same as the stiffness of the radial and torsional constraints provided by the upper flexures 42.

In an alternate example embodiment, lower flexures 48 can be configured with rectangular cross-sections. The lower flexures 48, whether having an elliptical cross-section or a rectangular cross-section, require different mounting hardware for fixing them to the rotor (e.g., a lower hub 47) and to the stator (not shown) than the mounting hardware for fixing upper flexures 42. Moreover, the present invention can be arranged to match the stiffness of the radial and/or torsional constraints provided to the rotor 41 by upper flexures 42 and lower flexures 48 so as to avoid/reduce the additional vibration modes of the rotor that arise in the example embodiment depicted in FIG. 3. In specifying a particular embodiment, a trade-off can be made between the benefits of a less over-constrained rotor against the deleterious effects of non-identical mounting hardware.

Figure 5:
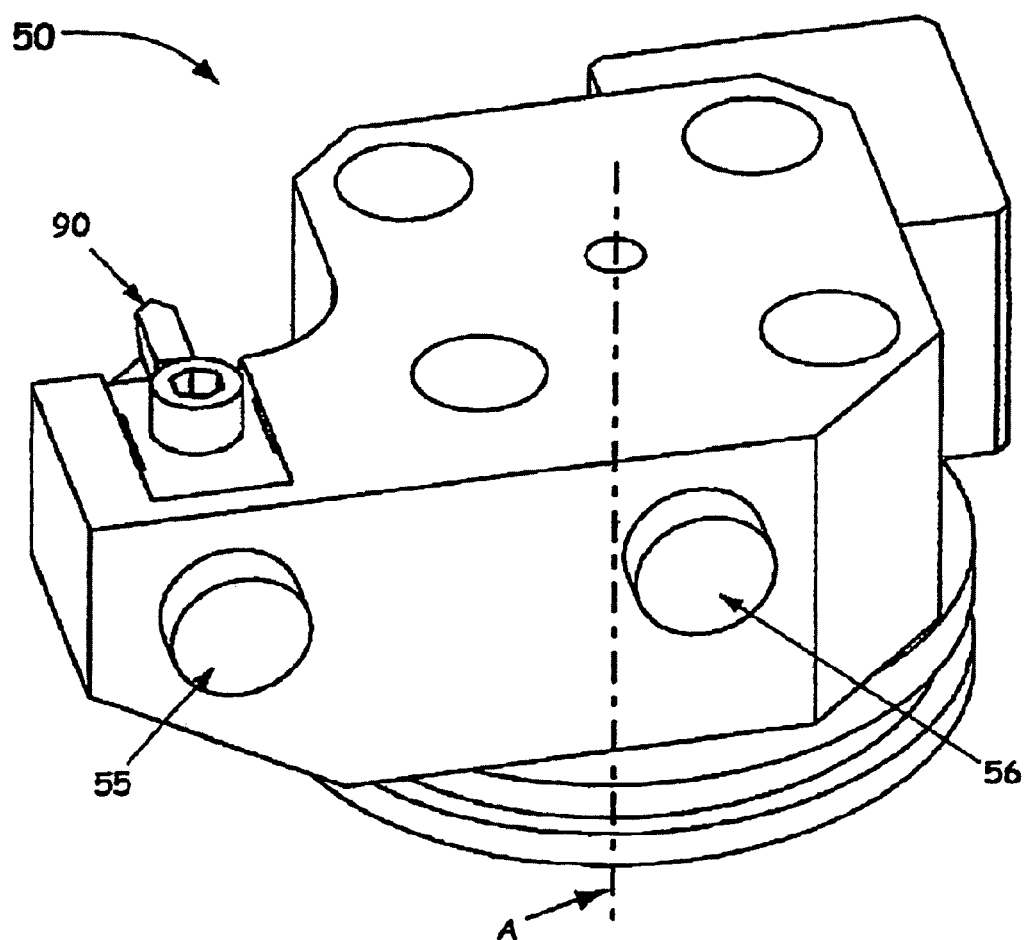
FIG. 5 shows an example of a swing arm shown with a first sensor target and a second sensor target.

Referring to FIG. 5, a swing arm, generally designated by reference numeral 50, is shown with a first sensor target 55 that is communicatively coupled to a first displacement sensor (not shown), and a second sensor target 56 that is communicatively coupled to a second displacement sensor (not shown). First sensor target 55 can be substantially displaced from an axis of rotation (again denoted by the letter A) and second sensor target 56 can be substantially aligned with axis of rotation A. From such an arrangement first sensor target 55 and its displacement sensor (not shown) provides information on the displacement of a tool 90 due to rotation and translation of swing arm 50. Second sensor target 56 and its displacement sensor (not shown) provides information on the displacement of the axis of rotation A. The information from the first sensor that is communicatively coupled to first sensor target 55 can be used by a control system (not shown) to control a rotation of the swing arm 50. The information from the second sensor that is communicatively coupled to second sensor target 56 can be used by a control system to control a displacement of the axis of rotation A. The information from the first sensor that is communicatively coupled to first sensor target 55 and the information from the second sensor that is communicatively coupled to second sensor target 56 can be used by a control system of the present invention to separate the displacement of tool 90 caused by a rotation of the swing arm 50 from the displacement of tool 90 caused by a displacement of the axis of rotation A.

It is well known to one of ordinary skill in the art that adding mechanical damping to a system can improve its controllability. Accordingly, viscous squeeze-film damping can be added to the rotor example embodiments 31 and 41 as respectively shown in FIGS. 3 and 4, by constraining a layer of viscous fluid in the air gaps (not shown) between the rotor (e.g., a rotor laminate stack) 30 and 40, as respectively shown in FIG. 3 and FIG. 4, and the stator pole faces (not shown).

In another beneficial embodiment, when swing arm 50, as shown in FIG. 5, is integrated with the rotor 31 or 41 of FIGS. 3 and 4, viscous squeeze-film damping can also be added to swing arm 50 by constraining a layer of viscous fluid in the air gaps (not shown) between one or both of the sensor targets 55 and 56, as shown in FIG. 5, and their respective sensor (not shown).

Figure 6:
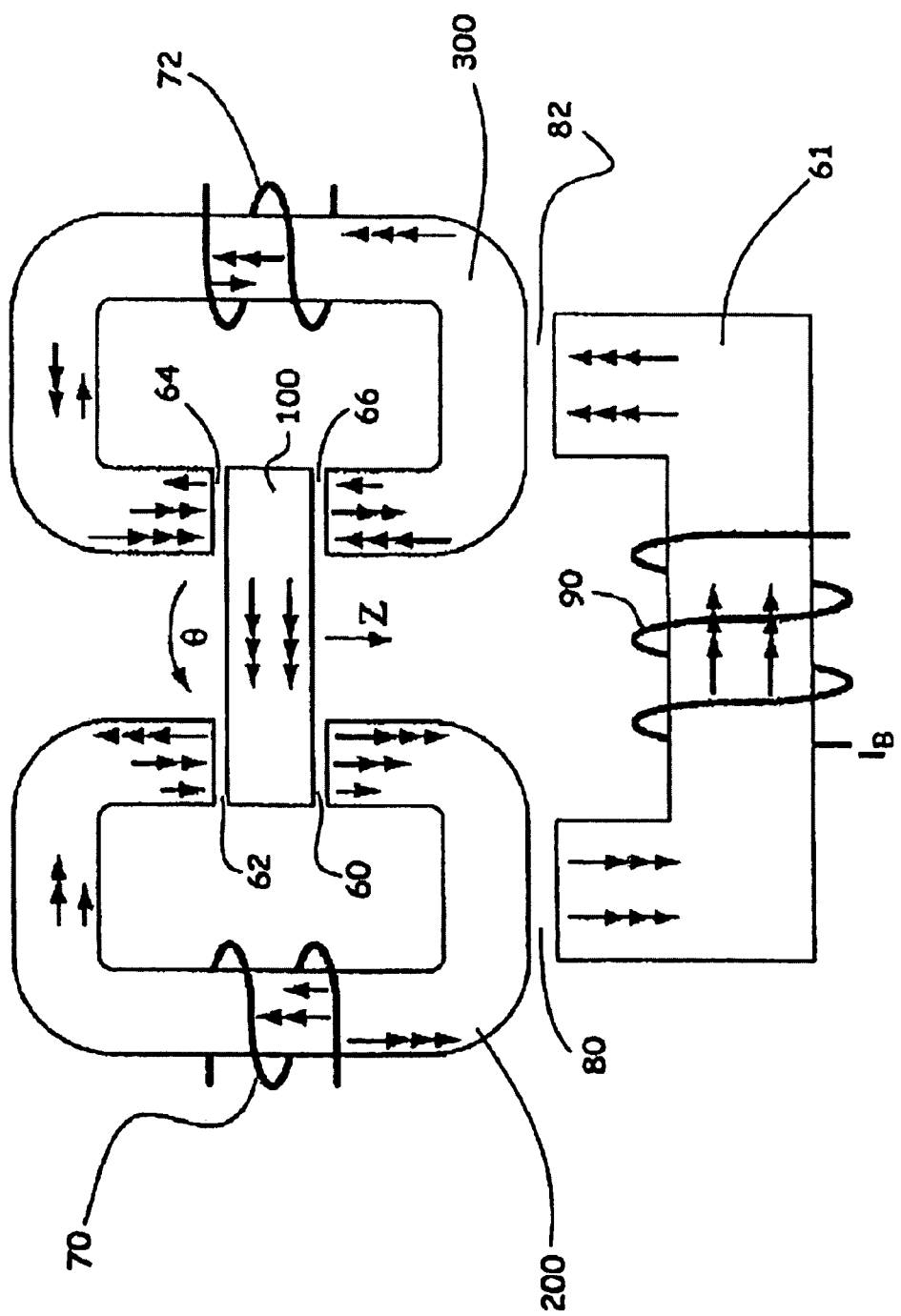
FIG. 6 shows an example of a magnetic circuit for a normal-stress variable reluctance actuator referred to as the "pinched rotor" design.

FIG. 6 shows a magnetic circuit for a normal-stress variable reluctance actuator referred to as the "pinched rotor" design because the magnetically permeable rotor 100 appears to be being pinched by the two magnetically permeable stator pieces 200 and 300. The bias flux coil 90 produces a magnetic flux that circulates in a bias flux path. The triple-headed arrows represent the bias flux.

For illustrative purposes consider that the bias flux path starts at bias flux coil 90, goes through the magnetically permeable back-iron 61 to the back-iron air gap 82, across air gap 82, through both legs of the stator piece 300 to air gaps 64 and 66, across air gaps 64 and 66, through rotor 100 to air gaps 60 and 62, across the air gaps 60 and 62, through both legs of the stator piece 200, across the back-iron air gap 80, and through the back-iron 61 to bias coil 90.

In a beneficial embodiment, the nominal length of the rotor-stator air gaps 60, 62, 64, and 66 are equal, the nominal cross-sectional area of the air gaps 60, 62, 64, and 66 are equal, and the lengths of the back-iron air gaps 80 and 82 are greater than the lengths of the rotor-stator air gaps 60, 62, 64, and 66.

One of ordinary skill in the art recognizes that the sections of rotor 100 and stator pieces 200 and 300 that are subjected to a time-varying magnetic flux are most often beneficially constructed from a laminated or powdered magnetic material with high permeability at the operating frequency of interest to reduce eddy current and magnetic hysteresis losses in the material.

To develop a torque on the rotor 100, as shown in FIG. 6, the first steering flux coil 70 is configured to produce a magnetic flux that circulates in a first steering flux path and the second steering flux coil 72 produces a nominally equal magnitude magnetic flux that circulates in a second steering flux path. The double-headed arrows, as shown in FIG. 6, represent the torque-producing flux in each stator piece.

For illustrative purposes consider that the first steering flux path starts at the steering coil 70, goes through the stator piece 200 to air gap 62, across air gap 62, through rotor 100 to air gap 60, across air gap 60, and through the stator piece 200 to the steering coil 70. Note that back-iron air gap 80 provides a high reluctance path to separate the first steering flux path from the bias flux path. Now consider that the second steering flux path starts at the steering coil 72, goes through the stator piece 300 to the air gap 64, across air gap 64, through the rotor 100 to air gap 66, across air gap 66, and through stator piece 300 to the steering coil 72. Again note that back-iron air gap 82 provides a high reluctance path to separate the second steering flux path from the bias flux path.

In an alternate embodiment, back-iron air gaps 80 and 82 can be replaced by a spacer having a low magnetic permeability to provide a high reluctance path to also separate the first steering flux path and the second steering flux path from the bias flux path.

In a beneficial embodiment, the bias flux and steering fluxes are designed to add in air gaps 60 and 64, and subtract in air gaps 62 and 66, producing a net torque on rotor 100 from the magnetic forces acting on it, resulting in the counterclockwise rotation (shown denoted by $\theta$ and an accompanying directional arrow) of the rotor shown in FIG. 6. Reversing the directions of the two steering fluxes reverses the direction of the torque acting on rotor 100 and hence its angular rotation $\theta$. Moreover, each of the steering flux coils 70 and 72 can be made up of one or more coils acting together or independently for producing a particular desired steering flux.

In another example beneficial embodiment, the steering fluxes (denoted by double arrows) are controlled by a closed-loop feedback control system that uses a measurement of the angular rotation $\theta$ for controlling rotation and for providing dynamic rotation stiffness to the rotor. As another arrangement, the steering fluxes are controlled by a closed-loop feedback control system that uses a measurement of the rotation $\theta$ for providing electronic damping to the rotational motion of the rotor.

In a beneficial embodiment, nominally unequal magnitude steering fluxes in the first and second steering flux paths can create a force on rotor 100 in FIG. 6, resulting in a translation along a linear direction (as denoted by the letter Z and a directional arrow). This can be accomplished by increasing the current in one of steering coils 70 or 72, or by decreasing the current in one of such steering coils, or by increasing the current in one of the steering coils and decreasing the current in the other steering coil. The single-head arrows represent the force-producing flux in each stator piece. In an example embodiment, the steering fluxes are controlled by a closed-loop feedback control system that uses a measurement of the translation Z for controlling that translation and providing dynamic translation stiffness to the rotor. In another arrangement, the steering fluxes are controlled by a closed-loop feedback control system that uses a measurement of the translation Z for providing electronic damping to the translation motion of the rotor.

Figure 7:
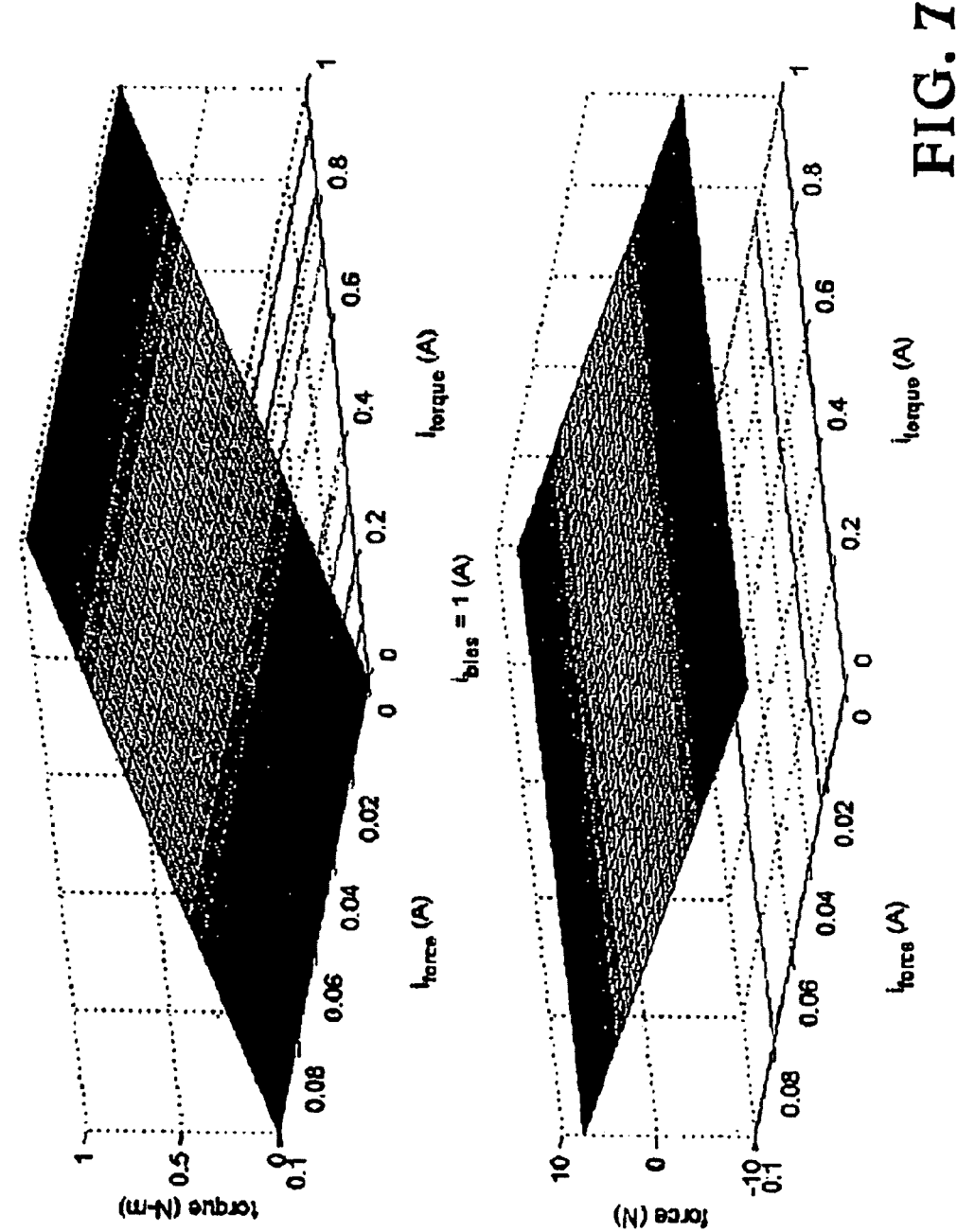
FIG. 7 illustrates a pair of graphs generated by an analysis of the magnetic forces and torques acting on the rotor in FIG. 6, and illustrates the two-direction independence of torque and force.

According to description above for the magnetic circuit in FIG. 6, the torque and force produced on the rotor are independent of each other: changing one nominally does not affect the other. FIG. 7 shows a pair of graphs generated by an analysis of the magnetic forces and torques acting on the rotor 100 in FIG. 6, and illustrates the two-direction independence of torque and force.

The magnetic circuit shown in FIG. 6 is a variation on the magnetic circuit for a normal-stress variable reluctance actuator that is taught in U.S. Patent Application Publication No. 2004/0035266 A1, entitled, "Rotary fast tool servo system and methods," by Richard C. Montesanti and David L. Trumper, and of which, is herein incorporated by reference in its entirety. The present invention improves upon the device described in US 2004/0035266 A1 by providing a high reluctance path for separating the steering flux and the bias flux when a coil is used to provide the bias flux.

It is well known to one of ordinary skill in the art that magnetic flux preferentially follows a low reluctance path instead of a high reluctance path. It is also well known that the reluctance of a path depends on the magnetic permeability of the material that the path is made of, and that the permeability for a magnetic material depends on the frequency of oscillation of the magnetic field. The high reluctance paths created by the back-iron air gaps 80 and 82, as shown in FIG. 6, substantially confine the steering flux to the steering flux paths, and the bias flux to the bias flux path, at the intended frequencies and ranges of motion for the actuator. Such high reluctance paths created by the back-iron air gaps 80 and 82 substantially separate the steering flux paths and the bias flux path, ensuring that the actuator generates a desired rotary motion for a particular set of currents in the steering flux coils, and ensures that the actuator generates a desired linear motion for a particular set of currents in the steering flux coils.

Moreover, the high reluctance paths created by the back-iron air gaps 80 and 82 magnetically decouples the two stator pieces 200 and 300, making it easier to independently control the steering magnetic flux in each stator piece. Independent control of the steering magnetic flux in each stator piece allows the creation of a controllable force on the rotor. In an example embodiment, the actuator is intended to operate at 10,000 cycles per second or greater. In another embodiment, the air gaps between the rotor and stator have a nominal length of about 50 micrometers, and the rotor makes contact with the stator during operation, closing at least one of the air gaps.

It is to be appreciated that in contrast to the similar but different arrangement of FIG. 6 of the present invention that is taught in US 2004/0035266 A1, the embodiment shown in FIG. 6 of this application allows easy adjustment of the bias flux; by changing the amount of electrical current flowing through the bias coil 90.

Figure 8:
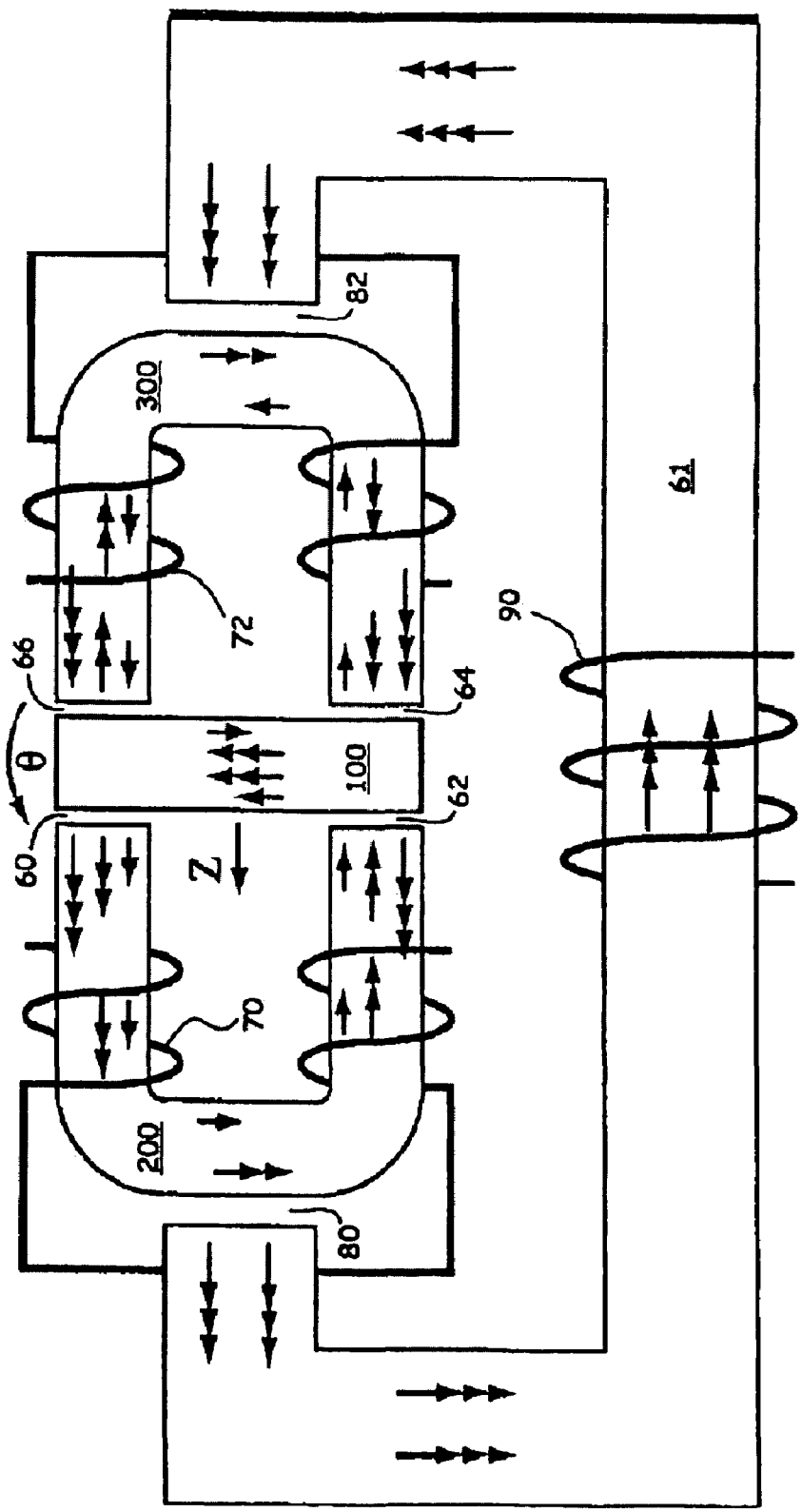
FIG. 8 shows an example of a magnetic circuit for a normal-stress variable reluctance actuator referred to as the "sandwiched rotor" design.

FIG. 8 shows a magnetic circuit for a normal-stress variable reluctance actuator referred to as the "sandwiched rotor" design because the magnetically permeable rotor 100 appears to be sandwiched between the two magnetically permeable stator pieces 200 and 300. The bias flux coil 90 produces a magnetic flux that circulates in a bias flux path. The triple-headed arrows represent the bias flux.

For illustrative purposes consider that the bias flux path starts at the bias coil 90, goes through the magnetically permeable back-iron 61 to the back-iron air gap 82, across air gap 82, through both legs of the stator piece 300 to air gaps 64 and 66, across air gaps 64 and 66, through rotor 100 to air gaps 60 and 62, across the air gaps 60 and 62, through both legs of the stator piece 200, across the back-iron air gap 80, and through the back-iron 61 to the bias coil 90.

As a beneficial arrangement, the nominal length of the rotor-stator air gaps 60, 62, 64, and 66 are equal, the nominal cross-sectional area of the air gaps 60, 62, 64, and 66 are equal, and the lengths of the back-iron air gaps 80 and 82 are greater than the lengths of the rotor-stator air gaps 60, 62, 64, and 66.

One of ordinary skill in the art recognizes that the sections of rotor 100 and stator pieces 200 and 300 that are subjected to a time-varying magnetic flux are most often beneficially constructed from a laminated or powdered magnetic material with high permeability at the operating frequency of interest to reduce eddy current and magnetic hysteresis losses in the material.

To develop a torque on rotor 100, as shown in FIG. 8, the first steering flux coil 70 produces a magnetic flux that circulates in a first steering flux path and the second steering flux coil 72 produces a nominally equal magnitude magnetic flux that circulates in a second steering flux path. The double-headed arrows represent the torque-producing flux in each stator piece.

For illustrative purposes consider that the first steering flux path starts at the steering coil 70, goes through the stator piece 200 to the air gap 62, across air gap 62, through the rotor 100 to air gap 60, across air gap 60, and through the stator piece 200 to the steering coil 70. Note that the back-iron air gap 80 provides a high reluctance path to separate the first steering flux path from the bias flux path.

For illustrative purposes consider that the second steering flux path starts at the steering coil 72, goes through the stator piece 300 to the air gap 64, across air gap 64, through the rotor 100 to air gap 66, across air gap 66, and through the stator piece 300 to the steering coil 72. Note that the back-iron air gap 82 provides a high reluctance path to separate the second steering flux path from the bias flux path. In an alternate embodiment, back-iron air gaps 80 and 82 can be replaced by a spacer having a low magnetic permeability to provide a high reluctance path to separate the first steering flux path from the bias flux path.

In a beneficial arrangement, the bias flux and steering fluxes are designed to add in air gaps 60 and 64, and subtract in air gaps 62 and 66, producing a net torque on the rotor 100 from the magnetic forces acting on it, resulting in the counterclockwise rotation θ of the rotor shown in FIG. 8. Accordingly, by reversing the directions of the two steering fluxes reverses the direction of the torque acting on the rotor 100 and hence its rotation θ. Moreover, each of the steering flux coils 70 and 72 can be made up of more than one coil acting together or independently for producing a particular desired steering flux.

As another arrangement, the steering fluxes can be controlled by a closed-loop feedback control system that uses a measurement of the rotation θ for controlling the rotation and for providing dynamic rotation stiffness to the rotor. Moreover, the steering fluxes can be controlled by a closed-loop feedback control system that uses a measurement of the rotation θ for providing electronic damping to the rotational motion of the rotor.

It is to be appreciated that nominally unequal magnitude steering fluxes in the first and second steering flux paths can create a force on the rotor 100 in FIG. 8, resulting in the translation Z. This can be accomplished by increasing the current in one of the steering coils 70 or 72, or by decreasing the current in one of the steering coils, or by increasing the current in one of the steering coils and decreasing the current in the other steering coil. The single-head arrows represent the force-producing flux in each stator piece. As one example embodiment, the steering fluxes can be controlled by a closed-loop feedback control system that uses a measurement of the translation Z for control for controlling that translation and providing dynamic translation stiffness to the rotor. As another arrangement, the steering fluxes can be controlled by a closed-loop feedback control system that uses a measurement of the translation Z for providing electronic damping to the translation motion of the rotor.

According to the example embodiment described above for the magnetic circuit in FIG. 8, the torque and force produced on the rotor are not independent of each other: changing the force nominally does not affect the torque, but changing the torque does affect the force.

Figure 9:
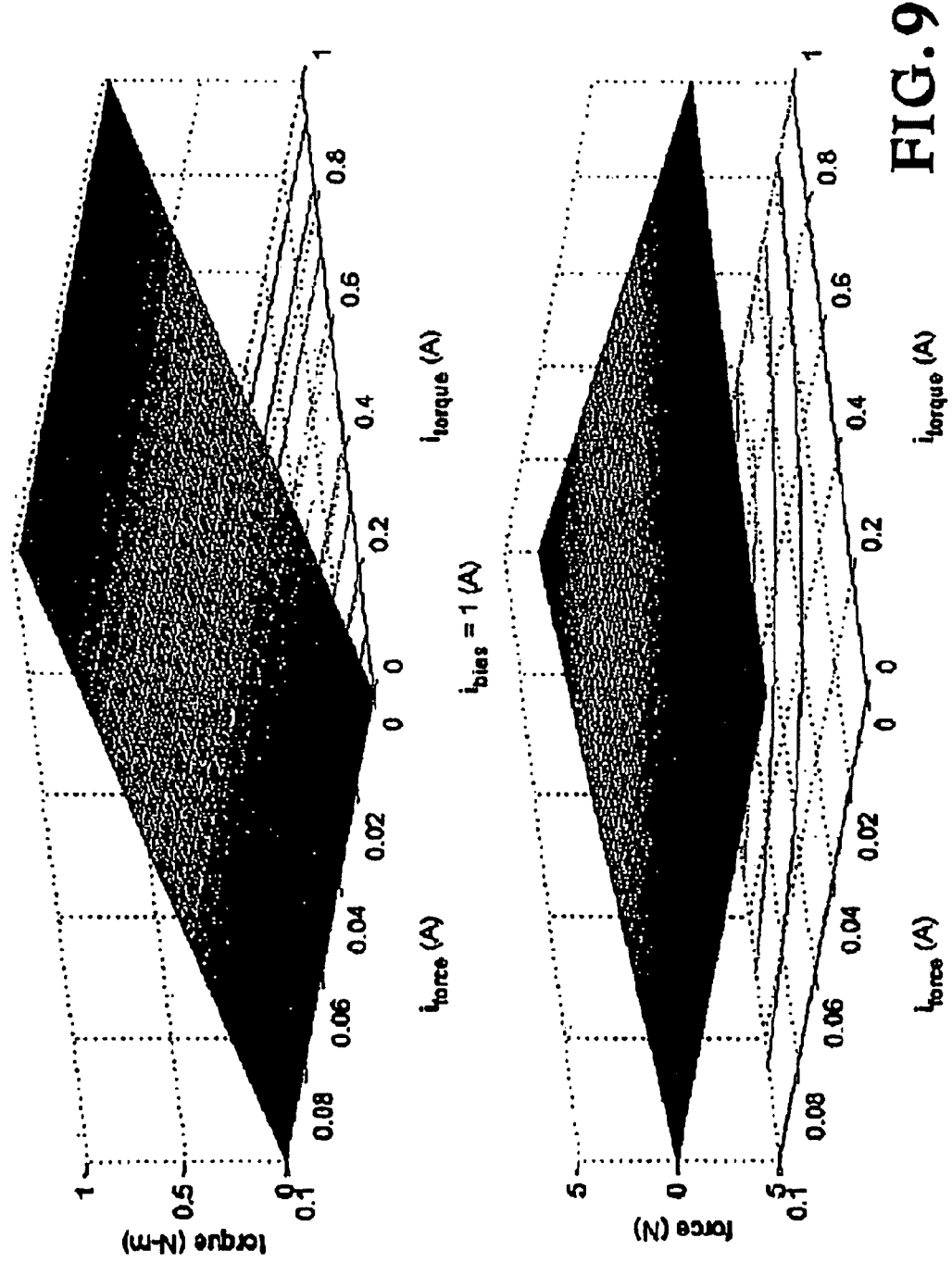
FIG. 9 illustrates a pair of graphs generated by an analysis of the magnetic forces and torques acting on the rotor of FIG. 8, and illustrates the one-direction dependence of force on torque.

FIG. 9 shows a pair of graphs generated by an analysis of the magnetic forces and torques acting on the rotor 100 of FIG. 8, and illustrates the one-direction dependence of force on torque. A force can be produced by the magnetic circuit in FIG. 8 as long as a torque is being produced by it. In practice, an external torque (not shown) needs to be maintained on the rotor 100 so that a torque producing flux can be present to act as an operating point for creating a force.

It is to be noted that FIG. 8 of the present invention shows an arrangement that is similar to a circuit disclosed in incorporated by reference U.S. Patent Application Publication No. 2005/0166726 A1. The present invention improves on such a disclosed circuit by configuring back-iron air gaps 80 and 82, as shown in FIG. 8, to provide a high reluctance path to separate the steering flux paths from the bias flux path when a bias coil 90 and back-iron 61 are used instead of at least one permanent magnet to provide the bias flux.

Figure 10:
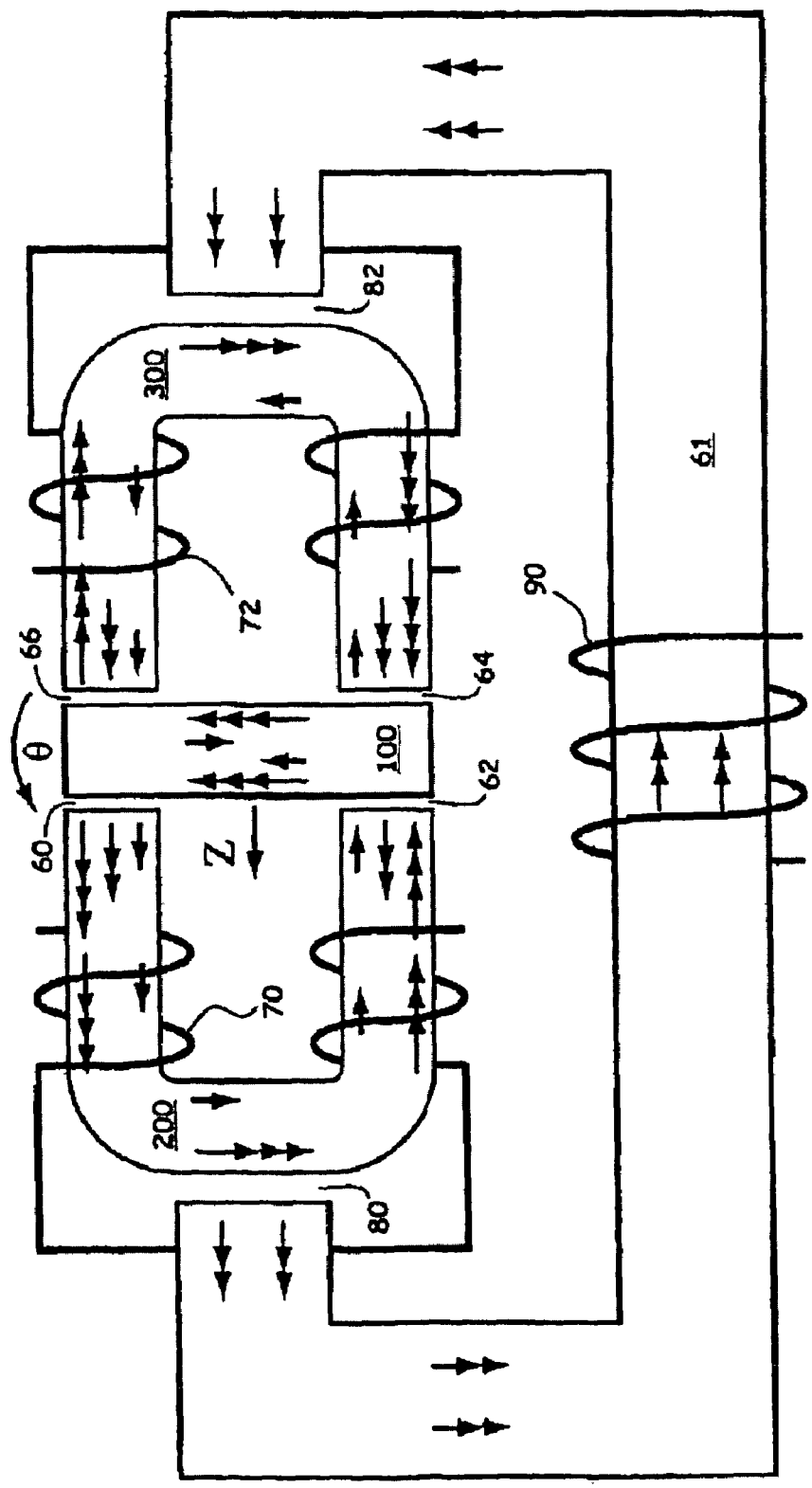
FIG. 10 shows an example of a magnetic circuit for a normal-stress variable reluctance actuator referred to as the "reversed roles sandwiched rotor" design.

FIG. 10 shows a magnetic circuit for a normal-stress variable reluctance actuator referred to as the "reversed roles sandwiched rotor" design because the magnetically permeable rotor 100 appears to be sandwiched between the two magnetically permeable stator pieces 200 and 300 and the roles of the coils and the nature of the flux paths for producing a torque on the rotor of FIG. 10 are reversed from the roles of the coils and flux paths as shown and as discussed above for the configuration of FIG. 8.

For FIG. 10, the first bias flux coil 70 produces a magnetic flux that circulates in a first bias flux path, and the second bias flux coil 72 produces a nominally equal magnitude bias flux that circulates in a second bias flux path. The triple-headed arrows represent the bias flux.

For illustrative purposes consider that the first bias flux path starts at bias coil 70, goes through the stator piece 200 to the air gap 62, across air gap 62, through the rotor 100 to air gap 60, across air gap 60, and through the stator piece 200 to bias coil 70. Note that the back-iron air gap 80 provides a high reluctance path to separate the first bias flux path from the torque flux path in the back-iron 61.

For illustrative purposes consider that the second bias flux path starts at bias coil 72, goes through the stator piece 300 to the air gap 64, across air gap 64, through the rotor 100 to air gap 66, across air gap 66, and through the stator piece 300 to the steering coil 72. Note that the back-iron air gap 82 provides a high reluctance path to separate the second bias flux path from the torque flux path in the back-iron 61. In an alternate embodiment the back-iron air gaps 80 and 82 can be replaced by a spacer having a low magnetic permeability to provide a high reluctance path to separate the first steering flux path from the bias flux path.

To develop a torque on rotor 100, as shown in FIG. 10 with the stated example embodiment, the torque flux coil 90 in FIG. 10 produces a magnetic flux that circulates in a torque flux path. The double-headed arrows represent the torque-producing flux.

For illustrative purposes consider that the torque flux path starts at the torque coil 90, goes through the magnetically permeable back-iron 61 to the back-iron air gap 82, across air gap 82, through both legs of the stator piece 300 to air gaps 64 and 66, across air gaps 64 and 66, through the rotor 100 to air gaps 60 and 62, across the air gaps 60 and 62, through both legs of the stator piece 200, across the back-iron air gap 80, and through the back-iron 61 to the torque coil 90.

In a beneficial embodiment, the nominal length of the rotor-stator air gaps 60, 62, 64, and 66 are equal, the nominal cross-sectional area of the air gaps 60, 62, 64, and 66 are equal, and the lengths of the back-iron air gaps 80 and 82 are greater than the lengths of the rotor-stator air gaps 60, 62, 64, and 66.

One of ordinary skill in the art recognizes that the sections of rotor 100 and stator pieces 200 and 300 that are subjected to a time-varying magnetic flux are most often beneficially constructed from a laminated or powdered magnetic material with high permeability at the operating frequency of interest to reduce eddy current and magnetic hysteresis losses in the material.

In an example embodiment, the bias flux and torque fluxes are designed to add in air gaps 60 and 64, and subtract in air gaps 62 and 66, producing a net torque on the rotor 100 from the magnetic forces acting on it, resulting in the counterclockwise rotation θ of the rotor shown in FIG. 10. Reversing the direction of the torque flux reverses the direction of the torque acting on the rotor 100 and hence its rotation θ. Moreover, each of the bias flux coils 70 and 72 can be made up of more than one coil acting together or independently for producing a particular desired bias flux.

In a beneficial example embodiment, the torque flux produced by torque coil 90 is controlled by a closed-loop feedback control system that uses a measurement of the rotation θ for controlling the rotation and providing dynamic rotation stiffness to the rotor. In another example embodiment, the torque flux is controlled by a closed-loop feedback control system that uses a measurement of the rotation θ for providing electronic damping to the rotational motion of the rotor.

It is to be appreciated with respect to the configuration shown in FIG. 10 that nominally unequal magnitude bias fluxes in the first and second bias flux paths can create a force on the rotor 100, resulting in a translation Z. Such a method can be accomplished by increasing the current in one of the bias flux coils 70 or 72, or by decreasing the current in one of the bias flux coils, or by increasing the current in one of the bias flux coils and decreasing the current in the other bias flux coil. The single-head arrows represent the force-producing flux in each stator piece.

In an example arrangement, the bias fluxes are controlled by a closed-loop feedback control system that uses a measurement of translation Z for controlling the translation and for providing dynamic translation stiffness to the rotor. In another arrangement, the bias fluxes are controlled by a control system that uses a measurement of translation Z for closed-loop feedback control for providing electronic damping to the translation motion of the rotor.

Figure 11:
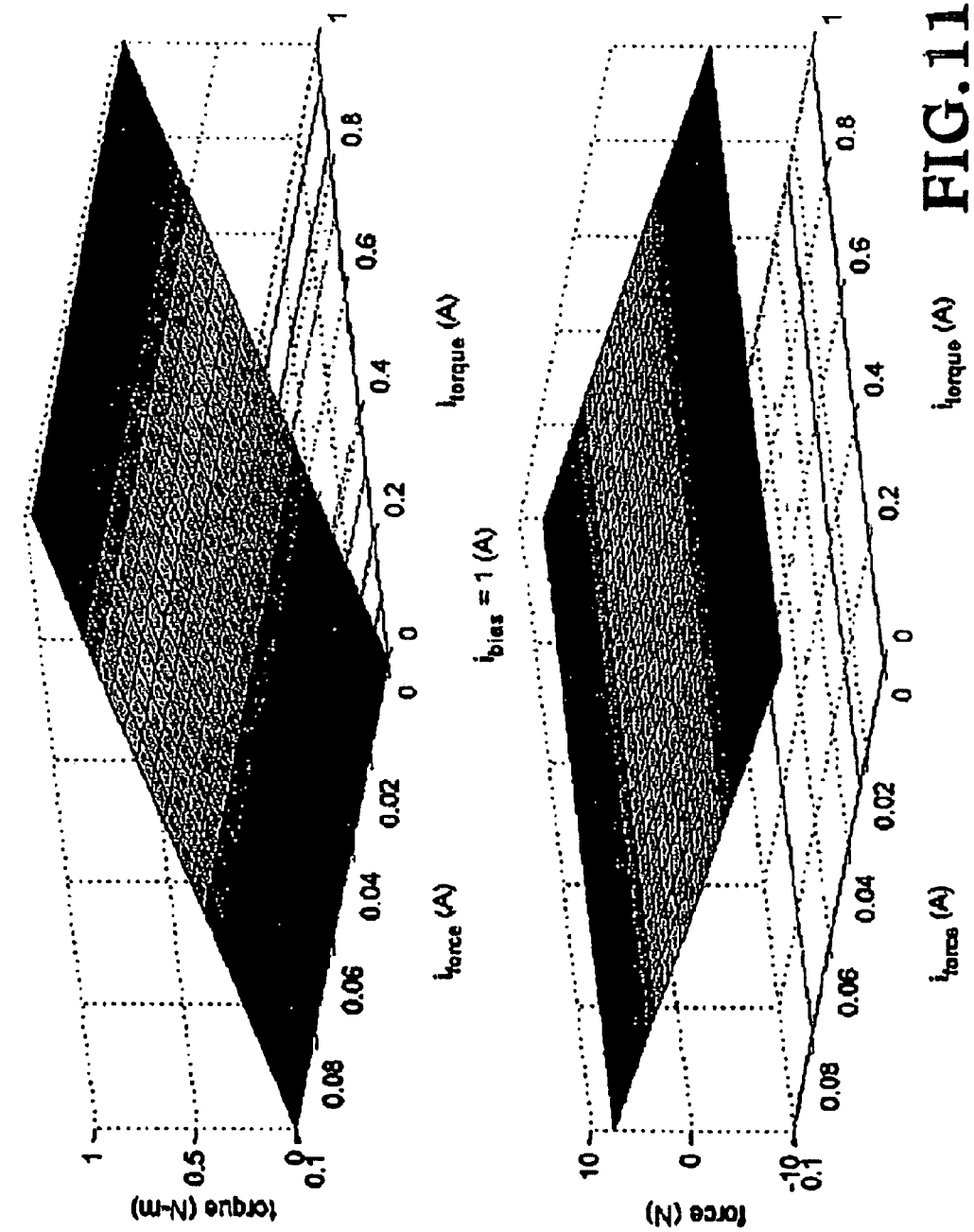
FIG. 11 illustrates a pair of graphs generated by an analysis of the magnetic forces and torques acting on the rotor in FIG. 10, and illustrates the two-direction independence of torque and force.

According to description above for the magnetic circuit of FIG. 10, the torque and force produced on the rotor are independent of each other: changing one nominally does not affect the other. FIG. 11 shows a pair of graphs generated by an analysis of the magnetic forces and torques acting on the rotor 100 in FIG. 10, and illustrates the two-direction independence of torque and force.

FIG. 12 provides a comparison of the pros and cons of the magnetic circuits shown in FIGS. 6, 8, and 10; suggesting reasons for preferring one over the other for a particular application.

Figure 13:
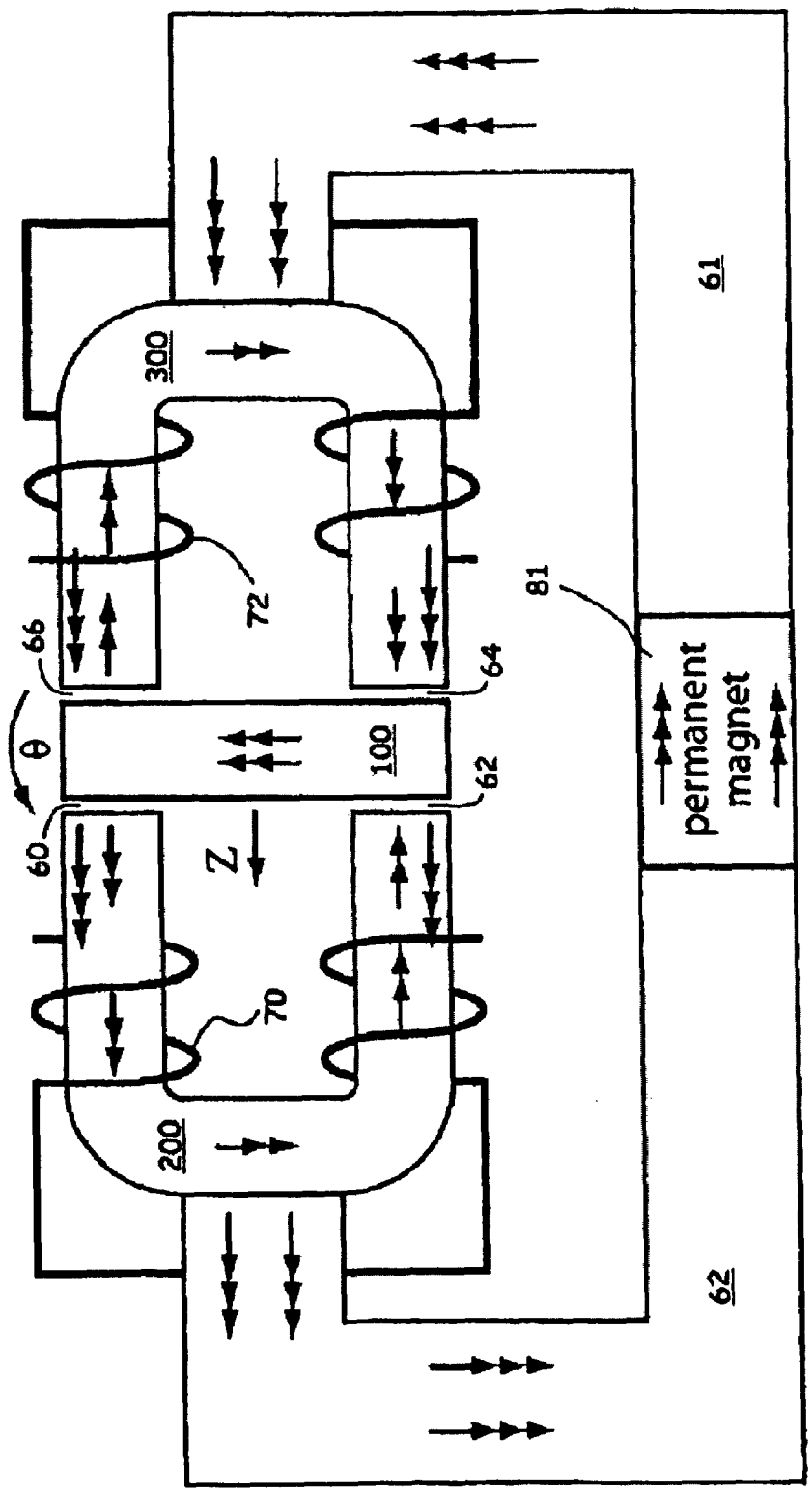
FIG. 13 shows an example of a variation of the magnetic circuit of FIG. 8, with a permanent magnet used to provide the bias flux.

FIG. 13 shows a variation of the magnetic circuit of FIG. 8, with a permanent magnet 81 used to provide the bias flux and create a high reluctance path in the back-iron 61 and 62 (all other reference numerals are the same as shown in FIG. 8). It is to be noted that one of ordinary skill in the art understands that certain high strength permanent magnets have a low magnetic permeability approaching that of free space, and therefore the permanent magnet 81 replaces the function of the air gaps 80 and 82, as shown in FIG. 8, which are not present in FIG. 12.

Figure 14:
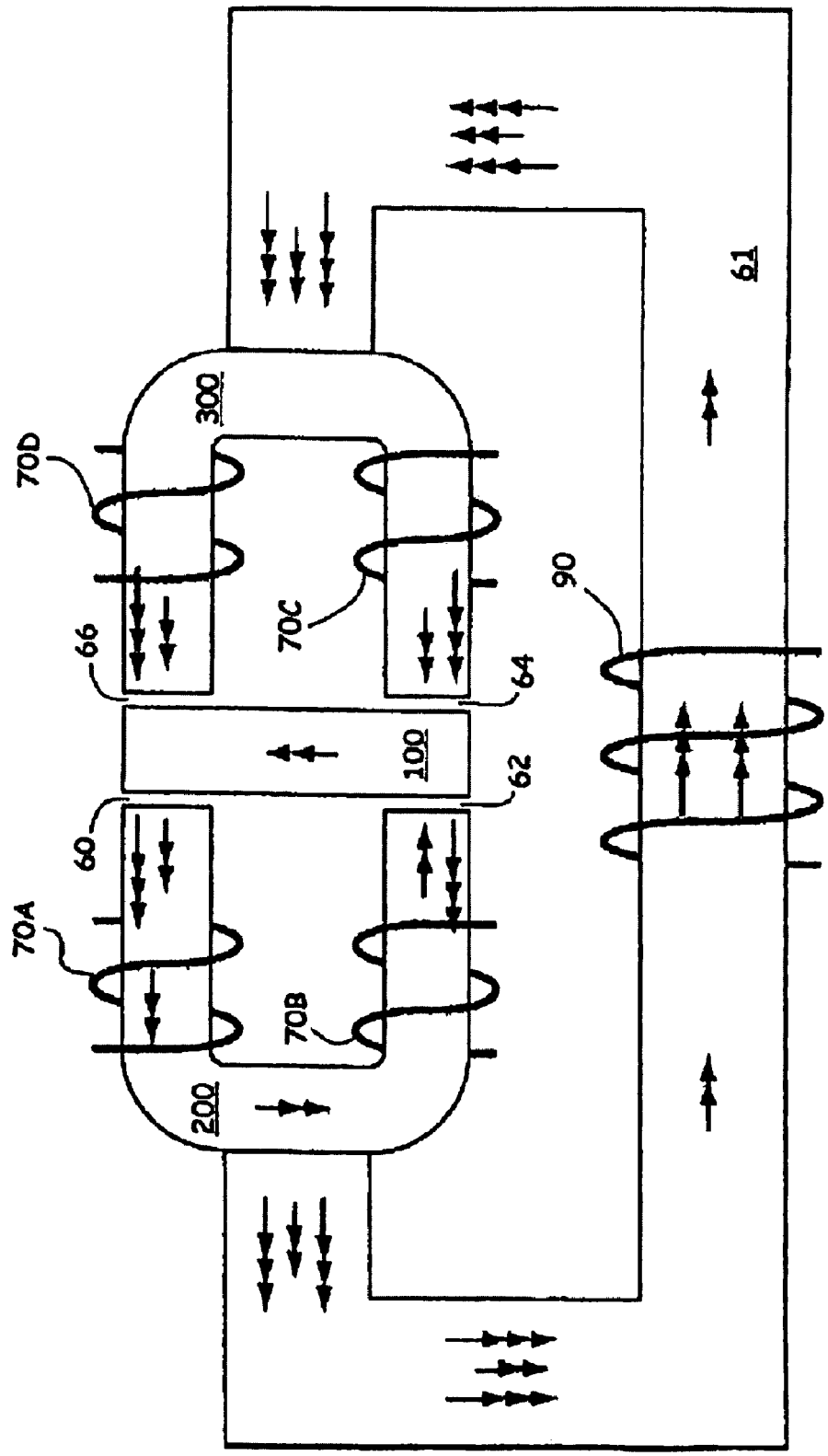
FIG. 14 shows a modification of the magnetic circuit of FIG. 8, with the back-iron air gaps removed to illustrate what happens when a high reluctance path is not included in the high magnetically-permeable back-iron.

FIG. 14 shows another modification of the magnetic circuit of FIG. 8, with the back-iron air gaps 80 and 82 removed to illustrate what happens when a high reluctance path is not included in the high magnetically-permeable back-iron 61. When an alternating current is applied to coil 70A, an alternating magnetic flux can be produced primarily in two paths. The first path comprises the first stator piece 200, the air gap 62, the rotor 100, and the air gap 60 back to the stator piece 200. The second path comprises the first stator piece 200, the back-iron 61, the two legs of the second stator piece 300, across air gaps 64 and 66, through rotor 100, and across air gap 60 back to the first stator piece 200. One of ordinary skill in the art readily recognizes that if the stator pieces 200 and 300 and the back-iron 61 are made of a high magnetically-permeable material, then current 70A can produce a significant magnetic flux in the first and second paths, which can couple with coils 70B, 70C, and 70D and induce an alternating current in them.

A comparison of FIG. 8, FIG. 10, and FIG. 14 illustrates how the high reluctance paths provided by the back-iron air gaps 80 and 82, e.g., as shown in FIG. 8, decrease the coupling between alternating electrical currents flowing through coils 70 and 72. Referring to FIG. 8, when an alternating current is applied to coil 70, an alternating magnetic flux can be produced primarily in a path comprising the first stator piece 200, the air gap 62, the rotor 100, and the air gap 60 back to the stator piece 200. A second flux path exists in this case, comprising the first stator piece 200, across the air gaps 62 and 64 via the rotor 100, through the second stator piece 300, across the air gaps 66 and 60 via the rotor 100, and back to the first stator piece 200. One of ordinary skill in the art recognizes that the flux induced by current introduced into coil 70 in the second path can be substantially less than the flux induced by current introduced in the first path because of the higher reluctance of the second path due to a nominal doubling of the air gaps in the second path, and therefore the alternating current induced in coil 72 is less than the current applied to coil 70. A similar argument exists for describing what happens when an alternating current is applied to coil 70. A third flux path exists in this case, comprising the first stator piece 200, across the back-iron air gap 80, through the back-iron 61, across the back-iron air gap 82, through the two legs of the second stator piece 300, across the air gaps 64 and 66, through the rotor 100, and across air gap 60 back to the first stator piece 200. Those of ordinary skill in the art readily recognizes that the flux induced by current in the third path induces an alternating current in coil 72 when the induced flux in the two legs of stator piece 300 is not balanced, as would be the case when the lengths of rotor-stator air gaps 64 and 66 are not equal, or when coil 72 includes two separate coils with one on each leg of stator piece 300. Moreover, one of ordinary skill in the art also recognizes that the flux induced by current in the third path can be made significantly less than the flux in the first path by setting the lengths of the back-iron air gaps 80 and 82 to be significantly longer than the lengths of the rotor-stator air gaps 60, 62, 64, and 66. Therefore, the back-iron air gaps 80 and 82 create a high reluctance path in the back-iron 61 that magnetically decouples the stator pieces 200 and 300 when a coil is used to provide the bias flux. Those practiced in the art also recognize that the difficulty of independently controlling the currents in coils 70 and 72 decreases when the magnetic coupling between the stator pieces 200 and 300 decreases.

Figure 15:
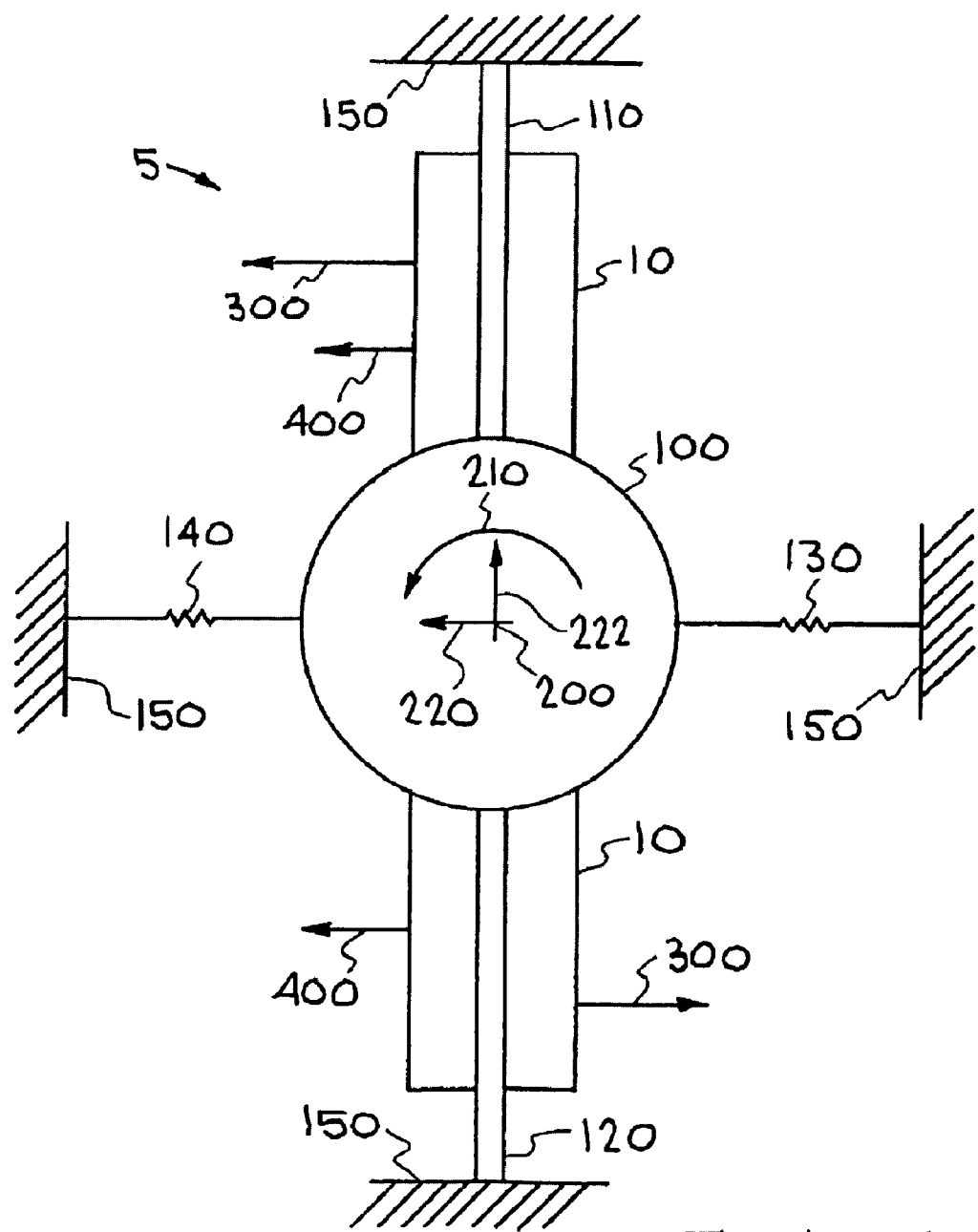
FIG. 15 shows the top view of a first reduced-flexure rotor assembly that can be employed as the rotor in the magnetic circuits shown in FIG. 6, 8, 10, or 13.

FIG. 15 shows the top view of a rotor assembly 5 that can be employed as the rotor 100 in the magnetic circuits shown in FIG. 6, 8, 10, or 13. Similar in construction to the rotor 1 in FIGS. 1 and 2, rotor assembly 5 in FIG. 15 includes of a rotor core 10 coupled to at least an upper flexure hub 100 that in turn is connected to at least two flexure blades 110 and 120 that are fixed at their outer ends to a base 150. One of ordinary skill in the art recognizes that as drawn, the two flexure blades in FIG. 15 substantially constrain only two of the three translation degrees of freedom of the rotor: one in the direction 222, and a second in a direction in and out of the plane of the page and denoted by the centerline 200. Those of ordinary skill in the art further recognize that rotor core 10 is substantially free to rotate in the direction 210 about the centerline 200, and that the centerline 200 is not constrained in the translation direction 220 by the flexure blades 110 and 120. In a beneficial embodiment, rotor assembly 5 is employed as the rotor discussed above in any of the magnetic circuits shown in FIGS. 6, 8, 10, or 13, which are all capable of producing a torque on the rotor via the two forces 300 to cause the rotation 210, and are all capable of producing a force to provide the rotor a dynamic stiffness and electronic damping to control its displacement in the translation direction 220 when the two forces 400 on the rotor are controlled by a control system that uses the translational displacement 220 for closed-loop feedback control.

Recall from the earlier discussion that the magnetic circuit in FIG. 8 requires that an external torque (not shown) be maintained on rotor 100 so that a torque producing flux is present to act as an operating point for creating a force. Turning back to FIG. 15, the helper spring elements 130 and 140 are fixed at their outer ends to a base 150 and are connected to the at least upper flexure hub 100. Spring elements 130 and 140 can be used to augment the dynamic stiffness provided to rotor core 10 in the translation direction 220. In one extreme case the spring elements 130 and 140 are not present and all of the stiffness in the translational direction 220 is provided by an actuator operating in accordance with FIG. 6, 8, 10, or 13. In another extreme case the spring elements 130 and 140 are replaced with flexure blades identical to 110 and 120, and the rotor assembly becomes the same as rotor assembly 31 and 41, as respectively shown in FIGS. 3 and 4.

Figure 16:
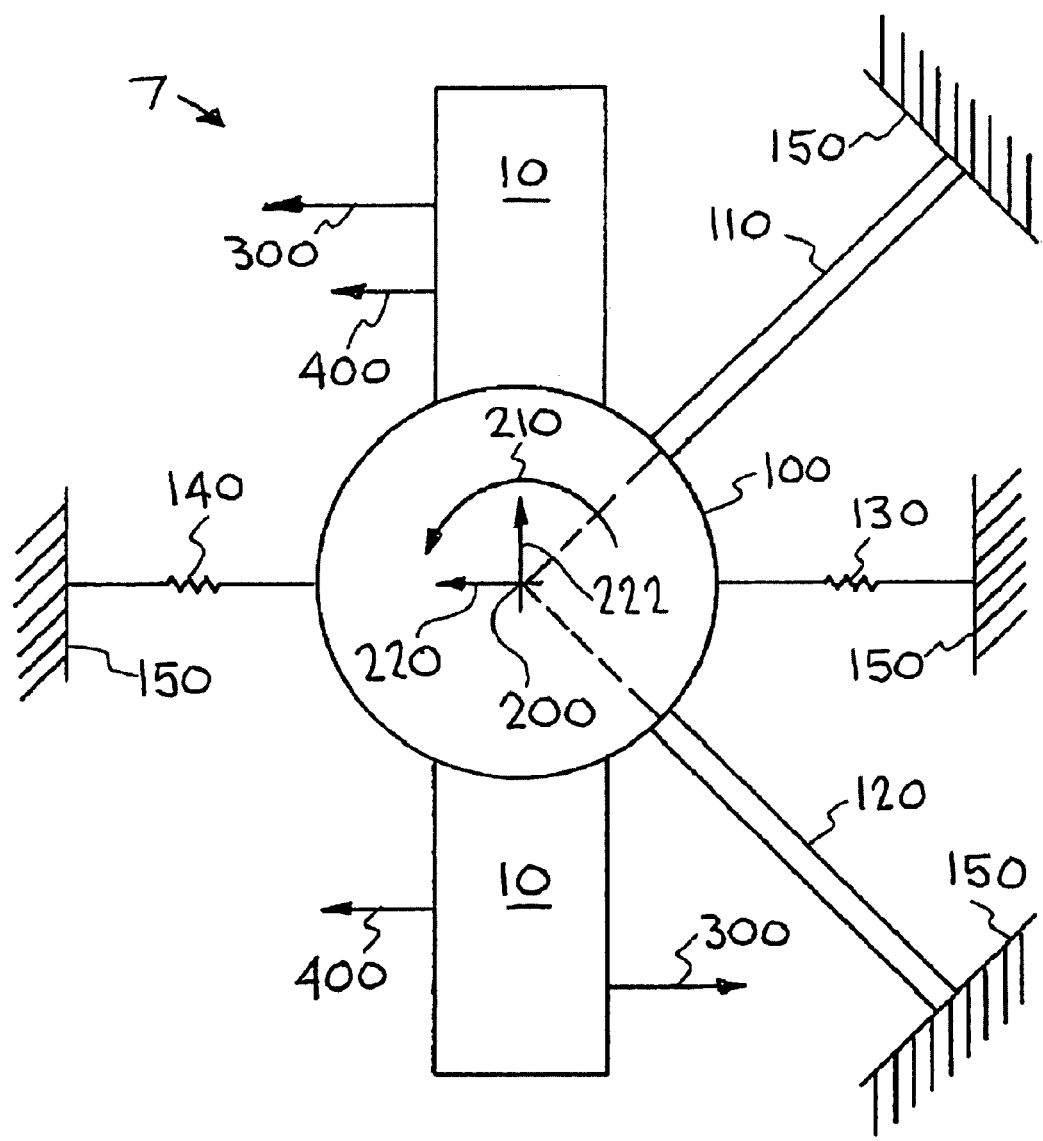
FIG. 16 shows the top view of a second reduced-flexure rotor assembly that can be employed as the rotor in the magnetic circuits shown in FIG. 6, 8, 10, or 13.

FIG. 16 shows a first variation of the rotor assembly 5 shown in FIG. 15. In FIG. 16 the flexure blades 110 and 120 are oriented to substantially constrain the three translation degrees of freedom of a rotor core 10. Here, rotor core 10 is substantially free to rotate in the direction 210 about a centerline 200, and that centerline 200 can wander in the translation directions 220 and 222 when the rotor is rotated in the direction 210. In an example embodiment, the rotor assembly 5 is employed as the rotor 100 in any of the magnetic circuits shown in FIG. 6, 8, 10 or 13, which are all capable of producing a torque on the rotor via the two forces 300 to cause the rotation 210, and are all capable of producing a force to provide the rotor a dynamic stiffness and electronic damping to control its displacement in the translation direction 220 when the two forces 400 on the rotor are controlled by a control system that uses the translational displacement 220 for closed-loop feedback control.

In the case of the rotor assembly 7 shown in FIG. 16, motion of rotor core 10 in the translation direction 222 is not controlled by an actuator operating in accordance with FIG. 6, 8, 10 or 13. Spring elements 130 and 140 can be used to augment the dynamic stiffness provided to rotor core 10 in the translation direction 220, and are discussed in the description for FIG. 15.

Figure 17:
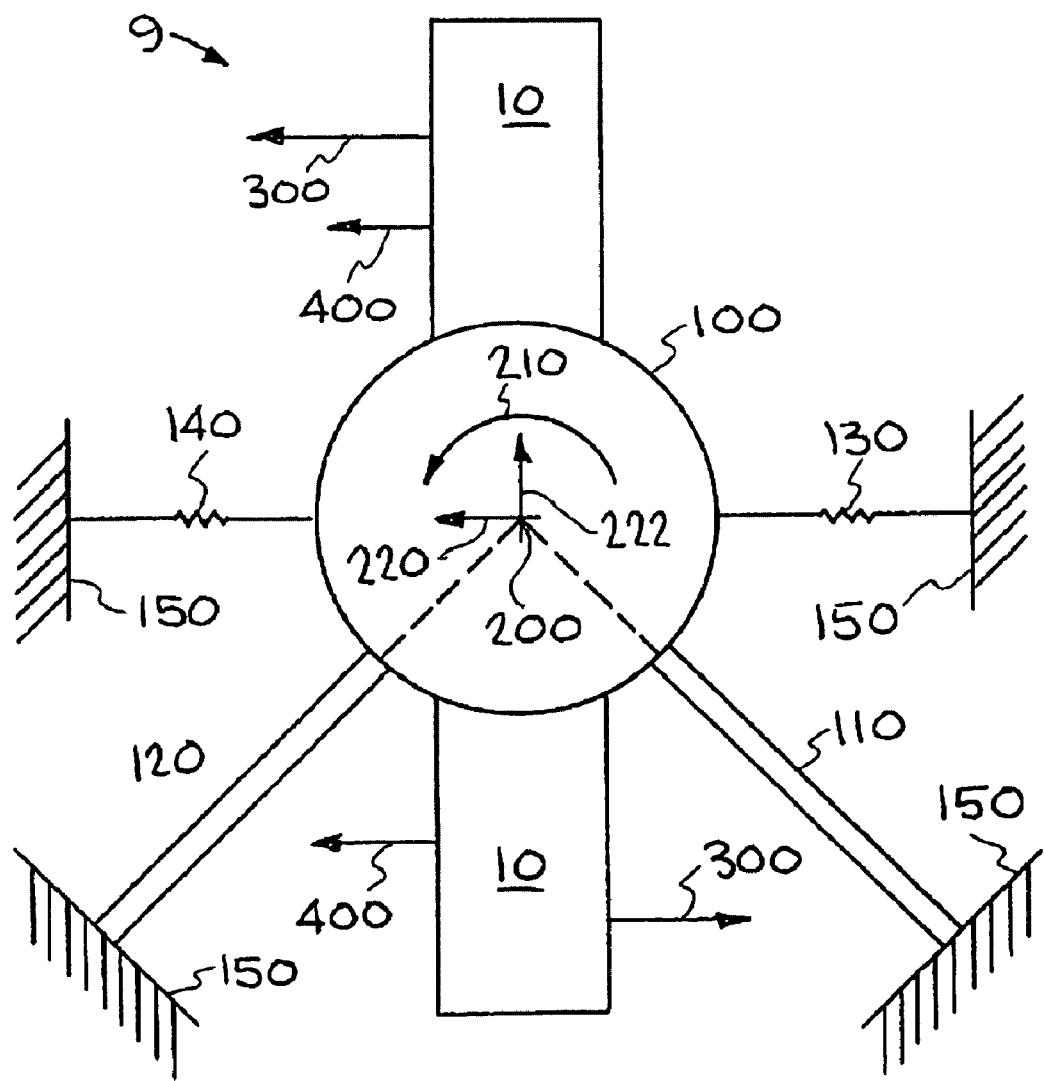
FIG. 17 shows the top view of a third reduced-flexure rotor assembly that can be employed as the rotor in the magnetic circuits shown in FIG. 6, 8, 10, or 13.

FIG. 17 shows a second variation of the rotor assembly 5 shown in FIG. 15. In FIG. 17 flexure blades 110 and 120 are oriented to substantially constrain the three translation degrees of freedom of rotor core 10. One of ordinary skill in the art recognizes that rotor core 10 is substantially free to rotate in the direction 210 about the centerline 200, and that centerline 200 can wander in the translation directions 220 and 222 when the rotor is rotated in the direction 210. In an example beneficial embodiment, rotor assembly 9 is employed as the rotor in any of the magnetic circuits shown in FIG. 6, 8, 10 or 13, which are all capable of producing a torque on the rotor via the two forces 300 to cause the rotation 210, and are all capable of producing a force to provide the rotor a dynamic stiffness and electronic damping to control its displacement in the translation direction 220 when the two forces 400 on the rotor are controlled by a control system that uses the translational displacement 220 for closed-loop feedback control. In the case of the rotor assembly 9, as shown in FIG. 17, motion of rotor core 10 in the translation direction 222 is not controlled by an actuator operating in accordance with FIG. 6, 8, 10 or 13. Spring elements 130 and 140 can be used to augment the dynamic stiffness provided to rotor core 10 in the translation direction 220, and are discussed in the description for FIG. 15.

Taken together, FIGS. 15, 16, and 17 represent three possible arrangements of at least two flexure blades 110 and 120 and optional at least two helper springs 130 and 140 for providing a bearing for a rotor core 10. Those of ordinary skill in the art recognize that a continuum exists for the possible angles between the flexure blades 110 and 120 and for the possible angles between the flexure blades and rotor core 10.

Figure 18:
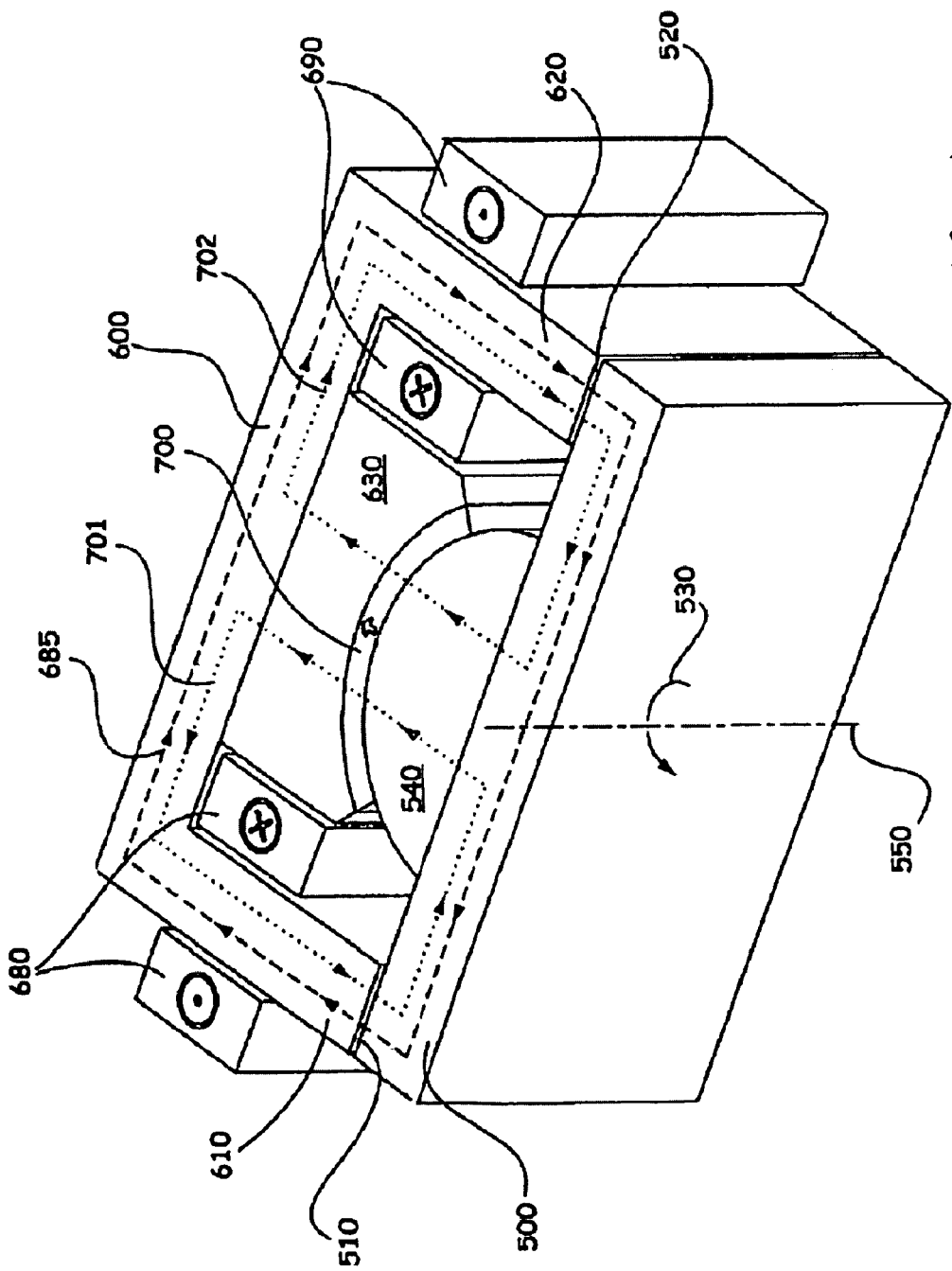
FIG. 18 shows a simple, potentially low-cost, rotary actuator that uses a rubber sheet permanent magnet to produce a bias flux, separate the steering flux path from the bias flux paths, and to form a bearing between the rotor and the stator.

FIG. 18 shows a simple, potentially low-cost, rotary actuator that uses a rubber sheet permanent magnet 700 to produce a bias flux, to separate the steering flux path 685 from the bias flux paths 701 and 702, and to form a bearing between the rotor 500 and the stator 600. The arrow shown on the rubber sheet permanent magnet 700 indicates the north-pole direction. Note the large potential work zone at the front face of the rotor 500. If the actuator is used in a fast tool servo, then the cutting tool can be arranged to engage a large workpiece. Alternatively, if the actuator is used to rotate an optical element, that optical element can be made integral with the exposed front face of the rotor or mounted directly to it. Potential optical elements include a reflective element, e.g., a mirror configured with a flat, concave, convex, or complex surface, a refractive element, or a diffractive element.

A rubber sheet permanent magnet is a sheet of elastic material that has permanent magnet properties. For example, a rubber sheet magnet can be up to and/or greater than about a 0.5 mm thick layer of rubber impregnated with particles of ceramic permanent magnet that are oriented in a common direction. For a beneficial embodiment, rubber sheet permanent magnet 700, stator central pole 630, and rotor central pole 540 have mating curved surfaces that have a common center on the axis of rotation 550 of rotor 500. In another beneficial embodiment, rubber sheet permanent magnet 700 can be made up of multiple layers of rubber sheet permanent magnets and high magnetic permeability material, and the particular composition and thickness of the layers is chosen to achieve desired mechanical and magnetic properties of rubber sheet permanent magnet 700. One of ordinary skill in the art can recognize that if the axis of rotation 550 is chosen so that it passes through the combined center of mass of the moving elements 500 and 540, then the moving elements may not develop a linear acceleration and attendant reaction force.

The use of one or more rubber sheet permanent magnets provide a source of magnetic flux that flows through two elements, to separate a steering flux path from a bias flux path, and to form a bearing between those two elements. A significant aspect of a rubber sheet bearing as utilized herein is that it can tolerate the compressive stress that results from the attraction of a rotor and stator in certain magnetic circuit topologies. This allows considering magnetic topologies such as the one shown in FIG. 18, which can be difficult to realize if flexure blades were used (as shown in FIGS. 3 and 4) because of their intolerance to compressive stresses.

For a beneficial and desired embodiment of the device shown in FIG. 18, the bias flux paths 701 and 702 start at the rubber sheet permanent magnet 700, enter the magnetically permeable stator 600 at the stator central pole 630, split and circulate through the stator to the left stator pole 610 and right stator pole 620, cross the air gaps 510 and 520 to enter the magnetically permeable rotor 500, travel through the rotor to the rotor central pole 540, and return to the rubber sheet permanent magnet 700. In an example embodiment, the lengths of the air gaps 510 and 520 are equal, and the cross-sectional area of the air gaps 510 and 520 are equal. Those of ordinary skill in the art recognizes that the sections of the rotor 500 and stator 600 that are subjected to a time-varying magnetic flux are most often beneficially constructed from a laminated or powdered magnetic material with high permeability at the operating frequency of interest to reduce eddy current and magnetic hysteresis losses in the material.

To develop a torque on the rotor 500 in FIG. 18, the first steering flux coil 680 and the second steering flux coil 690 are arranged to produce magnetic flux that circulates in a common steering flux path 685. The steering flux path starts at the first steering coil 680 in the left stator pole 610, goes through the stator 600 to the right stator pole 620, through the second steering flux coil 690 to the air gap 520, across the air gap 520 to the rotor 500, through the rotor 500 to the air gap 510, across the air gap 510 to the left stator pole 610, and returns to the first steering coil 680. Note that the rubber sheet permanent magnet 700 extends across substantially the entire width of the stator central pole 630 and the rotor central pole 540, and is significantly thicker than the nominal length of the left rotor-stator air gap 510 and right rotor-stator air gap 520. Therefore, the rubber sheet permanent magnet provides a high reluctance path that substantially prevents the steering flux from flowing across the space between the central poles of the stator and rotor, separating the steering flux path 685 from the bias flux paths 701 and 702. In a beneficial embodiment just described, the bias flux and steering fluxes are configured to add in air gap 520 and subtract in air gap 510, producing a net torque on the rotor 500 from the magnetic forces acting on it, resulting in the counterclockwise rotation 530 of the rotor around the axis of rotation 550 shown in FIG. 131. Note that the flux addition and subtraction in the outer air gaps 510 and 520 does not appreciably change the magnitude of the net magnetic force acting on the rotor, but it does cause a lateral shift of that force. One of ordinary skill in the art recognizes that reversing the direction of the steering flux 685 can reverse the direction of the torque acting on the rotor 500 and hence its rotation 530, and that each of the steering flux coils 680 and 690 can be made up of more than one coil acting together or independently for producing a particular desired steering flux. In a beneficial embodiment, the steering flux is controlled by a control system that uses a measurement of the rotation 530 for closed-loop feedback control for controlling that rotation and providing dynamic rotation stiffness to the rotor. In another example beneficial embodiment, the steering flux is controlled by a control system that uses a measurement of the rotation 530 for closed-loop feedback control for providing electronic damping to the rotational motion of the rotor.

Typical rubber sheet permanent magnets have a low remanent flux of approximately 0.1 Tesla, which drives up the required cross-sectional area of the central stator pole 630 and the central rotor pole 540. For example, if a total flux of 1.5 Tesla is desired in the outer rotor-stator air gaps 510 and 520, with 0.75 Tesla provided by a typical rubber sheet permanent magnet having a permanent flux of 0.1 Tesla and 0.75 Tesla provided by the steering flux coils, then the cross-sectional area of the central poles 630 and 540 needs to be 7.5 times larger than the combined cross-sectional area of the outer rotor-stator air gaps 510 and 520.

Figure 19:
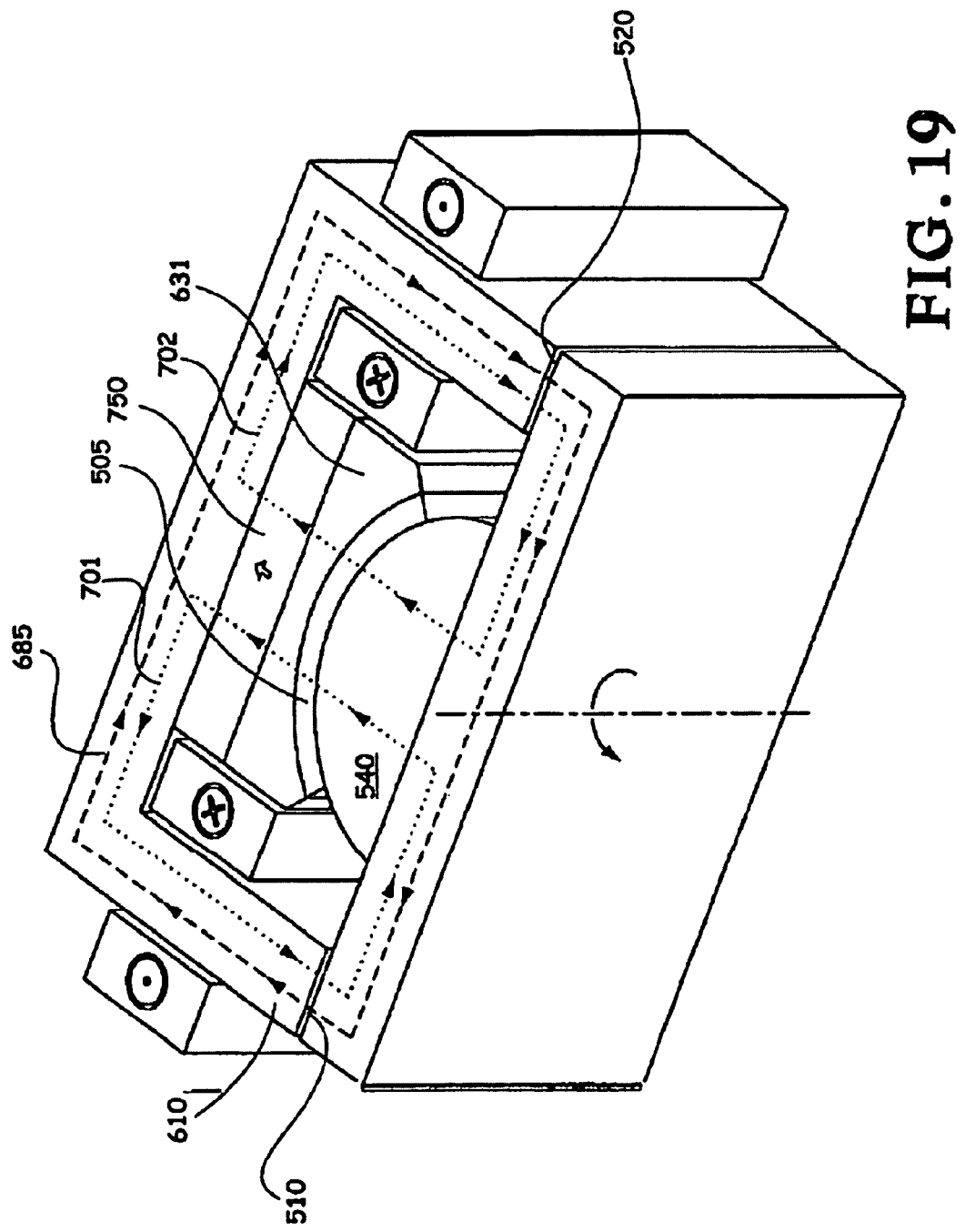
FIG. 19 shows the system of FIG. 18 with the permanent magnet material moved out of the rubber sheet permanent magnet, resulting in a separate rubber sheet bearing and permanent magnet.

In FIG. 19, the permanent magnet material has been moved out of the rubber sheet permanent magnet 700, as shown in FIG. 18, resulting in the rubber sheet bearing 505 and the permanent magnet 750. The arrow shown on the permanent magnet 750 indicates the north-pole direction. Note that as with the rubber sheet permanent magnet, the permanent magnet 750 extends across substantially the entire width of the stator central pole 631 and the rotor central pole 540, and is significantly thicker than the nominal length of the left rotor-stator air gap 510 and right rotor-stator air gap 520. Therefore, the permanent magnet 750 provides a high reluctance path that substantially prevents the steering flux from flowing across the space between the central poles of the stator and rotor, separating the steering flux path 685 from the bias flux paths 701 and 702. By moving the permanent magnet material out of the rubber sheet permanent magnet, the mechanical and magnetic properties of the bearing 505 and the bias flux source 750 can be more readily tailored to meet the performance goals for the actuator. For instance, this allows: avoiding the possible break down of the rubber in a rubber sheet permanent magnet due to the motion of the particles of ceramic permanent magnet in the rubber during repeated cycles of shear deformation; adjusting the thickness and type of elastomer used in a rubber sheet based on the stiffness requirements for the bearing, independent of the bias flux requirement; and using a stronger permanent magnet to produce a desired bias flux. The rubber bearing 505 can include of a single layer of elastomeric material, or it can be a composite consisting of separate layers of elastomeric material and metal. To better allow optimizing the dimensions of the permanent magnet 750, it may be desirable to use a combination of the permanent magnet 755 and two low magnetic-permeability spacers 756 and 757, as shown in FIG. 20.

Figure 20:
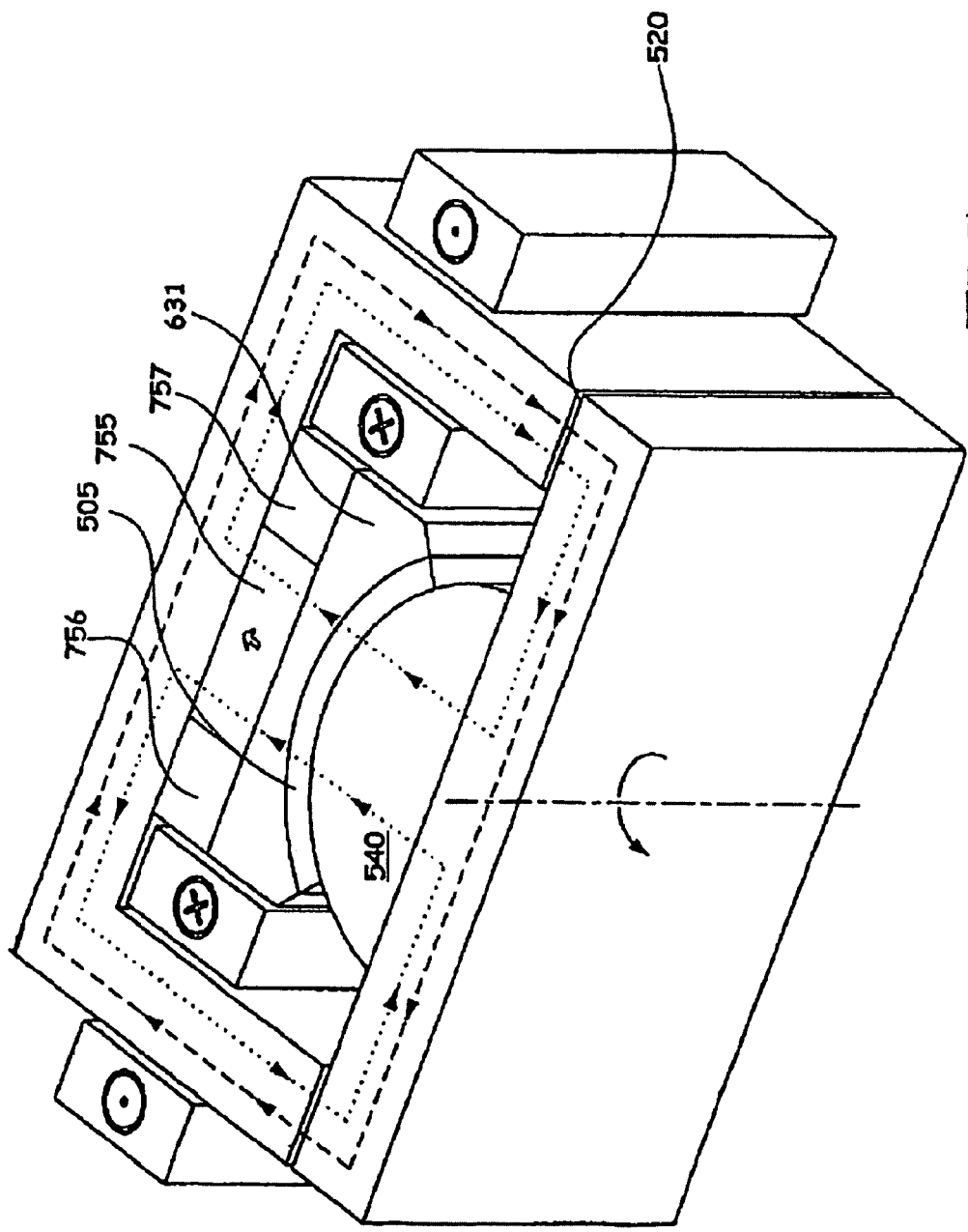
FIG. 20 shows the system of FIG. 19 with the permanent magnet replaced by a combination of a permanent magnet and two low magnetic-permeability spacers.
Figure 21:
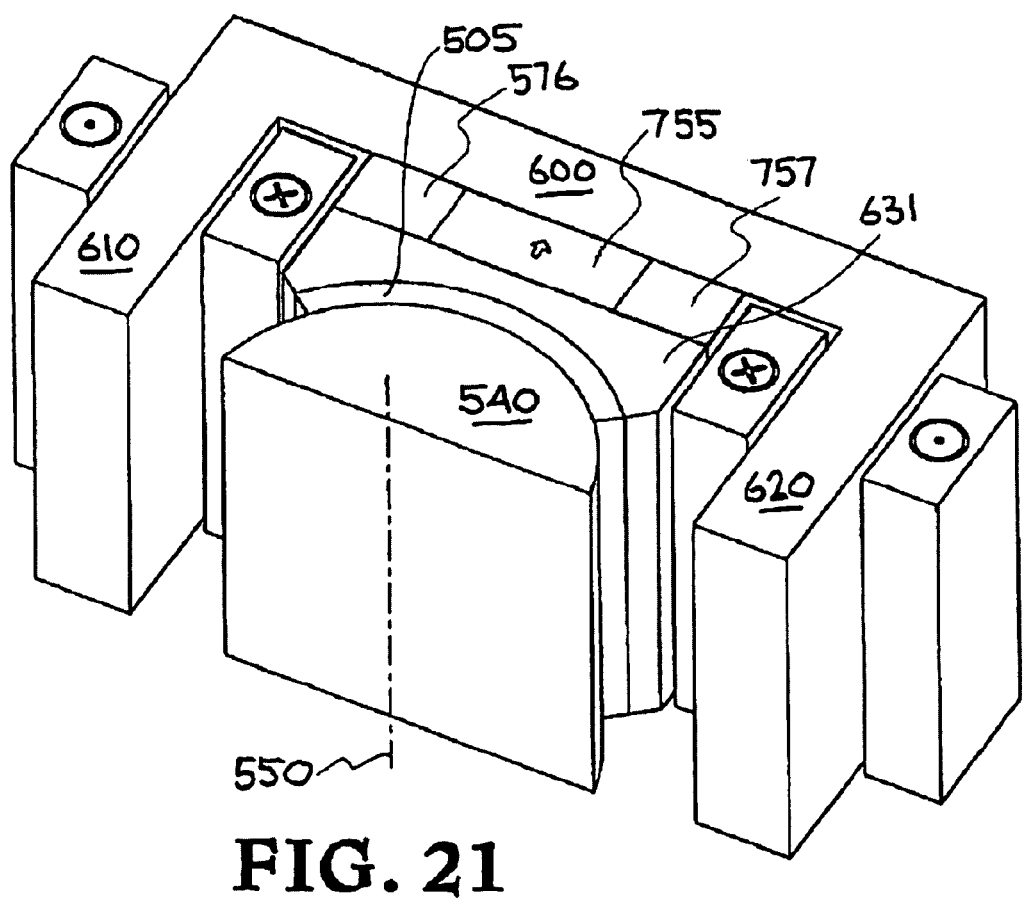
FIG. 21 shows the rotary actuator of FIG. 20 with the rotor removed to better illustrate the other components.

FIG. 21 shows the rotary actuator of FIG. 20 with the rotor 500 removed to better illustrate the other components. As one arrangement, the addition of a viscous fluid between the stator poles 610 and 620 and the rotor 500 can be used to provide mechanical damping to the rotor.

Figure 22:
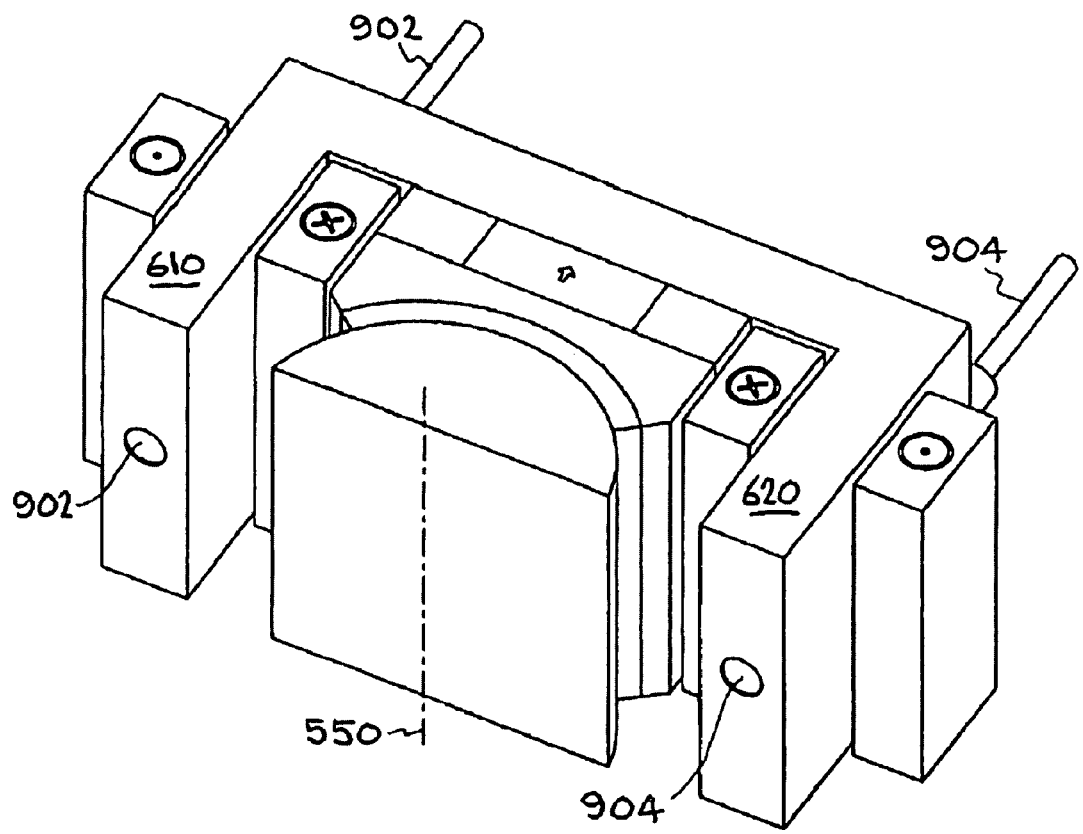
FIG. 22 shows a possible arrangement of two displacement measuring sensors for measuring the displacement of the rotor relative to the stator.

FIG. 22 shows a possible arrangement of two displacement measuring sensors 902 and 904 for measuring the displacement of the rotor 500 relative to the stator 600. The two sensors measure rotation of the rotor 500 around the axis 550, and translation of the rotor 500 towards/away from the stator 600. Candidate displacement sensors include eddy current sensors, capacitance sensors, and laser sensors. Those practiced in the art readily recognizes that the list of candidate sensors is not exhaustive, and that the effects of the time-varying magnetic flux carried by the stator poles 610 and 620 on the performance of the sensors needs to be considered when choosing a particular type of sensor.

Figure 23:
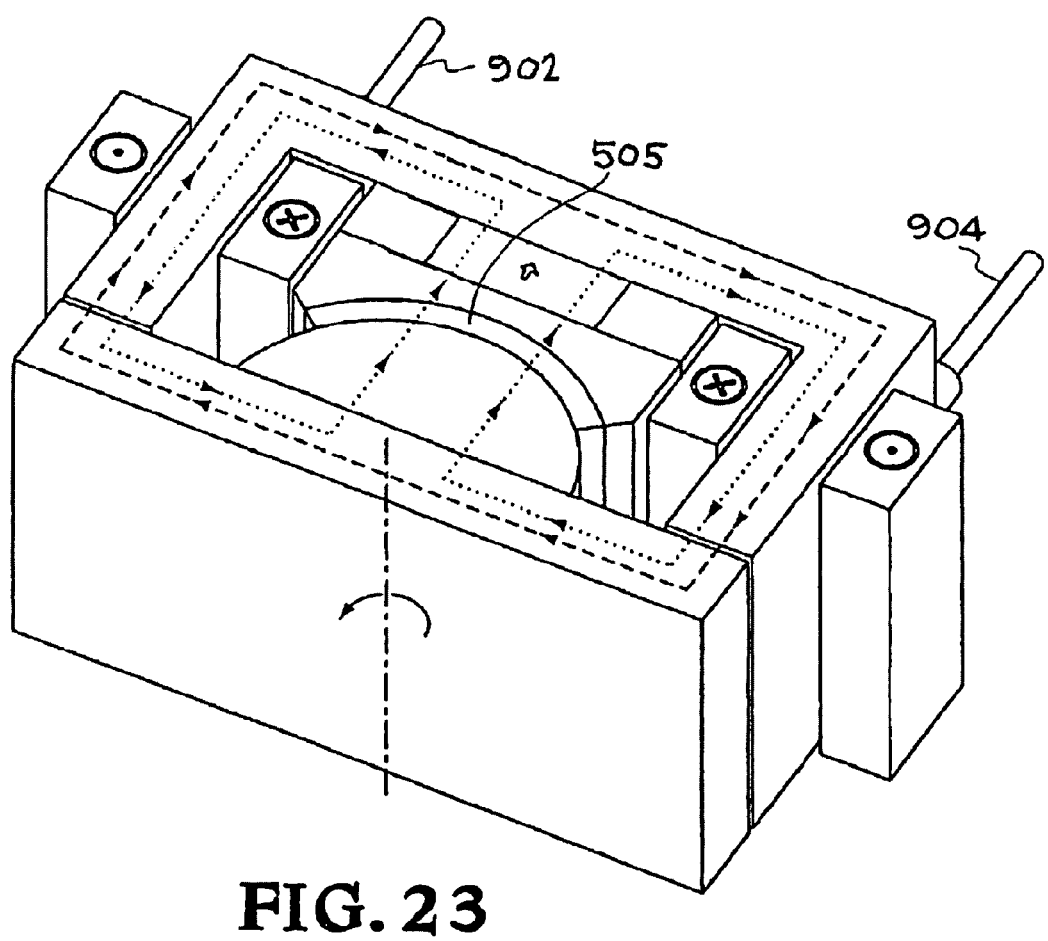
FIG. 23 shows the rotary actuator of FIG. 20 with the addition of the two displacement sensors.

FIG. 23 shows the rotary actuator of FIG. 20 with the addition of the two displacement sensors 902 and 904.

Figure 24:
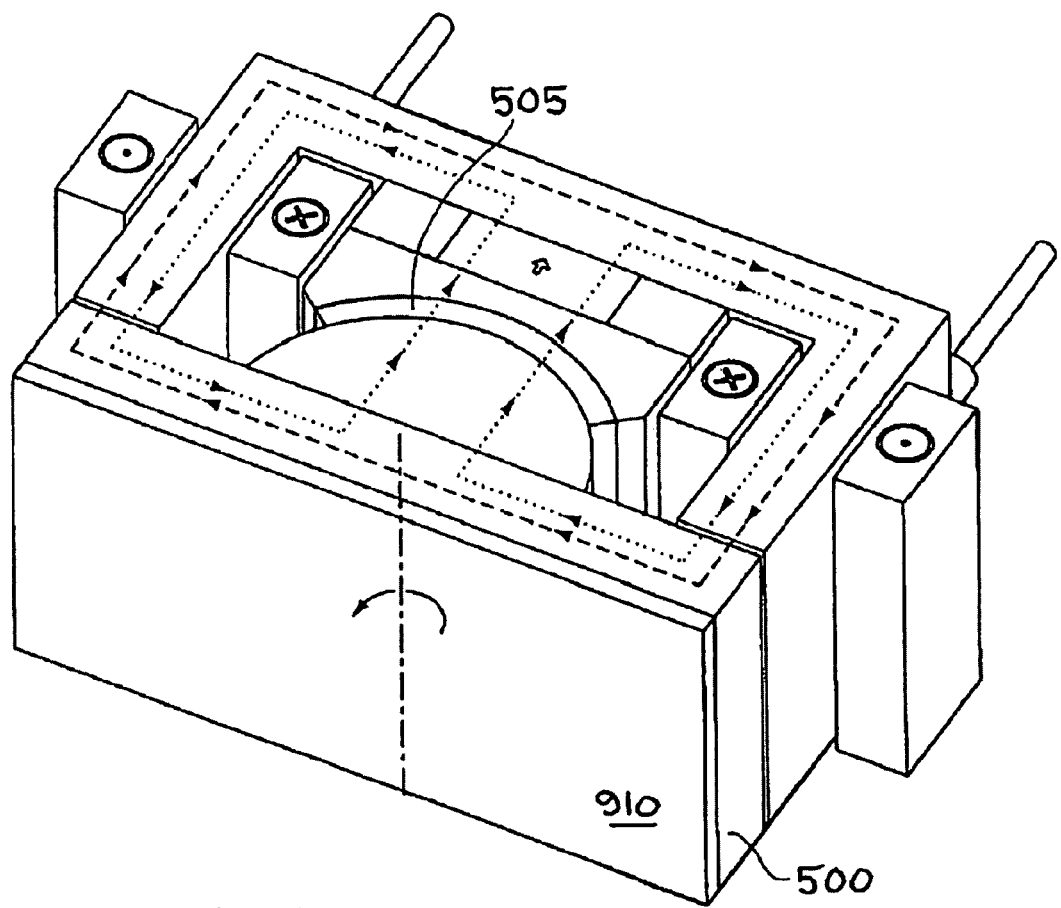
FIG. 24 shows the addition of a separate optical element to the front surface of the rotor.

FIG. 24 shows the addition of a separate optical element 910 to the front surface of the rotor 500. Potential optical elements include a reflective element, e.g., a flat, concave, convex, or complex surface, a refractive element, or a diffractive element. Depending on the intended application and available manufacturing processes, the optical element can be fixedly attached or removeably attached. Alternately, the optical element can be manufactured directly (e.g., via polishing said front face using methods known to one of ordinary skill in the art) onto the front face of the rotor 500.

Figure 25:
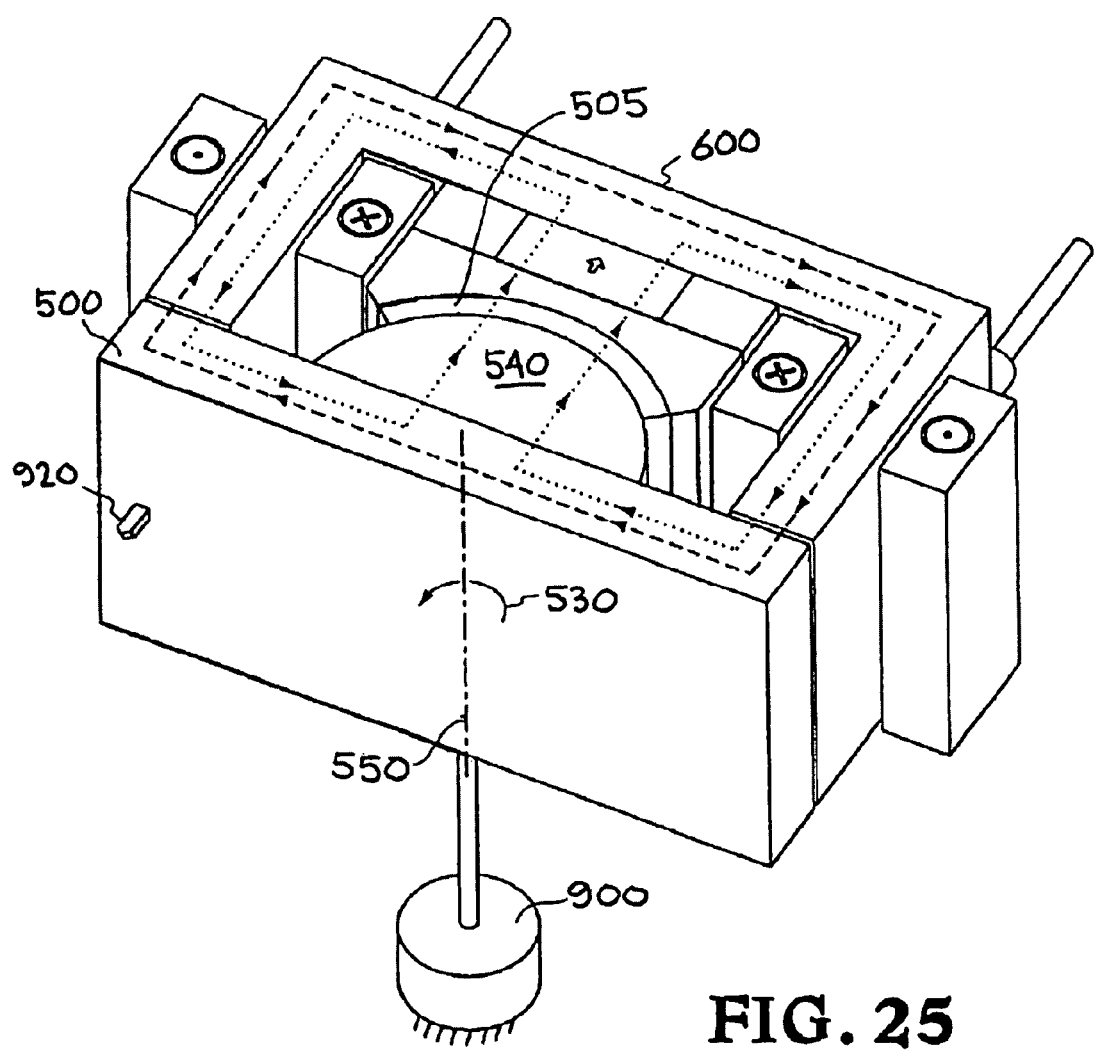
FIG. 25 shows the rotary actuator of FIG. 20 with the addition of a cutting tool.

FIG. 25 shows the rotary actuator of FIG. 20 with the addition of a cutting tool 920. Rotation of the rotor 500 about the rotation axis 550 causes motion of the tool 920 away/towards the stator 600. A torsionally flexible element 800 is attached to a base 900 and the rotor 500. In an example beneficial embodiment, the base 900 is fixed relative to the stator 600, and the torsionally flexible element 800 is substantially aligned with the axis of rotation 550 of the rotor 500 and constrains translation of the rotor in a direction parallel to the axis 550. Together, the torsionally flexible element 800 and the bearing 505 form a bearing system that constrains the rotor 500 relative to the stator 600 in all degrees of freedom of motion except for rotation around the axis 550.

Figure 26:
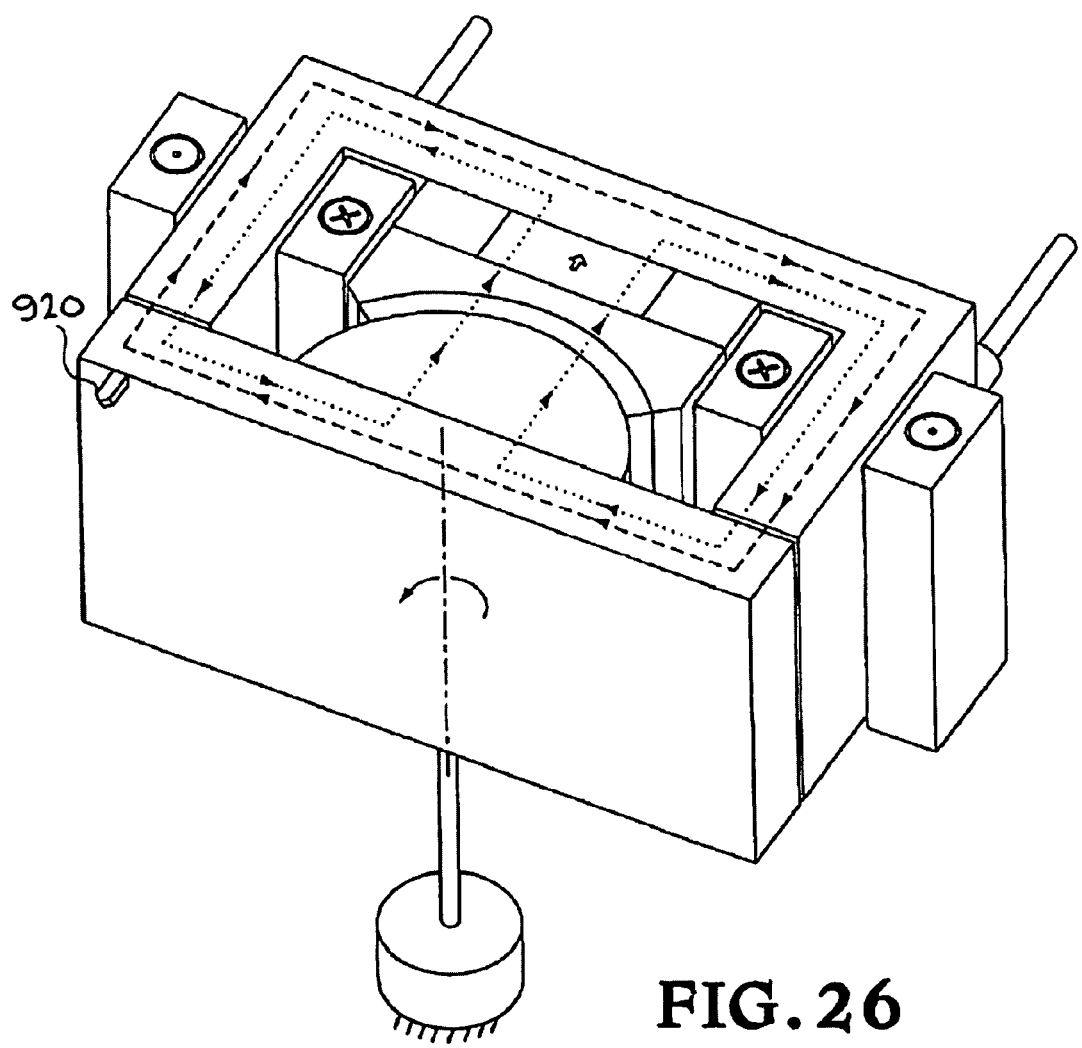
FIG. 26 shows the tool moved to a location near an edge of the rotor.

In FIG. 26 the tool 920 has been moved to a location near an edge of the rotor 500. This may be beneficial in some cases when compared to the tool location in FIG. 25.

Those of ordinary skill in the art recognizes that the bearing 505 in FIGS. 23, 24, and 25 can also be a gas-film or fluid film bearing. Moreover, it is to be appreciated that the magnetic attractive forces between the stator central pole 631 and the rotor central pole 540, as shown and detailed in FIG. 19, due to the bias flux can provide a preload force on the bearing, and that a torsionally flexible element 800 and its base 900, as shown in FIG. 25, can provide an axial support to the rotor 500.

Figure 27:
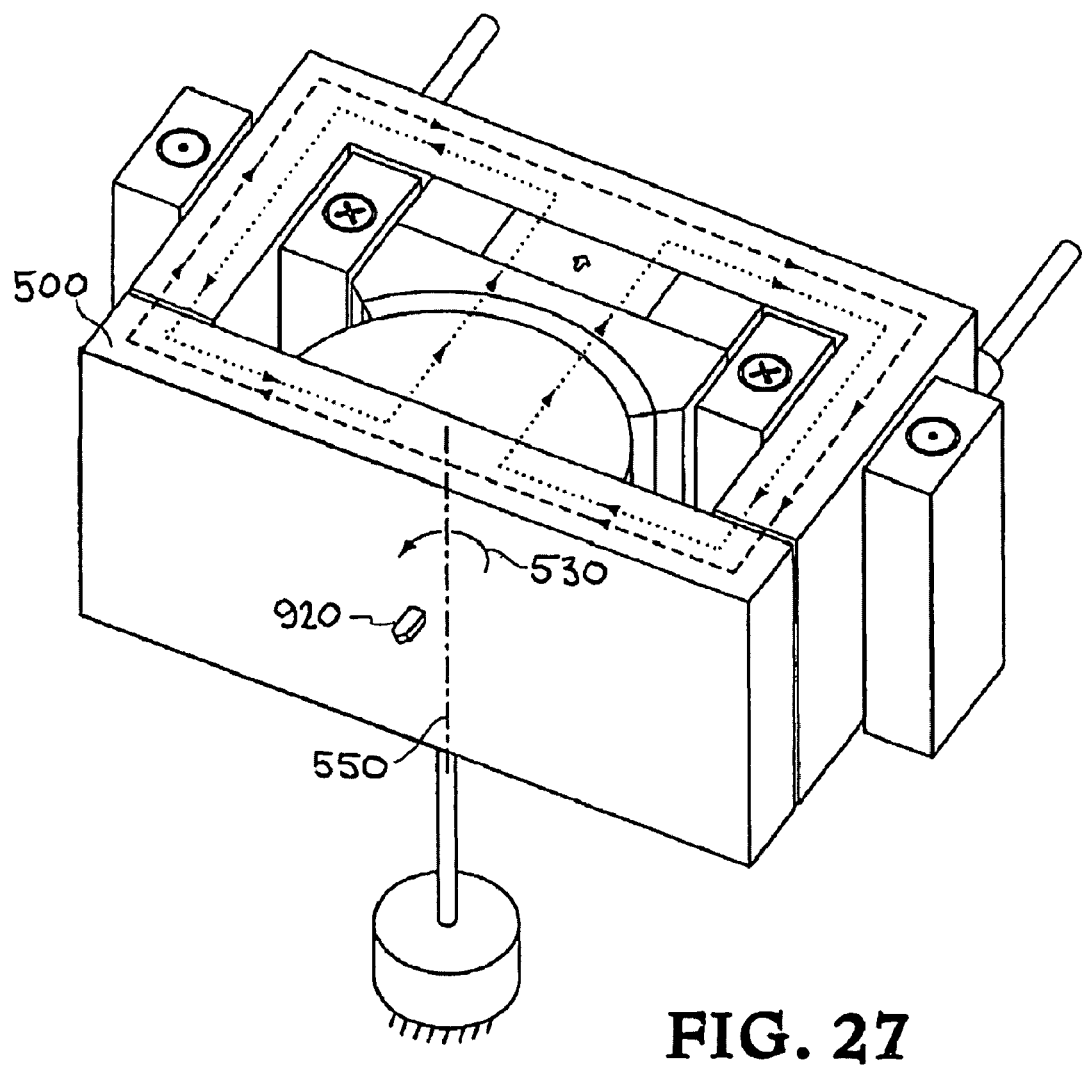
FIG. 27 shows the system of FIG. 25 with the tip of the tool located in front of the rotation axis of the rotor.

FIG. 27 shows the system of FIG. 25 with the tip of the tool 920 located in front of the rotation axis 550 of the rotor, and in a plane passing through the rotation axis. This configuration can be desired for an application where an oscillatory back and forth motion of the tool tip is desired.

Figure 28:
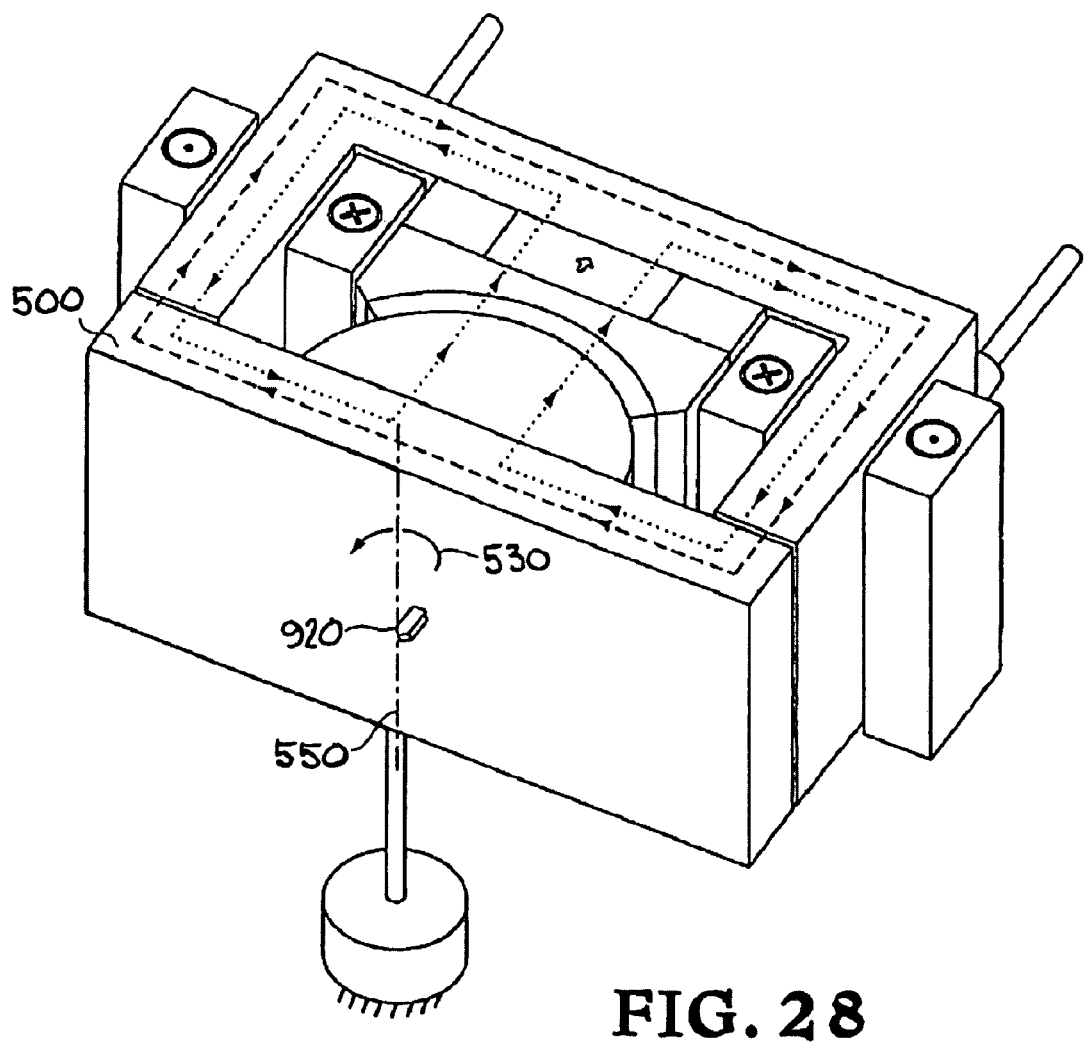
FIG. 28 shows the tip of the tool coincident with the rotation axis of the rotor.

In FIG. 28 the tip of the tool 920 is coincident with the rotation axis 550 of the rotor 500. This configuration can be desirable for an application where rotation of the tool around its tip is desired. Note that as drawn, FIG. 28 depicts a system where the combined center of mass of the major rotating elements, 500 and 540 is not coincident with the axis of rotation 550. If the resultant forces from the linear acceleration of the center of mass is intolerable in a certain application, then balance masses (not shown) can be added to the front face of the rotor.

Figure 29:
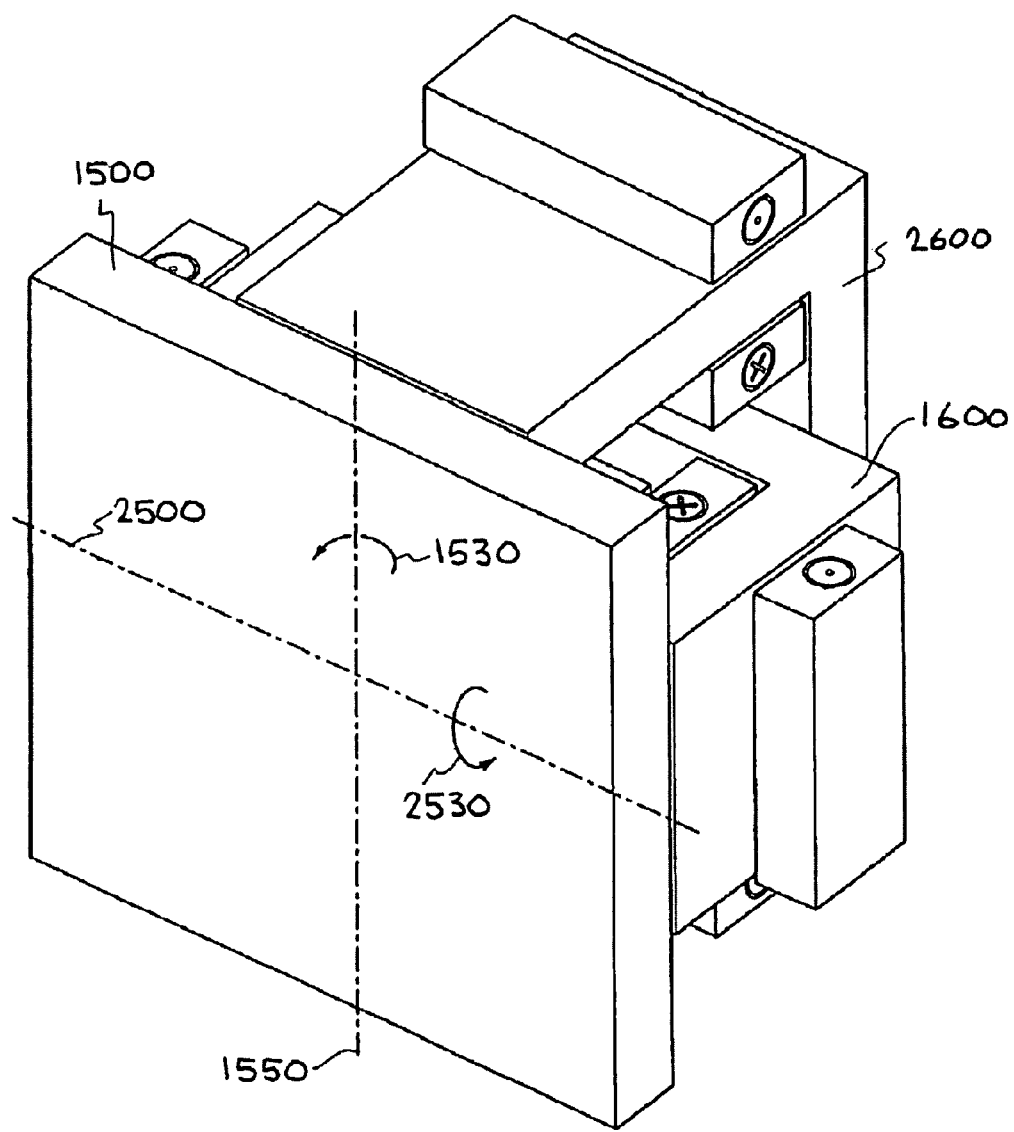
FIG. 29 shows a simple, potentially low-cost, rotary actuator having two rotary degrees of freedom.

Following the single degree of freedom rotary actuator in FIG. 20, FIG. 29 shows a simple, potentially low-cost, rotary actuator having two rotary degrees of freedom. The rotor 1500 has a first rotation axis 1550 and a second rotation axis 2550. The first stator 1600 and second stator 2660 act on the rotor to produce rotations 1530 and 2530 around rotation axes 1550 and 2550, respectively. Note the large potential work zone at the front face of the rotor 1500. If the actuator is used in a fast tool servo, then the cutting tool can be arranged to engage a large workpiece. Alternatively, if the actuator is used to rotate an optical element, that optical element can be made integral with the exposed front face of the rotor or mounted directly to it. Potential optical elements include a reflective element having, (e.g., a mirror having a flat, concave, convex, or complex surface), a refractive element, or a diffractive element.

Figure 30:
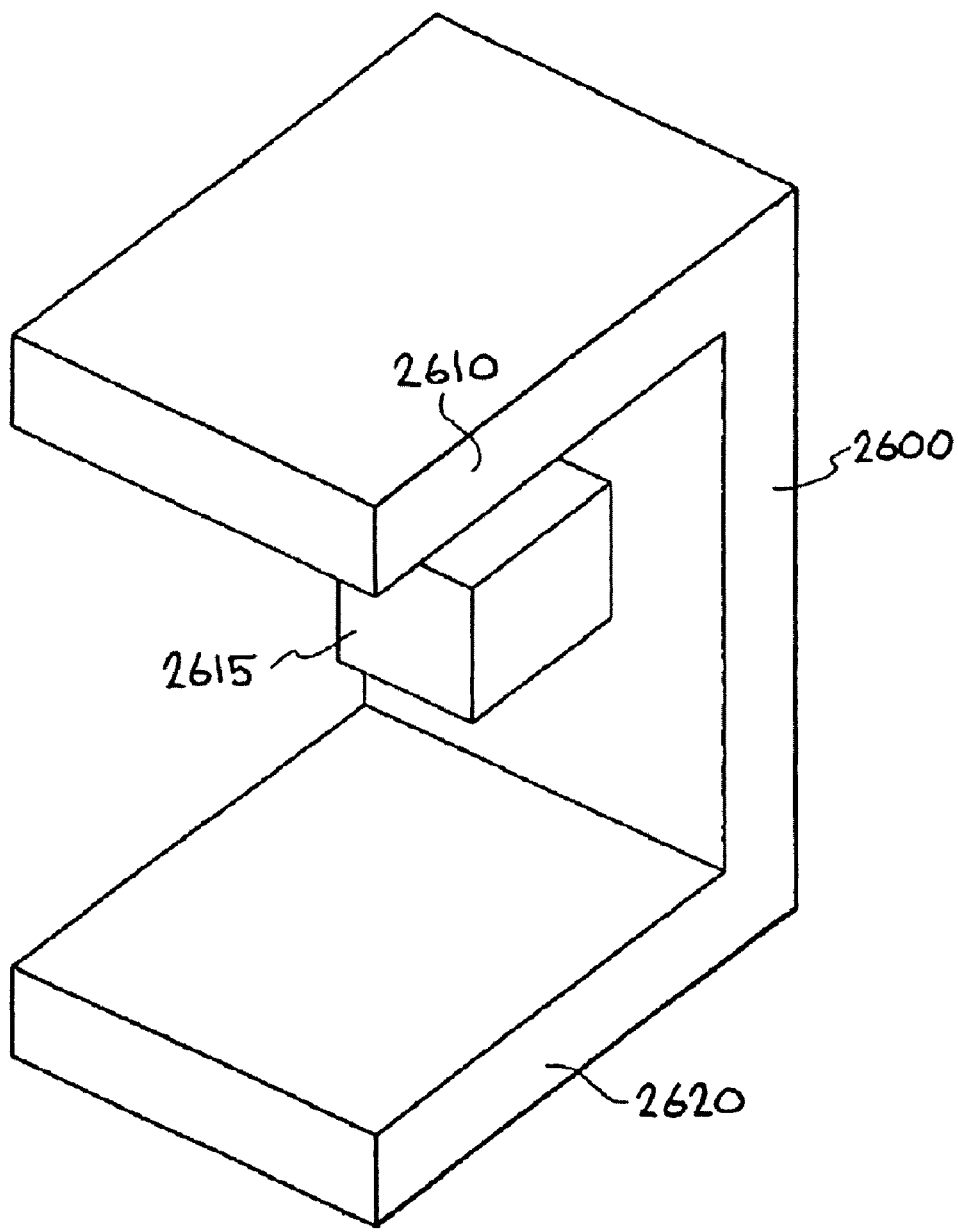
FIG. 30 shows the second stator, its two outer stator poles, and its central stator pole.

FIG. 30 shows the second stator 2600, its two outer stator poles 2610 and 2620, and its central stator pole 2615.

Figure 31:
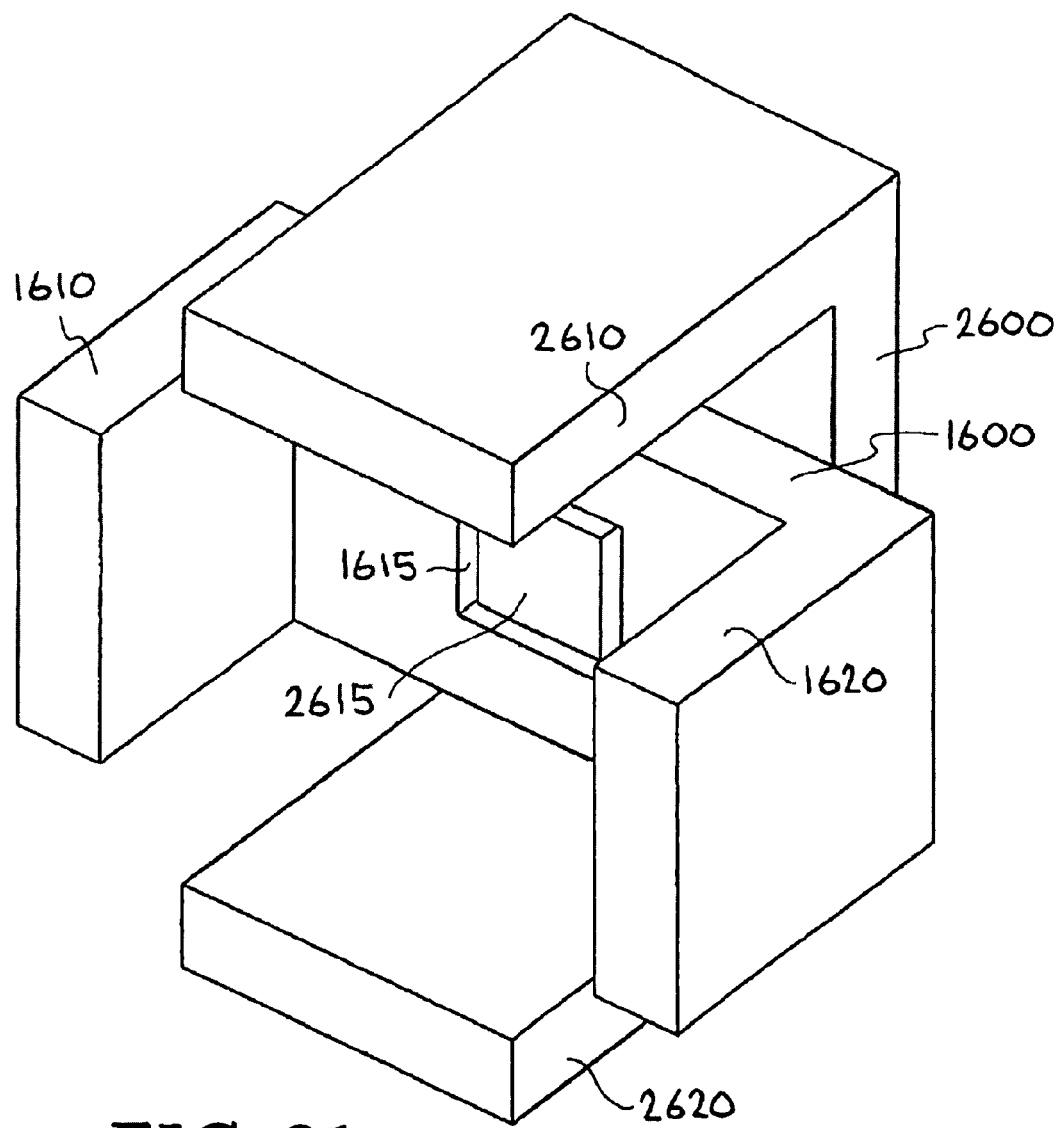
FIG. 31 shows the first stator positioned with the second stator.

FIG. 31 shows the first stator 1600 positioned with the second stator 2600. The first stator 1600 has two outer stator poles 1610 and 1620, and an opening to provide a space 1615 between the first stator 1600 and the central stator pole 2615 of the second stator 2600.

Figure 32:
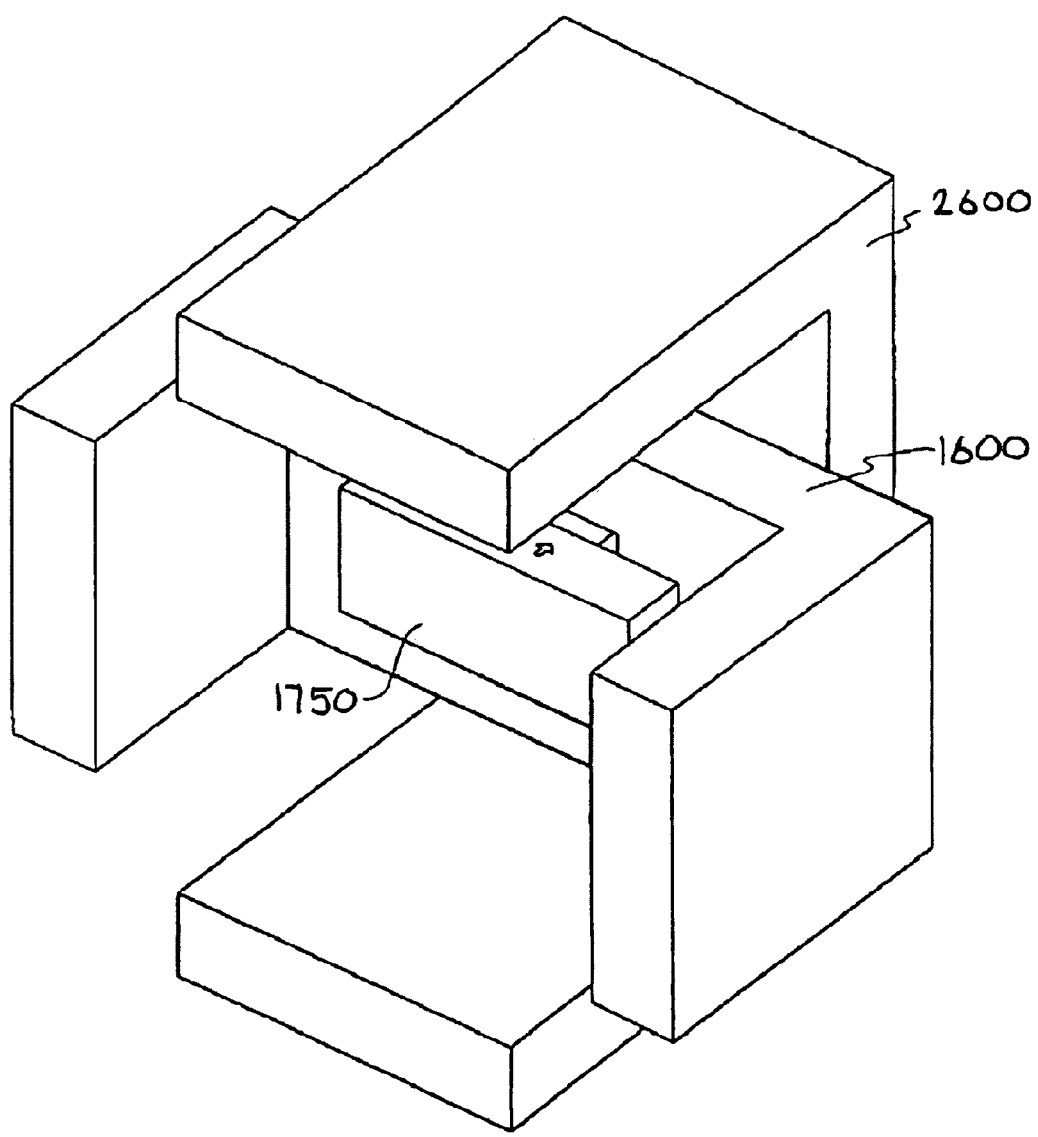
FIG. 32 shows a permanent magnet positioned against the first stator and the central stator pole of the second stator.

FIG. 32 shows a permanent magnet 1750 positioned against the first stator 1600 and the central stator pole 2615 of the second stator 2600. The arrow shown on the permanent magnet 1750 indicates the north-pole direction.

Figure 33:
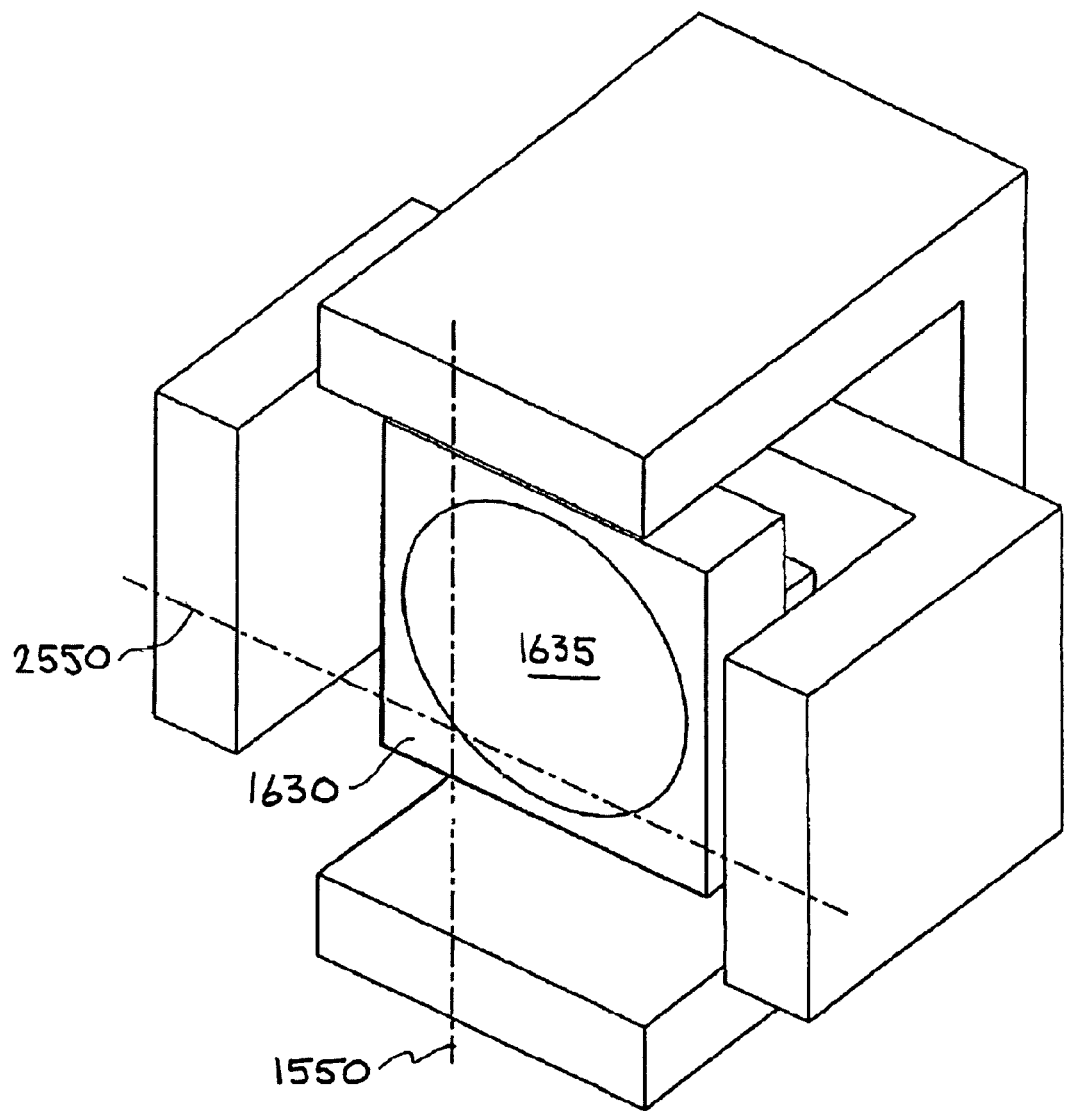
FIG. 33 shows the common bias flux pole piece that is positioned against the permanent magnet. Two axes of rotation intersect at the center of a spherical seat in the common bias flux pole piece.

FIG. 33 shows the common bias flux pole piece 1630 that is positioned against the permanent magnet 1750. The two axes 1550 and 2550 intersect at the center of the spherical seat 1635 in the common bias flux pole piece 1630.

Figure 34:
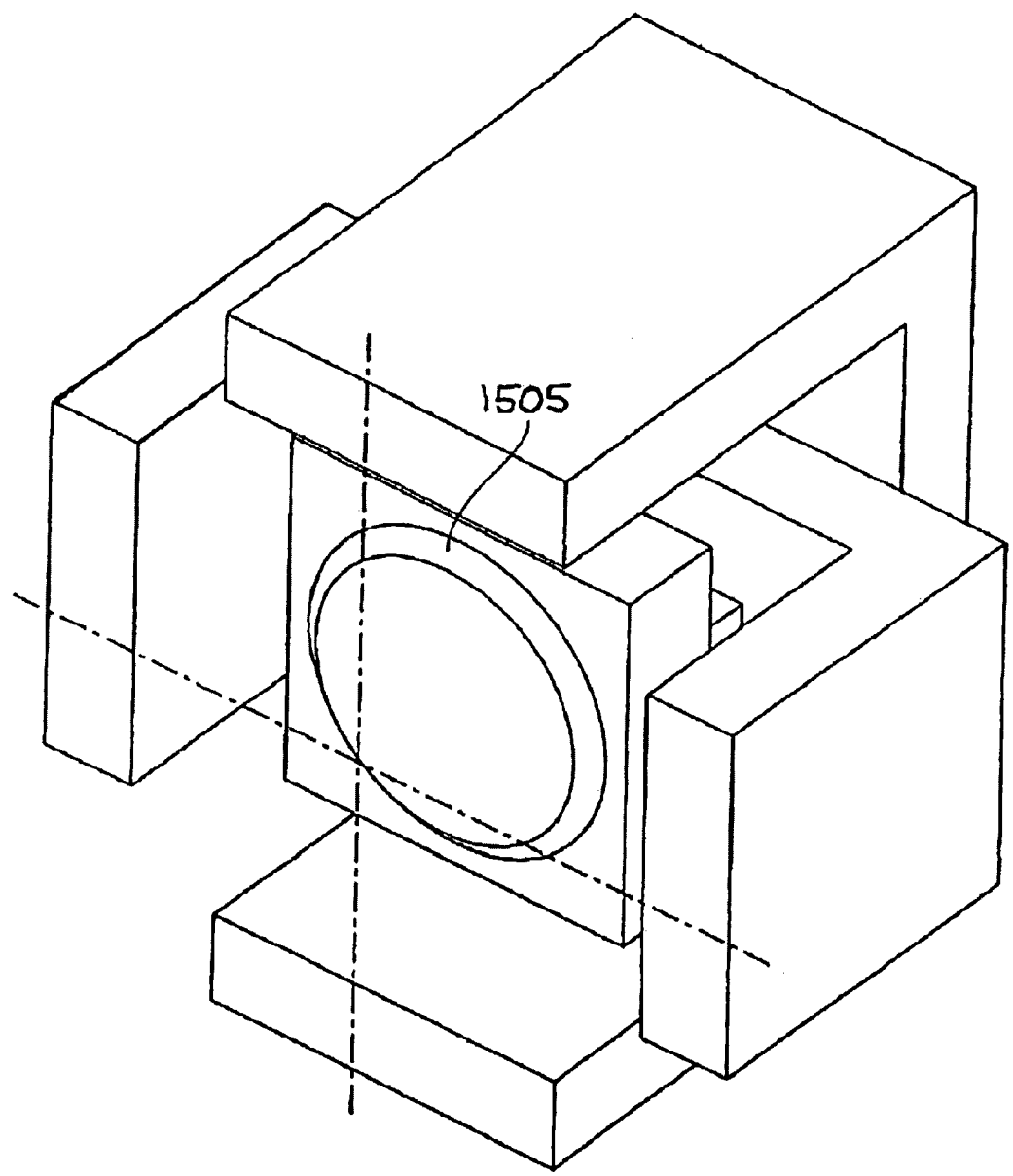
FIG. 34 shows the addition of a spherical bearing.

FIG. 34 shows the addition of a spherical bearing 1505 to the spherical seat 1635. One of ordinary skill in the art recognizes that the bearing 1505 can be an elastomeric layer, a lamination of elastomeric and metal layers, or a gas-film or fluid film bearing. Moreover, it is to be appreciated that the magnetic attractive forces between the common bias flux pole piece 1630 and the rotor central pole 1540 due to the bias flux can provide a preload force on the bearing.

Figure 35:
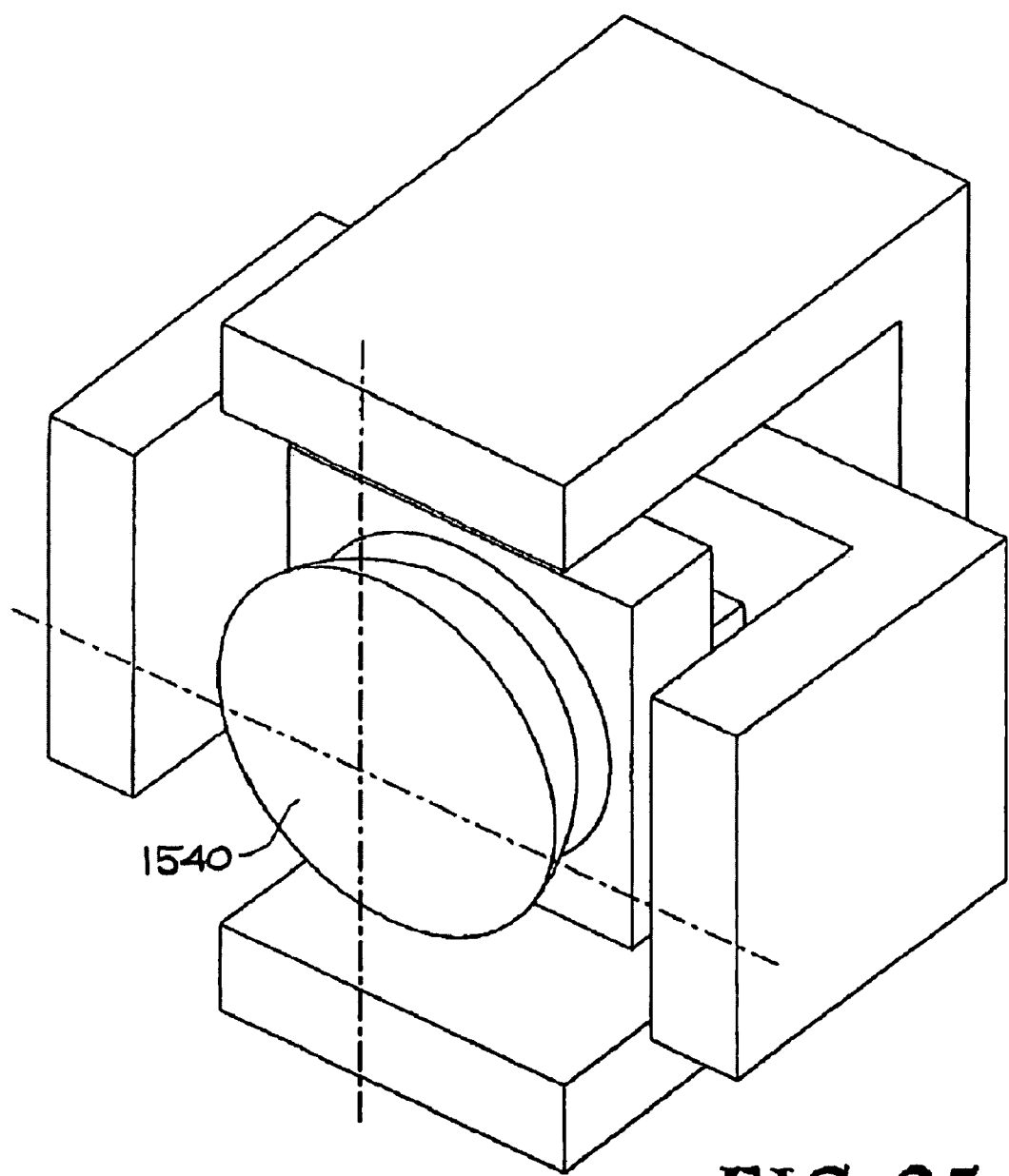
FIG. 35 shows the spherical bearing accepting the rotor central pole.
Figure 36:
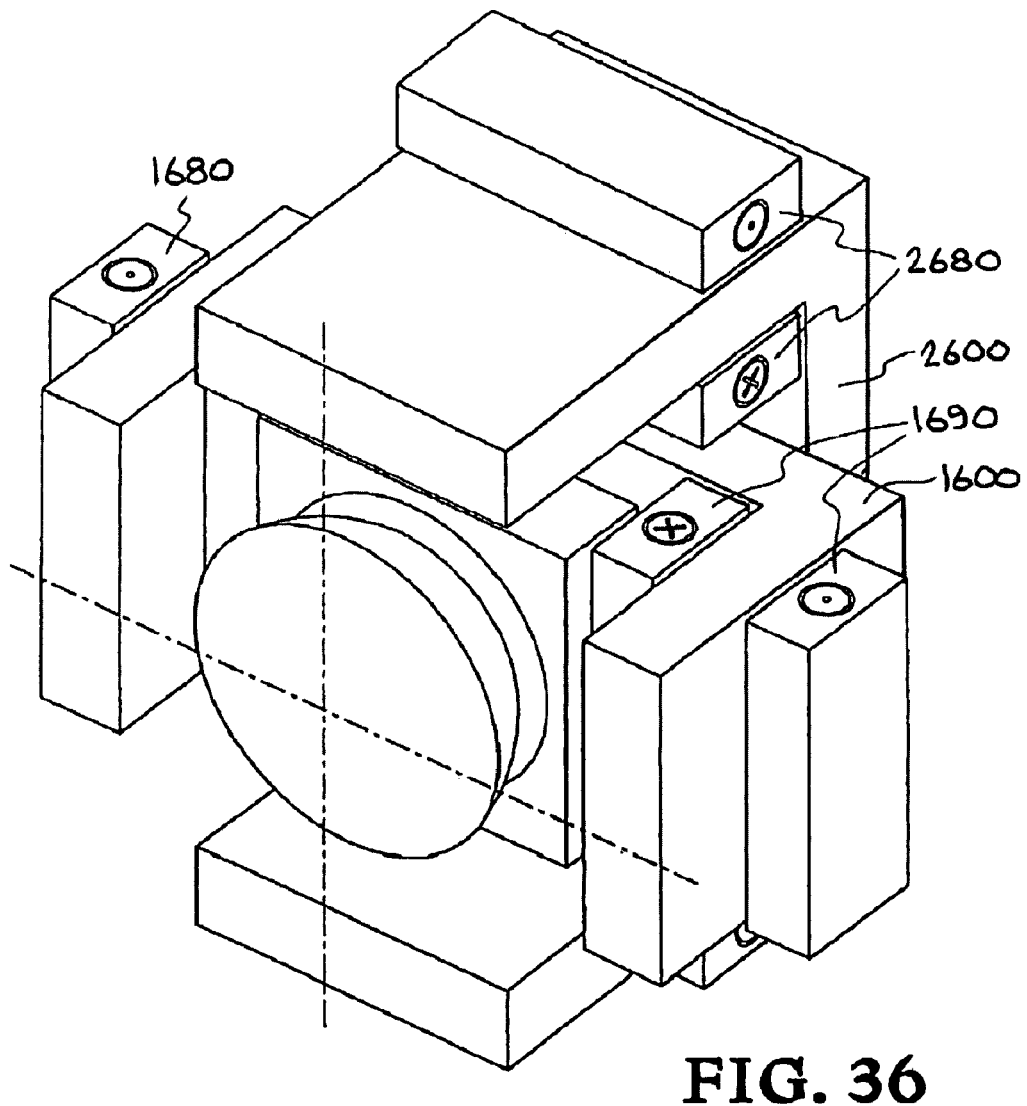
FIG. 36 shows the addition of the steering flux coils to the two stators.

FIG. 35 shows the spherical bearing 1505 accepting the rotor central pole 1540 and FIG. 36 shows the addition of the steering flux coils 1680 and 1690 for the first stator 1600, and the addition of one 2680 of the pair of steering flux coils (the other coil 2690 is hidden in FIG. 36) for the second stator 2600.

Figure 37:
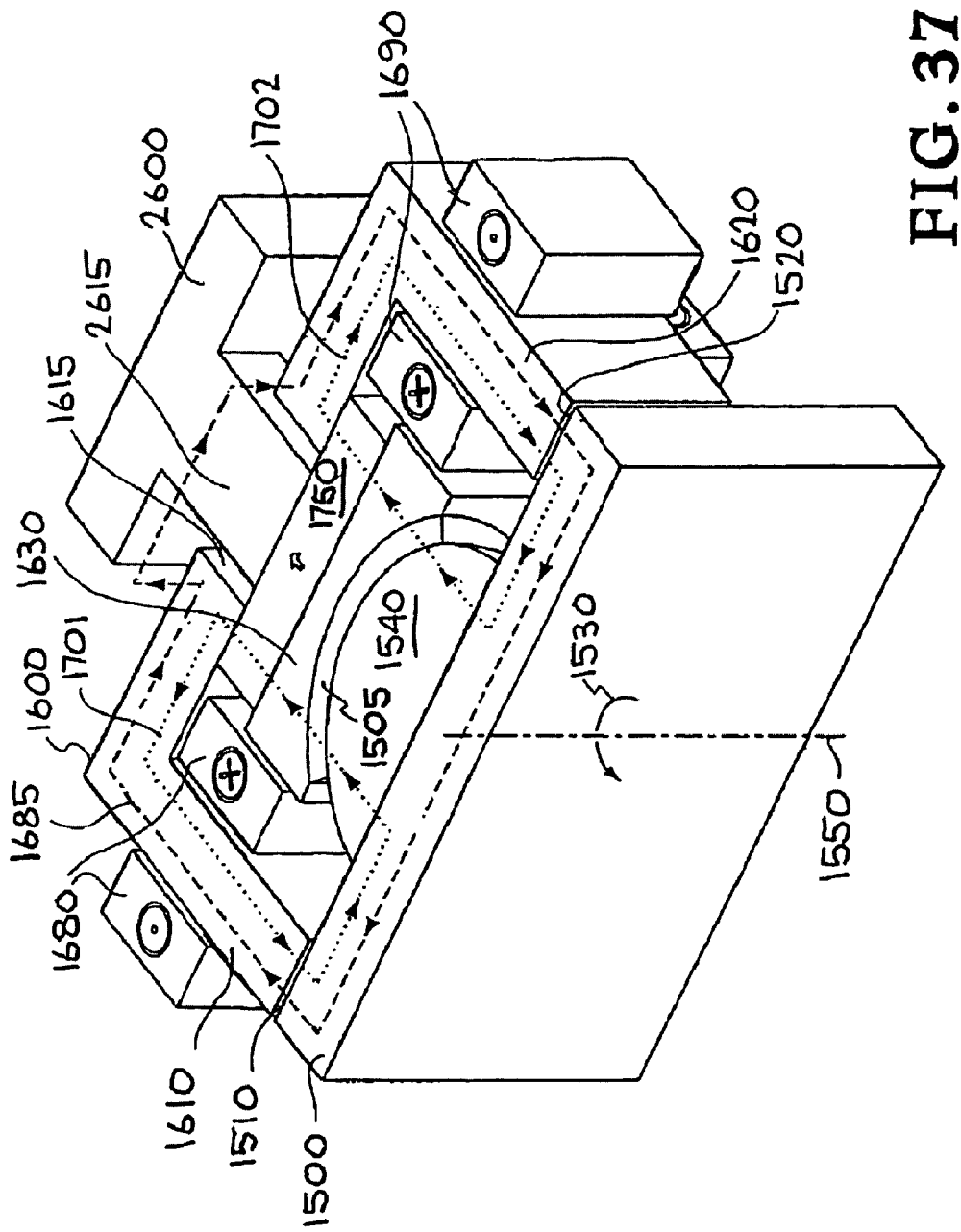
FIG. 37 is a first cross-sectional view of the system shown in FIG. 29.
Figure 39:
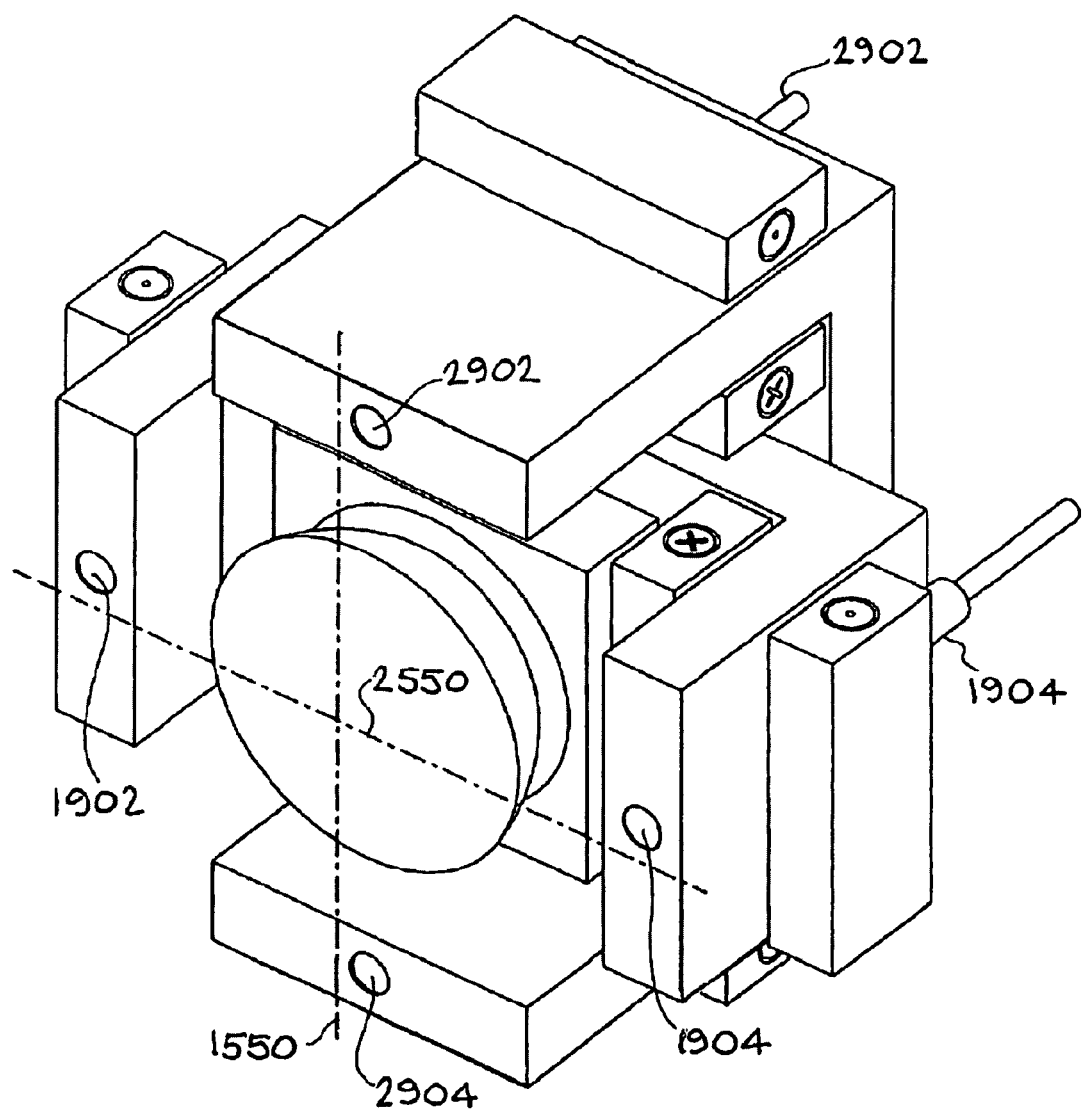
FIG. 39 shows a possible arrangement of four displacement measuring sensors for measuring the displacement of the rotor relative to the stators.

FIG. 37 is a first cross-sectional view of the system shown in FIG. 39, illustrating the magnetic flux paths through the first stator 1600 and the rotor 1500. The bias flux paths 1701 and 1702 start at the permanent magnet 1750, enter the magnetically permeable first stator 1600, split and circulate through the first stator to the left first stator pole 1610 and right first stator pole 1620, cross the air gaps 1510 and 1520 to enter the magnetically permeable rotor 1500, travel through the rotor to the rotor central pole 1540, pass across the bearing 1505, through the magnetically permeable common bias flux pole piece 1630, and return to the permanent magnet 1750. In an example beneficial embodiment, the lengths of the air gaps 1510 and 1520 are equal, and the cross-sectional area of the air gaps 1510 and 1520 are equal. One of ordinary skill in the art readily recognizes that the sections of the rotor 1500 and first stator 1600 that are subjected to a time-varying magnetic flux are most often constructed from a laminated or powdered magnetic material with high permeability at the operating frequency of interest to reduce eddy current and magnetic hysteresis losses in the material.

To develop a torque acting in the direction 1530 on the rotor 1500 in FIG. 159, the first steering flux coil 1680 and the second steering flux coil 1690 produce magnetic flux that circulates in a common steering flux path 1685. The steering flux path starts at the first steering coil 1680 in the left first stator pole 1610, goes through the first stator 1600, around the second stator central pole 2615 to the right first stator pole 1620, through the second steering flux coil 1690 to the air gap 1520, across the air gap 1520 to the rotor 1500, through the rotor 1500 to the air gap 1510, across the air gap 1510 to the left first stator pole 1610, and returns to the first steering coil 1680. Note that the permanent magnet 1750 provides a high reluctance path that substantially separates the steering flux path 1685 from the bias flux paths 1701 and 1702. Note that the space 1615 substantially prevents the steering flux 1685 from entering the second stator 2600. One of ordinary skill in the art recognizes that the space 1615 can be filled with a low magnetically-permeable material that can add mechanical integrity to the assembly. In the embodiment just described, the bias flux and steering fluxes add in air gap 1520 and subtract in air gap 1510, producing a net torque on the rotor 1500 from the magnetic forces acting on it, resulting in the rotation 1530 of the rotor around the axis of rotation 1550. Note that the flux addition and subtraction in the outer air gaps 1510 and 1520 does not appreciably change the magnitude of the net magnetic force acting on the rotor, but it does cause a lateral shift of that force. One of ordinary skill in the art recognizes that reversing the direction of the steering flux 1685 reverses the direction of the torque acting on the rotor 1500 and hence its rotation 1530, and that each of the steering flux coils 1680 and 1690 can be made up of more than one coil acting together or independently for producing a particular desired steering flux. In another example arrangment, the steering flux is controlled by a control system that uses a measurement of the rotation 1530 for closed-loop feedback control for controlling that rotation and providing dynamic rotation stiffness to the rotor. In another example arrangment, the steering flux is controlled by a control system that uses a measurement of the rotation 1530 for closed-loop feedback control for providing electronic damping to the rotational motion of the rotor.

Figure 38:
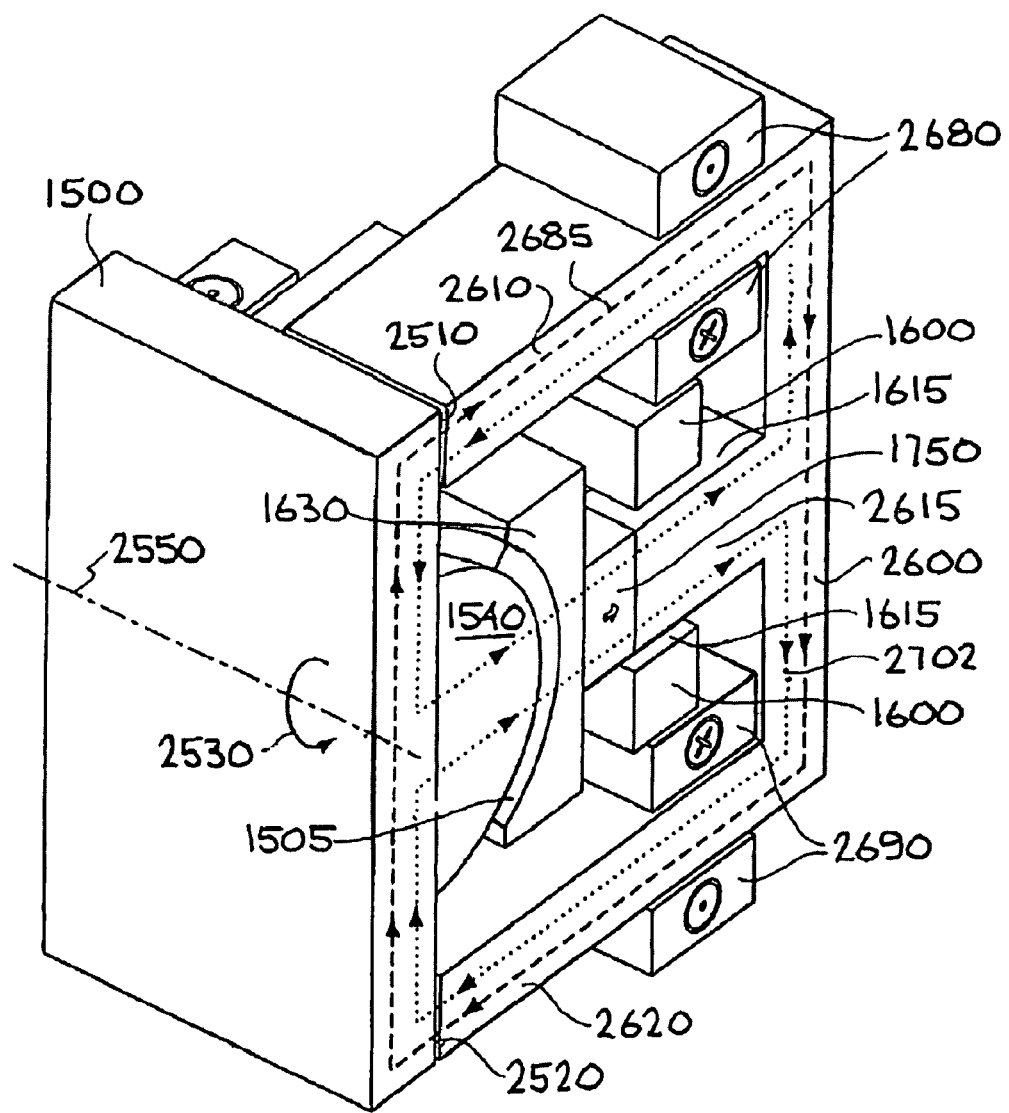
FIG. 38 is a second cross-sectional view of the system shown in FIG. 29.

FIG. 38 is a second cross-sectional view of the system shown in FIG. 29, illustrating the magnetic flux paths through the second stator 2600 and the rotor 1500. The bias flux paths 2701 and 2702 start at the permanent magnet 1750, enter the magnetically permeable central pole 2615 of the second stator 2600, split and circulate through the second stator to the left second stator pole 2610 and right second stator pole 2620, cross the air gaps 2510 and 2520 to enter the magnetically permeable rotor 1500, travel through the rotor to the rotor central pole 1540, pass across the bearing 1505, through the magnetically permeable common bias flux pole piece 1630, and return to the permanent magnet 1750. In a beneficial embodiment, lengths of the air gaps 2510 and 2520 are equal, and the cross-sectional area of the air gaps 2510 and 2520 are equal. One of ordinary skill in the art recognizes that the sections of the rotor 1500 and second stator 2600 that are subjected to a time-varying magnetic flux are most often constructed from a laminated or powdered magnetic material with high permeability at the operating frequency of interest to reduce eddy current and magnetic hysteresis losses in the material.

To develop a torque acting in the direction 2530 on the rotor 1500 in FIG. 38, the first steering flux coil 2680 and the second steering flux coil 2690 produce magnetic flux that circulates in a common steering flux path 2685. The steering flux path starts at the first steering coil 2680 in the left second stator pole 2610, goes through the second stator 2600, to the right second stator pole 2620, through the second steering flux coil 2690 to the air gap 2520, across the air gap 2520 to the rotor 1500, through the rotor 1500 to the air gap 2510, across the air gap 2510 to the left second stator pole 2610, and returns to the first steering coil 2680. Note that the permanent magnet 1750 provides a high reluctance path that substantially separates the steering flux path 2685 from the bias flux paths 2701 and 2702. Note that the space 1615 substantially prevents the steering flux 2685 from entering the first stator 1600. One of ordinary skill in the art readily recognizes that the space 1615 can be filled with a low magnetically-permeable material that can add mechanical integrity to the assembly. In the embodiment just described, the bias flux and steering fluxes add in air gap 2520 and subtract in air gap 2510, producing a net torque on the rotor 1500 from the magnetic forces acting on it, resulting in the rotation 2530 of the rotor around the axis of rotation 2550. Note that the flux addition and subtraction in the outer air gaps 2510 and 2520 does not appreciably change the magnitude of the net magnetic force acting on the rotor, but it does cause a lateral shift of that force. Those of ordinary skill in the art recognizes that reversing the direction of the steering flux 2685 reverses the direction of the torque acting on the rotor 1500 and hence its rotation 2530, and that each of the steering flux coils 2680 and 2690 can be made up of more than one coil acting together or independently for producing a particular desired steering flux.

In another beneficial embodiment, the steering flux is controlled by a closed-loop feedback control system that uses a measurement of the rotation 2530 for controlling that rotation and providing dynamic rotation stiffness to the rotor. As another arragnment, the steering flux is controlled by a closed-loop feedback control system that uses a measurement of the rotation 2530 for providing electronic damping to the rotational motion of the rotor.

FIG. 39 shows a possible arrangement of four displacement measuring sensors 1902, 1904, 2902, and 2904 for measuring the displacement of the rotor 1500 relative to the stators 1600 and 2600. The two sensors 1902 and 1904 measure rotation of the rotor 1500 around the axis 1550, and translation of the rotor 1500 towards/away from the stator 1600. The two sensors 2902 and 2904 measure rotation of the rotor 1500 around the axis 2550, and translation of the rotor 1500 towards/away from the stator 2600.

Candidate displacement sensors include eddy current sensors, capacitance sensors, and laser sensors. One of ordinary skill in the art recognizes that the list of candidate sensors is not exhaustive, and that the effects of the time-varying magnetic flux carried by the stator poles 1610, 1620, 2610, and 2620 on the performance of the sensors needs to be considered when choosing a particular type of sensor. Note that the addition of a viscous fluid between the stator poles 1610, 1620, 2610, and 2620, and the rotor 1500 can be used to provide mechanical damping to the rotor.

Figure 40:
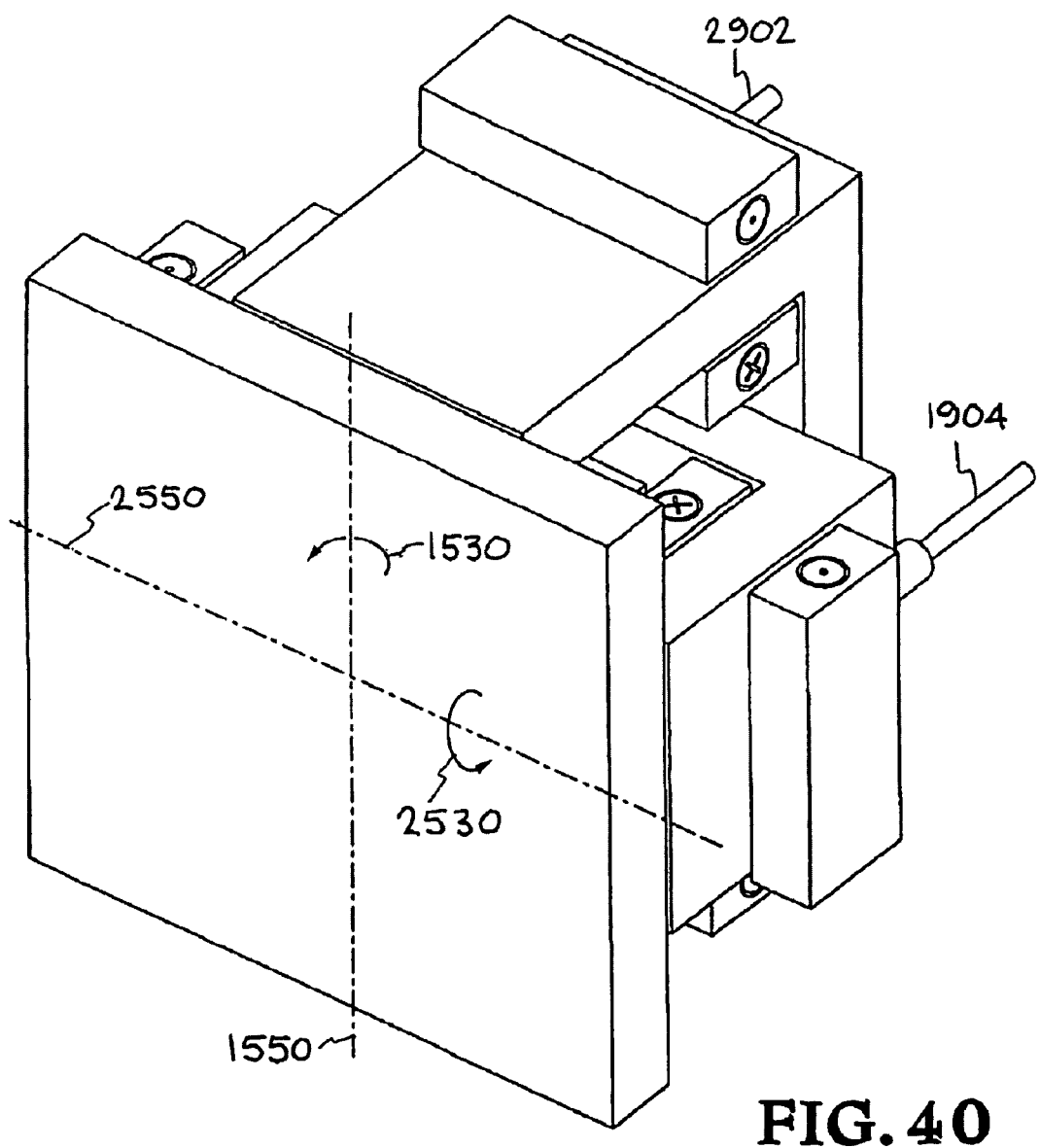
FIG. 40 shows the rotary actuator of FIG. 29 with the addition of the four displacement measuring sensors.

FIG. 40 shows the rotary actuator of FIG. 29 with the addition of the four displacement measuring sensors 1902, 1904, 2902, and 2904.

Figure 41:
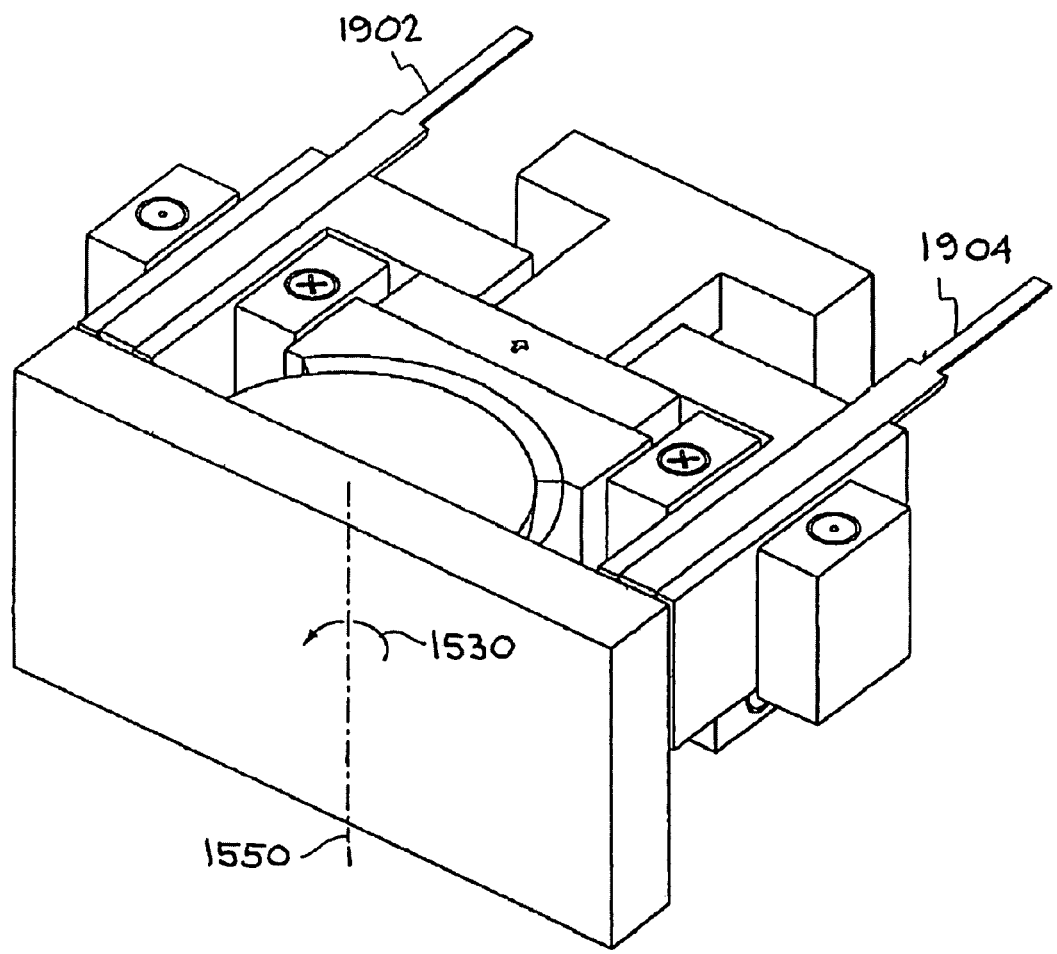
FIG. 41 shows a cross-sectional view of the system of FIG. 40 to better illustrate two of the four displacement measuring sensors.

FIG. 41 shows a cross-sectional view of the system of FIG. 40 to better illustrate two of the four displacement measuring sensors.

Figure 42:
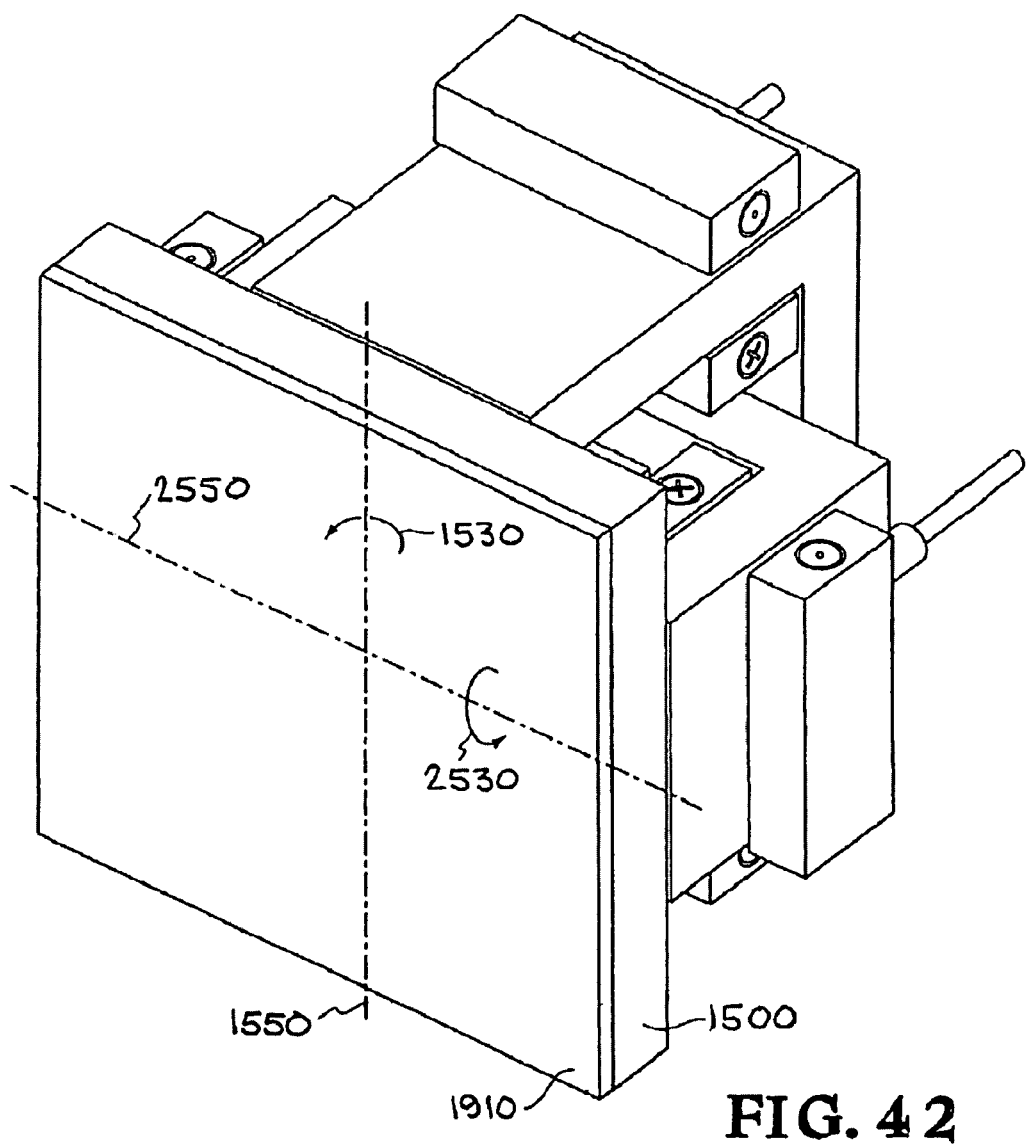
FIG. 42 shows the addition of a separate optical element to the front surface of the rotor.

FIG. 42 shows the addition of a separate optical element 910 to the front surface of the rotor 1500. Potential optical elements include a mirror (flat, concave, convex, or complex surface), a refractive element, or a diffractive element. Depending on the intended application and available manufacturing processes, the optical element can be fixedly attached or removeably attached. Alternately, the optical element can be manufactured directly onto the front face of the rotor 1500.

Figure 43:
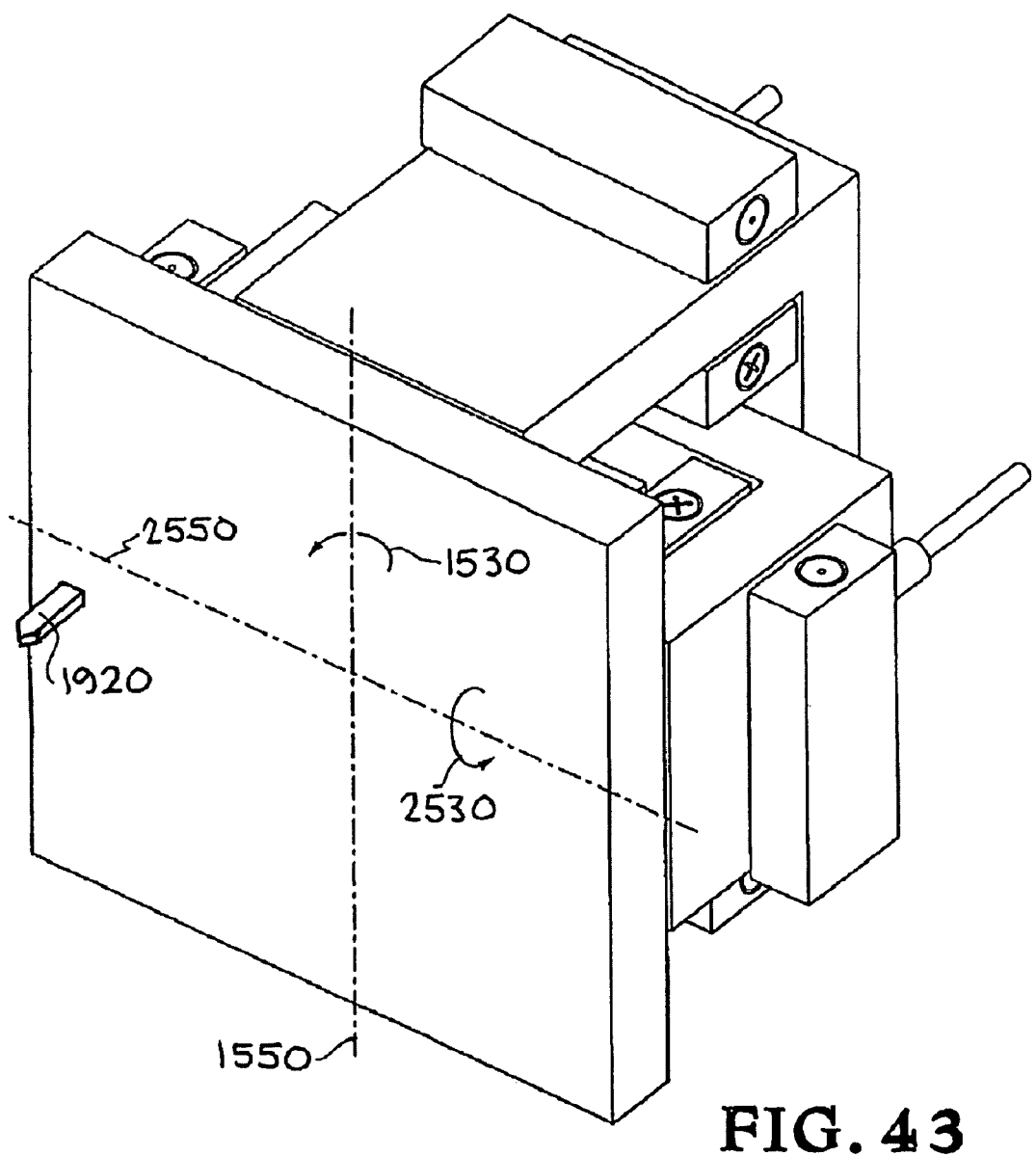
FIG. 43 shows the rotary actuator of FIG. 40 with the addition of a cutting tool.

FIG. 43 shows the rotary actuator of FIG. 40 with the addition of a cutting tool 1920. Rotation of the rotor 1500 about the rotation axis 1550 causes motion of the tool 1920 predominantly away/towards the stator 1600. Rotation of the rotor 1500 about the rotation axis 2550 causes motion of the tool 1920 predominantly up/down relative to the stator 2600. This combined tool motion may preferable in certain machining applications.

Figure 44:
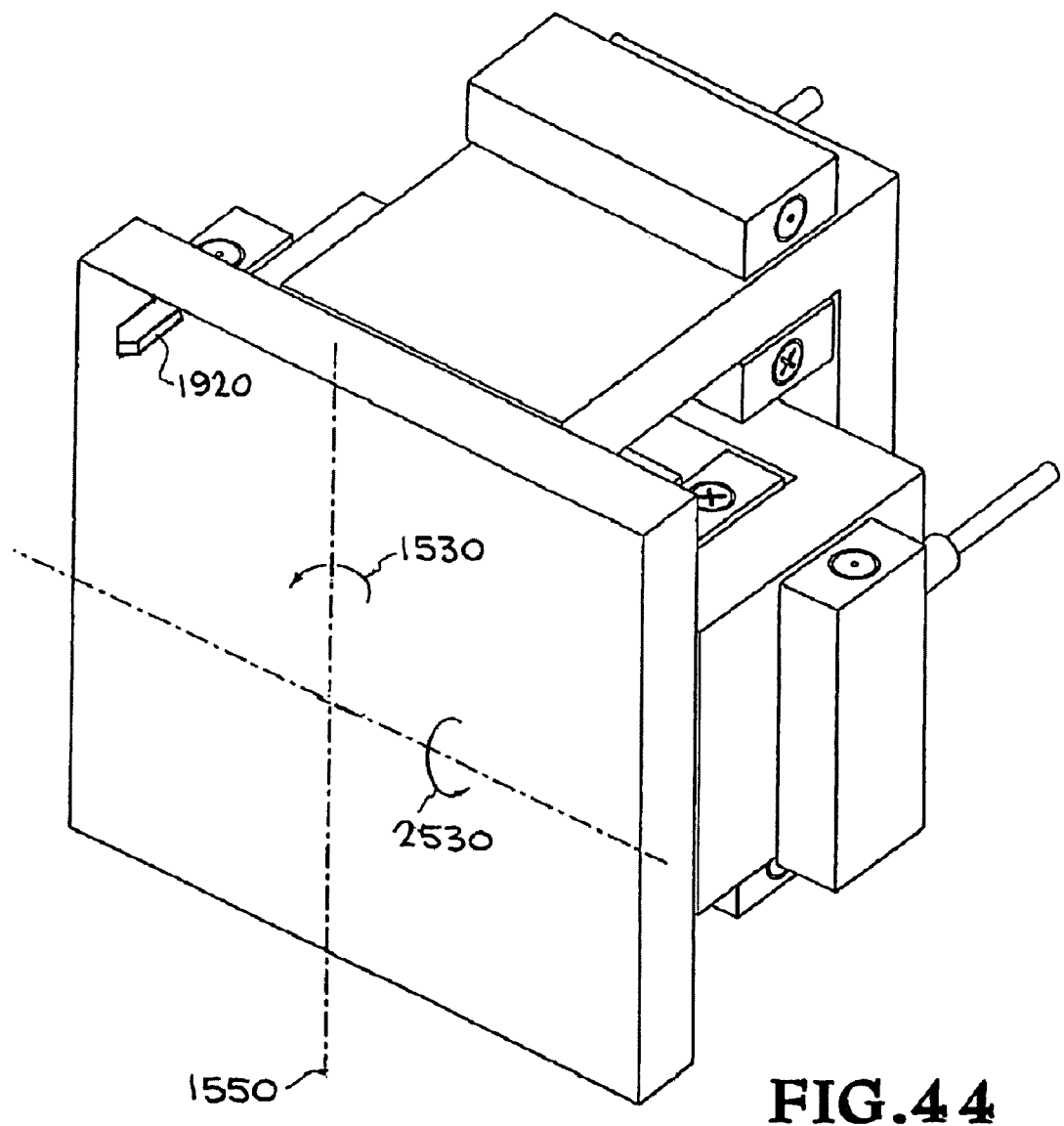
FIG. 44 shows the tool moved to a location near an edge of the rotor.

In FIG. 44, the tool 1920 has been moved to a location near an edge of the rotor 1500. This may be beneficial in some cases when compared to the tool location in FIG. 43.

Figure 45:
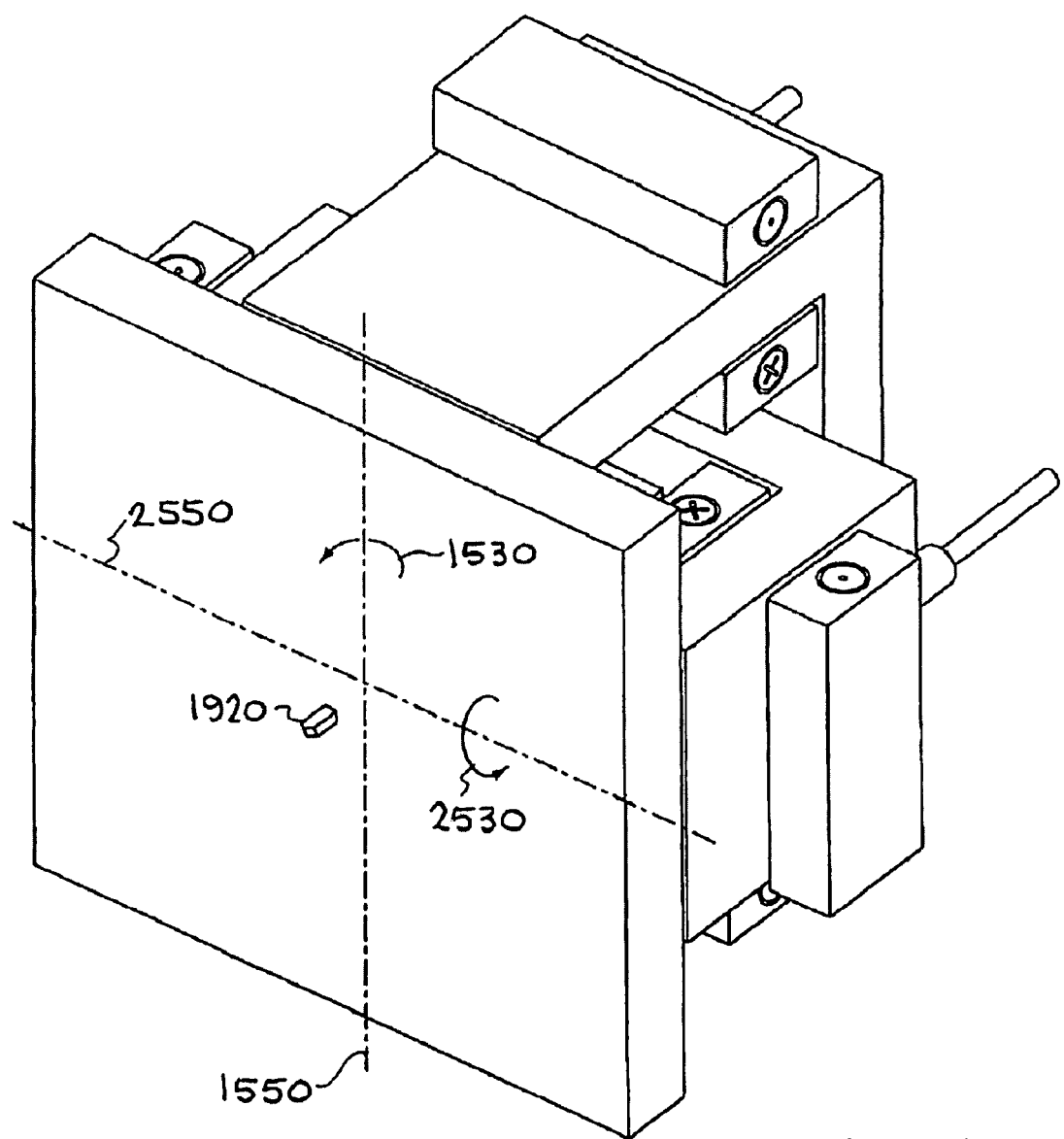
FIG. 45 shows the tip of the tool located in front of the intersections of the two rotation axes of the rotor.

FIG. 45 shows the system of FIG. 43 with the tip of the tool 1920 located in front of the intersections of the rotation axes 1550 and 2550 of the rotor. This configuration can be desirable for an application where an oscillatory back and forth motion and/or up and down is desired.

Figure 46:
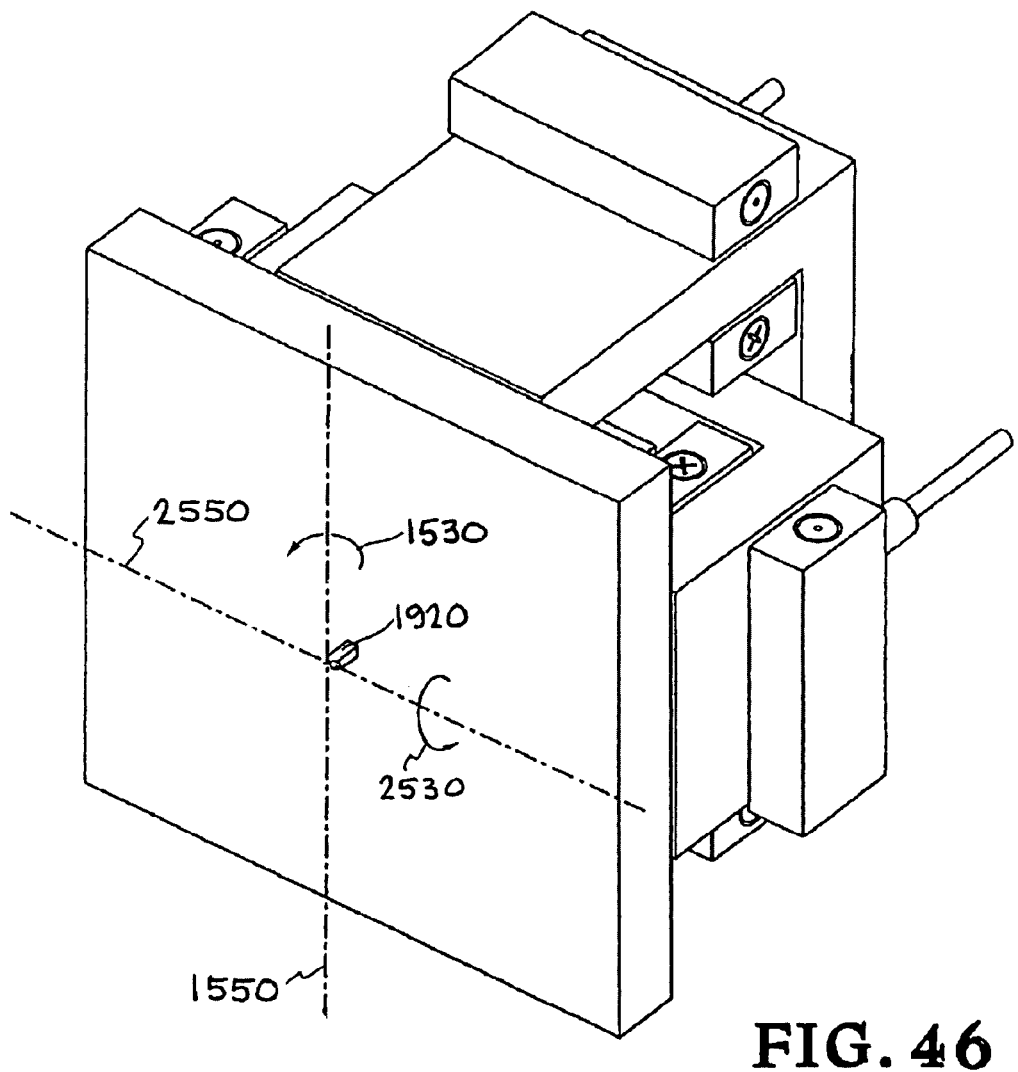
FIG. 46 shows the tip of the tool coincident with the intersections of the two rotation axes of the rotor.

In FIG. 46 the tip of the tool 1920 is coincident with the intersections of the rotation axes 1550 and 2550 of the rotor 1500. This configuration can be desirable for an application where rotation of the tool around its tip is desired. Note that as drawn, FIG. 46 depicts a system where the combined center of mass of the major rotating elements, 1500 and 1540 is not coincident with the axes of rotation 1550 and 2550. If the resultant forces from the linear acceleration of the center of mass are intolerable in a certain application, then balance masses (not shown) can be added to the front face of the rotor.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A hybrid rotary/linear electromagnetic positioning apparatus, comprising:
    a stator;
    a rotor moveably coupled with said stator and configured with at least one broad surface parallel to a desired XY plane; and
    means to induce a steering flux and a bias flux in said stator so as to rotate said rotor relative to a rotational axis and translate linearly in an orthogonal direction with respect to said XY plane, wherein said rotational axis is adapted parallel to said XY plane.

2. The positioning apparatus of claim 1, wherein said means to induce said steering flux further comprises one or more first steering coils to induce a first steering flux and one or more second steering coils to induce a second steering flux.

3. The positioning apparatus of claim 1, wherein said means to induce said bias flux further comprises a biasing coil.

4. The positioning apparatus of claim 3, further comprising at least 2 back-iron air gaps for separating a bias flux path from a steering flux path when operating with said biasing coil.

5. The positioning apparatus of claim 1, wherein said means to induce said bias flux further comprises a permanent magnet.

6. The positioning apparatus of claim 5, wherein said permanent magnet comprises a rubber sheet permanent magnet.

7. The positioning apparatus of claim 1, further comprising a bearing configured to support said rotor relative to the stator, and establishing an axis of rotation for said rotor.

8. The positioning apparatus of claim 7, wherein said bearing comprises at least two flexure blades.

9. The apparatus of claim 7, wherein said bearing further comprises at least one spring element.

10. The positioning apparatus of claim 7, wherein said bearing further comprises a fluid film bearing.

11. The positioning apparatus of claim 7, wherein said bearing further comprises an elastomeric bearing.

12. The positioning apparatus of claim 7, wherein said bearing comprises a composite material.

13. The positioning apparatus of claim 1, wherein said bias flux and said steering flux produces at least one force on said rotor to cause a rotation of said rotor relative to said stator about said rotational axis.

14. The positioning apparatus of claim 1, wherein said bias flux and said steering flux produces at least one force on said rotor to cause said linear translation of said rotor relative to said stator along a translation axis.

15. The positioning apparatus of claim 1, further comprising at least two displacement sensors for measuring the rotation and the translation of the said rotor relative to said stator.

16. The positioning apparatus of claim 1, further comprising a coupled control system for controlling said bias flux and said steering flux for controlling rotation or linear translation and/or simultaneous rotation and linear translation of said rotor.

17. The apparatus of claim 16, wherein said control system operatively controls said linear translation along a translation axis to provide dynamic stiffness or electronic damping for said rotor in a predominantly rotary application.

18. The apparatus of claim 16, wherein said control system operatively controls said rotation about said rotational axis to provide dynamic stiffness or electronic damping for said rotor in a predominantly linear application.

19. The apparatus of claim 1, wherein said broad surface further comprises an operatively coupled cutting tool.

20. The apparatus of claim 1, wherein said broad surface further comprises at least one operatively coupled optical element selected from a reflective element, a refractive element, and a diffractive element.

21. The apparatus of claim 20, wherein said at least one operatively coupled optical element further comprises a surface having a concave, convex, or complex surface.

22. The apparatus of claim 1, wherein said broad surface comprises a manufactured optical surface selected from a reflective, refractive or diffractive surface.

23. A one degree of freedom actuator, comprising:
    a stator configured with at least one central pole and at least two outer poles;
    a rotor moveably coupled with said stator and configured with at least one central rotor pole, at least two outer rotor poles, and configured with at least one broad surface parallel to an XY plane; and
    means to induce a steering flux and a bias flux in said stator so as to rotate said rotor relative to a rotational axis.

24. The actuator of claim 23, further comprising at least one coil configured to produce a steering flux in said at least two outer stator poles and in said at least two outer rotor poles.

25. The actuator of claim 23, wherein a permanent magnet can be operatively coupled to said central stator pole to produce a bias flux in said stator poles and said rotor poles.

26. The actuator of claim 25, wherein said permanent magnet provides a high reluctance path to substantially impede a steering flux from traveling between the central stator pole and the central rotor pole.

27. The actuator of claim 23, further comprising a bearing supporting said rotor relative to said stator so as to establish an axis of rotation parallel to said XY plane of said rotor.

28. The actuator of claim of claim 27, wherein said bearing further comprises a fluid film bearing.

29. The actuator of claim of claim 27, wherein said bearing further comprises an elastomeric bearing.

30. The actuator of claim of claim 27, wherein said bearing comprises a composite material.

31. The actuator of claim 27, wherein a permanent magnet produces a bias force to preload said bearing.

32. The actuator of claim 23, wherein said bias flux and said steering flux produces at least one force on said rotor to cause rotation of said rotor relative to the stator about said rotational axis.

33. The actuator of claim 23, further comprising at least one displacement sensor for measuring a rotation of said rotor around said rotational axis and a translation relative to said stator.

34. The actuator of claim 23, further comprising a coupled control system for controlling said steering flux for controlling rotation of said rotor.

35. The actuator of claim 23, further comprising a torsional rod for providing an axial support to said rotor.

36. The actuator of claim 23, wherein said broad surface further comprises an operatively coupled cutting tool.

37. The actuator of claim 23, wherein said broad surface further comprises at least one operatively coupled optical element selected from a reflective element, a refractive element, and a diffractive element.

38. The actuator of claim 37, wherein said at least one operatively coupled optical element further comprises a surface having a concave, convex, or complex surface.

39. The actuator of claim 23, wherein said broad surface comprises a manufactured optical surface selected from a reflective, refractive or diffractive surface.

40. A two degree of freedom actuator, comprising:
a stator configured with at least one central pole, at least two left/right outer stator poles, and at least two top/bottom outer stator poles;
a rotor moveably coupled with said stator and configured with at least one central pole, at least two left/right outer rotor poles, at least two top/bottom outer rotor poles, and configured with at least one broad surface parallel to an XY plane; and
means to induce a steering flux and a bias flux in said stator so as to rotate said rotor relative to a first and a second rotational axis.

41. The actuator of claim 40, further comprising at least one coil configured to produce a first steering flux in said at least two left/right outer stator poles and in said at least two left/right outer rotor poles.

42. The actuator of claim 40, further comprising at least one coil configured to produce a second steering flux in said at least two top/bottom outer stator poles and in said at least two top/bottom outer rotor poles.

43. The actuator of claim 40, wherein a permanent magnet can be operatively coupled to said central stator pole to produce a bias flux in said stator poles and said rotor poles.

44. The actuator of claim 40, wherein said permanent magnet provides a high reluctance path to substantially impede a first steering flux and a second steering flux from traveling between the central stator pole and the central rotor pole.

45. The actuator of claim 44, wherein said bias flux and said first steering flux produce at least one force on said rotor to cause rotation of said rotor relative to the stator about said first rotational axis.

46. The actuator of claim 44, wherein said bias flux and said second steering flux produce at least one force on said rotor to cause rotation of said rotor relative to the stator about said second rotational axis.

47. The actuator of claim 40, further comprising a bearing supporting said rotor relative to said stator so as to establish a first axis of rotation and a second axis of rotation for said rotor.

48. The actuator of claim of claim 47, wherein said bearing further comprises a fluid film bearing.

49. The actuator of claim of claim 47, wherein said bearing further comprises an elastomeric bearing.

50. The actuator of claim of claim 47, wherein said bearing comprises a composite material.

51. The actuator of claim 47, wherein a permanent magnet produces a bias force to preload said bearing.

52. The actuator of claim 40, wherein said first rotational axis is configured parallel to said XY plane of said rotor and said second rotational axis is configured parallel said XY plane of and said rotor and substantially parallel to said first rotational axis.

53. The actuator of claim 40, further comprising at least one displacement sensor for measuring a rotation of said rotor around said first and said second rotational axis and a translation relative to said stator.

54. The actuator of claim 40, further comprising a coupled control system for controlling said steering flux for controlling rotation of said rotor around said first rotational axis and said second rotational axis.

55. The actuator of claim 40, wherein said broad surface further comprises an operatively coupled cutting tool.

56. The actuator of claim 40, wherein said broad surface further comprises at least one operatively coupled optical element selected from a reflective element, a refractive element, and a diffractive element.

57. The actuator of claim 56, wherein said at least one operatively coupled optical element further comprises a surface having a concave, convex, or complex surface.

58. The actuator of claim 40, wherein said broad surface comprises a manufactured optical surface selected from a reflective, refractive or diffractive surface.

* * * * *